(12) United States Patent
Wright et al.

(10) Patent No.: US 10,951,488 B2
(45) Date of Patent: *Mar. 16, 2021

(54) RULE-BASED PERFORMANCE CLASS ACCESS MANAGEMENT FOR STORAGE CLUSTER PERFORMANCE GUARANTEES

(71) Applicant: NetApp, Inc., Sunnyvale, CA (US)

(72) Inventors: David D. Wright, Dacula, GA (US); Michael Xu, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,701

(22) Filed: Dec. 20, 2019

(65) Prior Publication Data

US 2020/0127900 A1 Apr. 23, 2020

Related U.S. Application Data

(63) Continuation of application No. 15/832,342, filed on Dec. 5, 2017, now Pat. No. 10,516,582, which is a
(Continued)

(51) Int. Cl.
*H04L 12/24* (2006.01)
*H04L 29/08* (2006.01)
(Continued)

(52) U.S. Cl.
CPC ............ *H04L 41/50* (2013.01); *G06F 9/5083* (2013.01); *G06F 11/3433* (2013.01);
(Continued)

(58) Field of Classification Search
CPC ..... H04L 4/51; H04L 67/322; H04L 67/1097; H04L 67/22; G06F 11/3495; G06F 9/5083
See application file for complete search history.

(56) References Cited

U.S. PATENT DOCUMENTS 5,138,697 A 8/1992 Yamamoto et al.
5,375,216 A 12/1994 Moyer et al.
(Continued)

FOREIGN PATENT DOCUMENTS

EP 0726521 A2 8/1996
EP 1970821 A1 9/2008
(Continued)

OTHER PUBLICATIONS

International Search Report and Written Opinion of the International Search Authority received in PCT/US12/71844 dated Mar. 1, 2013 (12 pages).
(Continued)

*Primary Examiner* — Asghar H Bilgrami
(74) *Attorney, Agent, or Firm* — Jaffery Watson Mendonsa & Hamilton LLP

(57) ABSTRACT

Performance of a storage system with data distributed substantially, evenly across a cluster of storage nodes can be dynamically managed according whether quality of service (QoS) rules based on one or more performance capacities according to performance class is satisfied, wherein each QoS rule includes a boundary condition and a threshold expressing performance guarantees to a respective performance class. Determining for each QoS rule, whether a respective boundary condition satisfies a respective threshold based on measured capacity for a performance metric corresponding to the respective boundary condition; and if so, setting a first QoS parameter associated with the set of QoS rules and throttling access to the storage system by a first client associated with a first performance class based on the first QoS parameter to enforce the performance guarantees to the first performance class.

20 Claims, 22 Drawing Sheets

Related U.S. Application Data continuation of application No. 13/856,958, filed on Apr. 4, 2013, now Pat. No. 9,838,269, which is a continuation of application No. PCT/US2012/071844, filed on Dec. 27, 2012, which is a continuation-in-part of application No. 13/338,039, filed on Dec. 27, 2011, now Pat. No. 9,003,021.

(60) Provisional application No. 61/697,905, filed on Sep. 7, 2012.

(51) Int. Cl.
  *G06F 11/34* (2006.01)
  *G06F 9/50* (2006.01)

(52) U.S. Cl.
  CPC ...... *G06F 11/3485* (2013.01); *G06F 11/3495* (2013.01); *H04L 67/1097* (2013.01); *H04L 67/22* (2013.01); *H04L 67/322* (2013.01); *H04L 41/5025* (2013.01)

(56) References Cited

U.S. PATENT DOCUMENTS

| | | | |
|---|---|---|---|
| 5,459,857 A | 10/1995 | Ludlam et al. | |
| 5,511,190 A | 4/1996 | Sharma et al. | |
| 5,542,089 A | 7/1996 | Lindsay et al. | |
| 5,592,432 A | 1/1997 | Vishlitzky et al. | |
| 5,603,001 A | 2/1997 | Sukegawa et al. | |
| 5,611,073 A | 3/1997 | Malpure et al. | |
| 5,734,859 A | 3/1998 | Yorimitsu et al. | |
| 5,734,898 A | 3/1998 | He | |
| 5,751,993 A | 5/1998 | Ofek et al. | |
| 5,860,082 A | 1/1999 | Smith et al. | |
| 5,864,698 A | 1/1999 | Krau et al. | |
| 5,890,161 A | 3/1999 | Helland et al. | |
| 5,937,425 A | 8/1999 | Ban | |
| 5,974,421 A | 10/1999 | Krishnaswamy et al. | |
| 5,991,862 A | 11/1999 | Ruane | |
| 6,047,283 A | 4/2000 | Braun et al. | |
| 6,067,541 A | 5/2000 | Raju et al. | |
| 6,081,900 A | 6/2000 | Subramaniam et al. | |
| 6,219,800 B1 | 4/2001 | Johnson et al. | |
| 6,257,756 B1 | 7/2001 | Zarubinsky et al. | |
| 6,275,898 B1 | 8/2001 | Dekoning | |
| 6,347,337 B1 | 2/2002 | Shah et al. | |
| 6,363,385 B1 | 3/2002 | Kedem et al. | |
| 6,385,699 B1 | 5/2002 | Bozman et al. | |
| 6,397,307 B2 | 5/2002 | Ohran | |
| 6,434,555 B1 | 8/2002 | Frolund et al. | |
| 6,434,662 B1 | 8/2002 | Greene et al. | |
| 6,526,478 B1 | 2/2003 | Kirby | |
| 6,553,384 B1 | 4/2003 | Frey et al. | |
| 6,560,196 B1 | 5/2003 | Wei | |
| 6,567,817 B1 | 5/2003 | Vanleer et al. | |
| 6,578,158 B1 | 6/2003 | Deitz et al. | |
| 6,604,155 B1 | 8/2003 | Chong, Jr. | |
| 6,609,176 B1 | 8/2003 | Mizuno | |
| 6,681,389 B1 | 1/2004 | Engel et al. | |
| 6,704,839 B2 | 3/2004 | Butterworth et al. | |
| 6,728,843 B1 | 4/2004 | Pong et al. | |
| 6,741,698 B1 | 5/2004 | Jensen | |
| 6,779,003 B1 | 8/2004 | Midgley et al. | |
| 6,795,890 B1 | 9/2004 | Sugai et al. | |
| 6,895,500 B1 | 5/2005 | Rothberg | |
| 6,904,470 B1 | 6/2005 | Ofer et al. | |
| 6,912,645 B2 | 6/2005 | Dorward et al. | |
| 6,917,898 B1 | 7/2005 | Kirubalaratnam et al. | |
| 6,928,521 B1 | 8/2005 | Burton et al. | |
| 6,928,526 B1 | 8/2005 | Zhu et al. | |
| 6,961,865 B1 | 11/2005 | Ganesh et al. | |
| 7,003,565 B2 | 2/2006 | Hind et al. | |
| 7,028,218 B2 | 4/2006 | Schwarm et al. | |
| 7,039,694 B2 | 5/2006 | Kampe et al. | |
| 7,047,358 B2 | 5/2006 | Lee et al. | |
| 7,055,058 B2 | 5/2006 | Lee et al. | |
| 7,065,619 B1 | 6/2006 | Zhu et al. | |
| 7,093,086 B1 | 8/2006 | Van | |
| 7,110,913 B2 | 9/2006 | Monroe et al. | |
| 7,152,142 B1 | 12/2006 | Guha et al. | |
| 7,167,951 B2 | 1/2007 | Blades et al. | |
| 7,174,379 B2 | 2/2007 | Agarwal et al. | |
| 7,177,853 B1 | 2/2007 | Ezra et al. | |
| 7,188,149 B2 | 3/2007 | Kishimoto et al. | |
| 7,191,357 B2 | 3/2007 | Holland et al. | |
| 7,219,260 B1 | 5/2007 | De et al. | |
| 7,249,150 B1 | 7/2007 | Watanabe et al. | |
| 7,251,663 B1 | 7/2007 | Smith | |
| 7,257,690 B1 | 8/2007 | Baird | |
| 7,305,579 B2 | 12/2007 | Williams | |
| 7,325,059 B2 | 1/2008 | Barach et al. | |
| 7,334,094 B2 | 2/2008 | Fair | |
| 7,334,095 B1 | 2/2008 | Fair et al. | |
| 7,366,865 B2 | 4/2008 | Lakshmanamurthy et al. | |
| 7,370,048 B2 | 5/2008 | Loeb | |
| 7,373,345 B2 | 5/2008 | Carpentier et al. | |
| 7,394,944 B2 | 7/2008 | Boskovic et al. | |
| 7,395,283 B1 | 7/2008 | Atzmony et al. | |
| 7,395,352 B1 | 7/2008 | Lam et al. | |
| 7,415,653 B1 | 8/2008 | Bonwick et al. | |
| 7,451,167 B2 | 11/2008 | Bali et al. | |
| 7,454,592 B1 | 11/2008 | Shah et al. | |
| 7,457,864 B2 * | 11/2008 | Chambliss | H04L 41/024 |
| | | | 702/182 |
| 7,464,125 B1 | 12/2008 | Orszag et al. | |
| 7,519,725 B2 | 4/2009 | Alvarez et al. | |
| 7,526,685 B2 | 4/2009 | Maso et al. | |
| 7,529,780 B1 | 5/2009 | Braginsky et al. | |
| 7,529,830 B2 | 5/2009 | Fujii | |
| 7,543,100 B2 | 6/2009 | Singhal et al. | |
| 7,543,178 B2 | 6/2009 | McNeill et al. | |
| 7,562,101 B1 | 7/2009 | Jernigan, IV et al. | |
| 7,562,203 B2 | 7/2009 | Scott et al. | |
| 7,603,391 B1 | 10/2009 | Federwisch et al. | |
| 7,603,529 B1 | 10/2009 | MacHardy et al. | |
| 7,624,112 B2 | 11/2009 | Ganesh et al. | |
| 7,644,087 B2 | 1/2010 | Barkai et al. | |
| 7,647,329 B1 | 1/2010 | Fischman et al. | |
| 7,668,885 B2 | 2/2010 | Wittke et al. | |
| 7,680,837 B2 | 3/2010 | Yamato | |
| 7,681,076 B1 | 3/2010 | Sarma | |
| 7,689,716 B2 | 3/2010 | Short et al. | |
| 7,701,948 B2 | 4/2010 | Rabje et al. | |
| 7,730,153 B1 | 6/2010 | Gole et al. | |
| 7,739,614 B1 | 6/2010 | Hackworth | |
| 7,743,035 B2 | 6/2010 | Chen et al. | |
| 7,757,056 B1 | 7/2010 | Fair | |
| 7,797,279 B1 | 9/2010 | Starling et al. | |
| 7,805,266 B1 | 9/2010 | Dasu et al. | |
| 7,805,583 B1 | 9/2010 | Todd et al. | |
| 7,814,064 B2 | 10/2010 | Vingralek | |
| 7,817,562 B1 | 10/2010 | Kemeny | |
| 7,818,525 B1 | 10/2010 | Frost et al. | |
| 7,831,736 B1 | 11/2010 | Thompson | |
| 7,831,769 B1 | 11/2010 | Wen et al. | |
| 7,849,098 B1 | 12/2010 | Scales et al. | |
| 7,849,281 B2 | 12/2010 | Malhotra et al. | |
| 7,873,619 B1 | 1/2011 | Faibish et al. | |
| 7,899,791 B1 | 3/2011 | Gole | |
| 7,917,726 B2 | 3/2011 | Hummel et al. | |
| 7,921,169 B2 | 4/2011 | Jacobs et al. | |
| 7,921,325 B2 | 4/2011 | Kondo et al. | |
| 7,949,693 B1 | 5/2011 | Mason et al. | |
| 7,953,878 B1 | 5/2011 | Trimble | |
| 7,962,709 B2 | 6/2011 | Agrawal | |
| 7,987,167 B1 | 7/2011 | Kazar et al. | |
| 7,996,636 B1 | 8/2011 | Prakash et al. | |
| 8,055,745 B2 | 11/2011 | Atluri | |
| 8,060,797 B2 | 11/2011 | Hida et al. | |
| 8,074,019 B2 | 12/2011 | Gupta et al. | |
| 8,078,918 B2 | 12/2011 | Diggs et al. | |
| 8,082,390 B1 | 12/2011 | Fan et al. | |
| 8,086,585 B1 | 12/2011 | Brashers et al. | |
| 8,089,969 B2 | 1/2012 | Rabie et al. | |

(56) References Cited

U.S. PATENT DOCUMENTS

| | | | |
|---|---|---|---|
| 8,090,908 B1 | 1/2012 | Bolen et al. |
| 8,099,396 B1 | 1/2012 | Novick et al. |
| 8,099,554 B1 | 1/2012 | Solomon et al. |
| 8,122,213 B2 | 2/2012 | Cherian et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,145,838 B1 | 3/2012 | Miller et al. |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,225,135 B2 | 7/2012 | Barrall et al. |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,312,231 B1 | 11/2012 | Li et al. |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,429,096 B1 | 4/2013 | Soundararajan et al. |
| 8,429,282 B1 * | 4/2013 | Ahuja .................... H04L 47/19 |
| | | 709/219 |
| 8,452,929 B2 | 5/2013 | Bennett |
| 8,463,825 B1 | 6/2013 | Harty et al. |
| 8,468,368 B2 | 6/2013 | Gladwin et al. |
| 8,484,439 B1 | 7/2013 | Frailong et al. |
| 8,489,811 B1 | 7/2013 | Corbett et al. |
| 8,495,417 B2 | 7/2013 | Jernigan, IV et al. |
| 8,510,265 B1 | 8/2013 | Boone et al. |
| 8,515,965 B2 | 8/2013 | Mital et al. |
| 8,520,855 B1 | 8/2013 | Kohno et al. |
| 8,533,410 B1 | 9/2013 | Corbett et al. |
| 8,539,008 B2 | 9/2013 | Faith et al. |
| 8,543,611 B1 | 9/2013 | Mirtich et al. |
| 8,549,154 B2 | 10/2013 | Colrain et al. |
| 8,555,019 B2 | 10/2013 | Montgomery et al. |
| 8,560,879 B1 | 10/2013 | Goel |
| 8,566,508 B2 | 10/2013 | Borchers et al. |
| 8,566,617 B1 | 10/2013 | Clifford |
| 8,572,091 B1 | 10/2013 | Sivasubramanian et al. |
| 8,577,850 B1 | 11/2013 | Genda et al. |
| 8,583,865 B1 | 11/2013 | Sade et al. |
| 8,589,550 B1 | 11/2013 | Faibish et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,692 B1 | 4/2014 | Luthra et al. |
| 8,706,701 B1 | 4/2014 | Stefanov et al. |
| 8,712,963 B1 | 4/2014 | Douglis et al. |
| 8,732,426 B2 | 5/2014 | Colgrove et al. |
| 8,745,338 B1 | 6/2014 | Yadav et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,601 B1 | 8/2014 | Chen et al. |
| 8,799,705 B2 | 8/2014 | Hallak et al. |
| 8,806,160 B2 | 8/2014 | Colgrove et al. |
| 8,812,450 B1 | 8/2014 | Kesavan et al. |
| 8,824,686 B1 | 9/2014 | Ishii et al. |
| 8,826,023 B1 | 9/2014 | Harmer et al. |
| 8,832,373 B2 | 9/2014 | Colgrove et al. |
| 8,843,711 B1 | 9/2014 | Yadav et al. |
| 8,849,764 B1 | 9/2014 | Long et al. |
| 8,850,108 B1 | 9/2014 | Hayes et al. |
| 8,850,216 B1 | 9/2014 | Mikhailov et al. |
| 8,855,318 B1 | 10/2014 | Patnala et al. |
| 8,856,593 B2 | 10/2014 | Eckhardt et al. |
| 8,868,868 B1 | 10/2014 | Maheshwari et al. |
| 8,874,842 B1 | 10/2014 | Kimmel et al. |
| 8,880,787 B1 | 11/2014 | Kimmel et al. |
| 8,880,788 B1 | 11/2014 | Sundaram et al. |
| 8,892,818 B1 | 11/2014 | Zheng et al. |
| 8,904,137 B1 | 12/2014 | Zhang et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,021,303 B1 | 4/2015 | Desouter et al. |
| 9,026,694 B1 | 5/2015 | Davidson et al. |
| 9,037,544 B1 | 5/2015 | Zheng et al. |
| 9,047,211 B2 | 6/2015 | Wood et al. |
| 9,058,119 B1 | 6/2015 | Ray et al. |
| 9,092,142 B2 | 7/2015 | Nashimoto et al. |
| 9,152,684 B2 | 10/2015 | Zheng et al. |
| 9,170,746 B2 | 10/2015 | Sundaram et al. |
| 9,195,939 B1 | 11/2015 | Goyal et al. |
| 9,201,742 B2 | 12/2015 | Bulkowski et al. |
| 9,201,804 B1 | 12/2015 | Egyed |
| 9,225,801 B1 | 12/2015 | McMullen et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,274,901 B2 | 3/2016 | Veerla et al. |
| 9,286,413 B1 | 3/2016 | Coates et al. |
| 9,298,417 B1 | 3/2016 | Muddu et al. |
| 9,367,241 B2 | 6/2016 | Sundaram et al. |
| 9,378,043 B1 | 6/2016 | Zhang et al. |
| 9,389,958 B2 | 7/2016 | Sundaram et al. |
| 9,405,783 B2 | 8/2016 | Kimmel et al. |
| 9,411,620 B2 | 8/2016 | Wang et al. |
| 9,413,680 B1 | 8/2016 | Kusters et al. |
| 9,459,856 B2 | 10/2016 | Curzi et al. |
| 9,460,009 B1 | 10/2016 | Taylor et al. |
| 9,471,680 B2 | 10/2016 | Elsner et al. |
| 9,483,349 B2 | 11/2016 | Sundaram et al. |
| 9,537,827 B1 | 1/2017 | McMullen et al. |
| 9,572,091 B2 | 2/2017 | Lee et al. |
| 9,606,874 B2 | 3/2017 | Moore et al. |
| 9,639,293 B2 | 5/2017 | Guo et al. |
| 9,639,546 B1 | 5/2017 | Gorski et al. |
| 9,652,405 B1 | 5/2017 | Shain et al. |
| 9,690,703 B1 | 6/2017 | Jess et al. |
| 9,779,123 B2 | 10/2017 | Sen et al. |
| 9,785,525 B2 | 10/2017 | Watanabe et al. |
| 9,798,497 B1 | 10/2017 | Schick et al. |
| 9,817,858 B2 | 11/2017 | Eisenreich et al. |
| 9,846,642 B2 | 12/2017 | Choi et al. |
| 9,852,076 B1 | 12/2017 | Garg et al. |
| 9,953,351 B1 | 4/2018 | Sivasubramanian et al. |
| 9,954,946 B2 | 4/2018 | Shetty et al. |
| 10,216,966 B2 | 2/2019 | McClanahan et al. |
| 10,516,582 B2 | 12/2019 | Wright et al. |
| 10,565,230 B2 | 2/2020 | Zheng et al. |
| 2001/0056543 A1 | 12/2001 | Isomura et al. |
| 2002/0059274 A1 | 5/2002 | Hartsell et al. |
| 2002/0073354 A1 | 6/2002 | Schroiff et al. |
| 2002/0091897 A1 | 7/2002 | Chiu et al. |
| 2002/0112097 A1 | 8/2002 | Milovanovic et al. |
| 2002/0116569 A1 | 8/2002 | Kim et al. |
| 2002/0156891 A1 | 10/2002 | Ulrich et al. |
| 2002/0158898 A1 | 10/2002 | Hsieh et al. |

(56) References Cited

U.S. PATENT DOCUMENTS

| | | |
|---|---|---|
| 2002/0174419 A1 | 11/2002 | Alvarez et al. |
| 2002/0175938 A1 | 11/2002 | Hackworth |
| 2002/0188711 A1 | 12/2002 | Meyer et al. |
| 2003/0005147 A1 | 1/2003 | Enns |
| 2003/0028642 A1 | 2/2003 | Agarwal et al. |
| 2003/0084251 A1 | 5/2003 | Gaither et al. |
| 2003/0105928 A1 | 6/2003 | Ash et al. |
| 2003/0115204 A1 | 6/2003 | Greenblatt et al. |
| 2003/0115282 A1* | 6/2003 | Rose ................ H04L 29/06 709/214 |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0145041 A1 | 7/2003 | Dunham et al. |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0182312 A1 | 9/2003 | Chen et al. |
| 2003/0182322 A1 | 9/2003 | Manley et al. |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1* | 1/2004 | Yao ................ G06F 3/061 711/114 |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0158549 A1 | 8/2004 | Matena et al. |
| 2004/0186858 A1 | 9/2004 | McGovern et al. |
| 2004/0205166 A1 | 10/2004 | Demoney |
| 2004/0210794 A1 | 10/2004 | Frey et al. |
| 2004/0215792 A1 | 10/2004 | Koning et al. |
| 2004/0236846 A1 | 11/2004 | Alvarez et al. |
| 2004/0267836 A1 | 12/2004 | Armangau et al. |
| 2004/0267932 A1 | 12/2004 | Voellm et al. |
| 2005/0010653 A1 | 1/2005 | McCanne |
| 2005/0027817 A1 | 2/2005 | Novik et al. |
| 2005/0039156 A1 | 2/2005 | Catthoor et al. |
| 2005/0043834 A1 | 2/2005 | Rotariu et al. |
| 2005/0044244 A1 | 2/2005 | Warwick et al. |
| 2005/0076113 A1 | 4/2005 | Klotz et al. |
| 2005/0076115 A1 | 4/2005 | Andrews |
| 2005/0080923 A1 | 4/2005 | Elzur |
| 2005/0091261 A1 | 4/2005 | Wu et al. |
| 2005/0108472 A1 | 5/2005 | Kanai et al. |
| 2005/0119996 A1 | 6/2005 | Ohata et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0216503 A1 | 9/2005 | Charlot et al. |
| 2005/0228885 A1 | 10/2005 | Winfield et al. |
| 2005/0246362 A1 | 11/2005 | Borland |
| 2005/0246398 A1 | 11/2005 | Barzilai et al. |
| 2006/0004957 A1 | 1/2006 | Hand, III et al. |
| 2006/0071845 A1 | 4/2006 | Stroili et al. |
| 2006/0072555 A1 | 4/2006 | St Hilaire et al. |
| 2006/0072593 A1 | 4/2006 | Grippo et al. |
| 2006/0074977 A1 | 4/2006 | Kothuri et al. |
| 2006/0075467 A1 | 4/2006 | Sanda et al. |
| 2006/0085166 A1 | 4/2006 | Ochi et al. |
| 2006/0101091 A1 | 5/2006 | Carbajales et al. |
| 2006/0101202 A1 | 5/2006 | Mannen et al. |
| 2006/0112155 A1 | 5/2006 | Earl et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0253749 A1 | 11/2006 | Alderegula et al. |
| 2006/0282662 A1 | 12/2006 | Whitcomb |
| 2006/0288151 A1 | 12/2006 | McKenney |
| 2007/0016617 A1 | 1/2007 | Lomet |
| 2007/0033376 A1 | 2/2007 | Sinclair et al. |
| 2007/0033433 A1 | 2/2007 | Pecone et al. |
| 2007/0041330 A1 | 2/2007 | Bostica et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0088702 A1 | 4/2007 | Fridella et al. |
| 2007/0094452 A1 | 4/2007 | Fachan |
| 2007/0106706 A1 | 5/2007 | Ahrens et al. |
| 2007/0109592 A1 | 5/2007 | Parvathaneni |
| 2007/0112723 A1 | 5/2007 | Alvarez et al. |
| 2007/0112955 A1 | 5/2007 | Clemm et al. |
| 2007/0136269 A1 | 6/2007 | Yamakabe et al. |
| 2007/0143359 A1 | 6/2007 | Uppala et al. |
| 2007/0186066 A1 | 8/2007 | Desai et al. |
| 2007/0186127 A1 | 8/2007 | Desai et al. |
| 2007/0208537 A1 | 9/2007 | Savoor et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0250635 A1 | 10/2007 | Hamilton et al. |
| 2007/0255530 A1 | 11/2007 | Wolff |
| 2007/0266037 A1 | 11/2007 | Terry et al. |
| 2007/0271391 A1 | 11/2007 | Fujii |
| 2007/0300013 A1 | 12/2007 | Kitamura |
| 2008/0019359 A1 | 1/2008 | Droux et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0160279 A1 | 7/2008 | Astigarraga et al. |
| 2008/0162990 A1 | 7/2008 | Wang et al. |
| 2008/0165899 A1 | 7/2008 | Rahman et al. |
| 2008/0168226 A1 | 7/2008 | Wang et al. |
| 2008/0184063 A1 | 7/2008 | Abdulvahid |
| 2008/0201535 A1 | 8/2008 | Hara |
| 2008/0212938 A1 | 9/2008 | Sato et al. |
| 2008/0228691 A1 | 9/2008 | Shavit et al. |
| 2008/0244158 A1 | 10/2008 | Funatsu et al. |
| 2008/0244354 A1 | 10/2008 | Wu et al. |
| 2008/0250270 A1 | 10/2008 | Bennett |
| 2008/0270719 A1 | 10/2008 | Cochran et al. |
| 2009/0019449 A1 | 1/2009 | Choi et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0043878 A1 | 2/2009 | Ni |
| 2009/0077097 A1 | 3/2009 | Lacapra et al. |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0193206 A1 | 7/2009 | Ishii et al. |
| 2009/0210611 A1 | 8/2009 | Mizushima |
| 2009/0210618 A1 | 8/2009 | Bates et al. |
| 2009/0225657 A1 | 9/2009 | Haggar et al. |
| 2009/0235022 A1 | 9/2009 | Bates et al. |
| 2009/0235110 A1 | 9/2009 | Kurokawa et al. |
| 2009/0249001 A1 | 10/2009 | Narayanan et al. |
| 2009/0249019 A1 | 10/2009 | Wu et al. |
| 2009/0271412 A1 | 10/2009 | Lacapra et al. |
| 2009/0276567 A1 | 11/2009 | Burkey |
| 2009/0276771 A1 | 11/2009 | Nickolov et al. |
| 2009/0285476 A1 | 11/2009 | Choe et al. |
| 2009/0299940 A1* | 12/2009 | Hayes ................ G06N 5/025 706/47 |
| 2009/0307290 A1 | 12/2009 | Barsness et al. |

(56) References Cited

U.S. PATENT DOCUMENTS

| | | |
|---|---|---|
| 2009/0313451 A1 | 12/2009 | Inoue et al. |
| 2009/0313503 A1 | 12/2009 | Atluri et al. |
| 2009/0327604 A1 | 12/2009 | Sato et al. |
| 2010/0011037 A1 | 1/2010 | Kazar |
| 2010/0023726 A1 | 1/2010 | Aviles |
| 2010/0030981 A1 | 2/2010 | Cook |
| 2010/0031000 A1 | 2/2010 | Flynn et al. |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0070701 A1 | 3/2010 | Iyigun et al. |
| 2010/0077101 A1* | 3/2010 | Wang ............... H04L 67/104 709/238 |
| 2010/0077380 A1 | 3/2010 | Baker et al. |
| 2010/0082648 A1 | 4/2010 | Potapov et al. |
| 2010/0082790 A1 | 4/2010 | Hussaini et al. |
| 2010/0122148 A1 | 5/2010 | Flynn et al. |
| 2010/0124196 A1 | 5/2010 | Bonar et al. |
| 2010/0161569 A1 | 6/2010 | Schreter |
| 2010/0161574 A1 | 6/2010 | Davidson et al. |
| 2010/0161850 A1 | 6/2010 | Otsuka |
| 2010/0169415 A1 | 7/2010 | Leggette et al. |
| 2010/0174677 A1 | 7/2010 | Zahavi et al. |
| 2010/0174714 A1 | 7/2010 | Asmundsson et al. |
| 2010/0191713 A1 | 7/2010 | Lomet et al. |
| 2010/0199009 A1 | 8/2010 | Koide |
| 2010/0199040 A1* | 8/2010 | Schnapp ............... G06F 3/0605 711/114 |
| 2010/0205353 A1 | 8/2010 | Miyamoto et al. |
| 2010/0205390 A1 | 8/2010 | Arakawa |
| 2010/0217953 A1 | 8/2010 | Beaman et al. |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0269044 A1 | 10/2010 | Ivanyi et al. |
| 2010/0280998 A1 | 11/2010 | Goebel et al. |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2010/0309933 A1 | 12/2010 | Stark et al. |
| 2011/0004707 A1 | 1/2011 | Spry et al. |
| 2011/0022778 A1 | 1/2011 | Schibilla et al. |
| 2011/0022812 A1 | 1/2011 | Van Der Linden et al. |
| 2011/0035548 A1 | 2/2011 | Kimmel et al. |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0096675 A1 | 4/2011 | Li et al. |
| 2011/0099342 A1 | 4/2011 | Ozdemir et al. |
| 2011/0099419 A1 | 4/2011 | Lucas et al. |
| 2011/0119412 A1 | 5/2011 | Orfitelli |
| 2011/0119668 A1 | 5/2011 | Calder et al. |
| 2011/0126045 A1 | 5/2011 | Bennett et al. |
| 2011/0153603 A1 | 6/2011 | Adiba et al. |
| 2011/0153719 A1 | 6/2011 | Santoro et al. |
| 2011/0153972 A1 | 6/2011 | Laberge |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0191389 A1 | 8/2011 | Okamoto |
| 2011/0191522 A1 | 8/2011 | Condict et al. |
| 2011/0196842 A1 | 8/2011 | Timashev et al. |
| 2011/0213928 A1 | 9/2011 | Grube et al. |
| 2011/0219106 A1 | 9/2011 | Wright |
| 2011/0231624 A1 | 9/2011 | Fukutomi et al. |
| 2011/0238857 A1 | 9/2011 | Certain et al. |
| 2011/0246733 A1 | 10/2011 | Usgaonkar et al. |
| 2011/0246821 A1 | 10/2011 | Eleftheriou et al. |
| 2011/0283048 A1 | 11/2011 | Feldman et al. |
| 2011/0286123 A1 | 11/2011 | Montgomery et al. |
| 2011/0289565 A1 | 11/2011 | Resch et al. |
| 2011/0296133 A1 | 12/2011 | Flynn et al. |
| 2011/0302572 A1 | 12/2011 | Kuncoro et al. |
| 2011/0307530 A1 | 12/2011 | Patterson |
| 2011/0311051 A1 | 12/2011 | Resch et al. |
| 2011/0314346 A1 | 12/2011 | Vas et al. |
| 2012/0003940 A1 | 1/2012 | Hirano et al. |
| 2012/0011176 A1 | 1/2012 | Aizman |
| 2012/0011340 A1 | 1/2012 | Flynn et al. |
| 2012/0016840 A1 | 1/2012 | Lin et al. |
| 2012/0047115 A1 | 2/2012 | Subramanya et al. |
| 2012/0054746 A1 | 3/2012 | Vaghani et al. |
| 2012/0063306 A1 | 3/2012 | Sultan et al. |
| 2012/0066204 A1* | 3/2012 | Ball ............... G06F 17/30557 707/713 |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0109895 A1 | 5/2012 | Zwilling et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0210095 A1 | 8/2012 | Nellans et al. |
| 2012/0226668 A1 | 9/2012 | Dhamankar et al. |
| 2012/0226841 A1 | 9/2012 | Nguyen et al. |
| 2012/0239869 A1 | 9/2012 | Chiueh et al. |
| 2012/0240126 A1 | 9/2012 | Dice et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0271868 A1 | 10/2012 | Fukatani et al. |
| 2012/0290629 A1 | 11/2012 | Beaverson et al. |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0311292 A1 | 12/2012 | Maniwa et al. |
| 2012/0311568 A1 | 12/2012 | Jansen |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2012/0331471 A1 | 12/2012 | Ramalingam et al. |
| 2013/0007097 A1 | 1/2013 | Sambe et al. |
| 2013/0007370 A1 | 1/2013 | Parikh et al. |
| 2013/0010966 A1 | 1/2013 | Li et al. |
| 2013/0013654 A1 | 1/2013 | Lacapra et al. |
| 2013/0018722 A1 | 1/2013 | Libby |
| 2013/0018854 A1 | 1/2013 | Condict |
| 2013/0019057 A1 | 1/2013 | Stephens et al. |
| 2013/0024641 A1 | 1/2013 | Talagala et al. |
| 2013/0042065 A1 | 2/2013 | Kasten et al. |
| 2013/0054927 A1 | 2/2013 | Raj et al. |
| 2013/0055358 A1 | 2/2013 | Short et al. |
| 2013/0060992 A1 | 3/2013 | Cho et al. |
| 2013/0061169 A1 | 3/2013 | Pearcy et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0080720 A1 | 3/2013 | Nakamura et al. |
| 2013/0083639 A1 | 4/2013 | Wharton et al. |
| 2013/0086006 A1 | 4/2013 | Colgrove et al. |
| 2013/0086270 A1 | 4/2013 | Nishikawa et al. |
| 2013/0086336 A1 | 4/2013 | Canepa et al. |
| 2013/0110783 A1 | 5/2013 | Wertheimer et al. |
| 2013/0110845 A1 | 5/2013 | Dua |
| 2013/0111374 A1 | 5/2013 | Hamilton et al. |

(56) References Cited

U.S. PATENT DOCUMENTS

| | | |
|---|---|---|
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0148504 A1 | 6/2013 | Ungureanu |
| 2013/0159512 A1 | 6/2013 | Groves et al. |
| 2013/0159815 A1 | 6/2013 | Jung et al. |
| 2013/0166724 A1* | 6/2013 | Bairavasundaram ............... G06F 9/5016 709/224 |
| 2013/0166727 A1 | 6/2013 | Wright et al. |
| 2013/0166861 A1 | 6/2013 | Takano et al. |
| 2013/0173955 A1 | 7/2013 | Hallak et al. |
| 2013/0185403 A1 | 7/2013 | Vachharajani et al. |
| 2013/0185719 A1 | 7/2013 | Kar et al. |
| 2013/0198480 A1 | 8/2013 | Jones et al. |
| 2013/0204902 A1 | 8/2013 | Wang et al. |
| 2013/0219048 A1 | 8/2013 | Arvidsson et al. |
| 2013/0219214 A1 | 8/2013 | Samanta et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232240 A1 | 9/2013 | Purusothaman et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262404 A1 | 10/2013 | Daga et al. |
| 2013/0262412 A1 | 10/2013 | Hawton et al. |
| 2013/0262746 A1 | 10/2013 | Srinivasan |
| 2013/0262762 A1 | 10/2013 | Igashira et al. |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290249 A1 | 10/2013 | Merriman et al. |
| 2013/0290263 A1 | 10/2013 | Beaverson et al. |
| 2013/0298170 A1 | 11/2013 | ElArabawy |
| 2013/0304998 A1 | 11/2013 | Palmer et al. |
| 2013/0305002 A1 | 11/2013 | Hallak et al. |
| 2013/0311740 A1 | 11/2013 | Watanabe et al. |
| 2013/0325828 A1 | 12/2013 | Larson et al. |
| 2013/0326546 A1 | 12/2013 | Bavishi et al. |
| 2013/0339629 A1 | 12/2013 | Alexander et al. |
| 2013/0346700 A1 | 12/2013 | Tomlinson, I et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0025986 A1 | 1/2014 | Kalyanaraman et al. |
| 2014/0052764 A1 | 2/2014 | Michael et al. |
| 2014/0059309 A1 | 2/2014 | Brown et al. |
| 2014/0068184 A1 | 3/2014 | Edwards et al. |
| 2014/0081906 A1 | 3/2014 | Geddam et al. |
| 2014/0081918 A1 | 3/2014 | Srivas et al. |
| 2014/0082255 A1 | 3/2014 | Powell |
| 2014/0082273 A1 | 3/2014 | Segev |
| 2014/0089264 A1 | 3/2014 | Talagala et al. |
| 2014/0089683 A1 | 3/2014 | Miller et al. |
| 2014/0095758 A1 | 4/2014 | Smith et al. |
| 2014/0095803 A1 | 4/2014 | Kim et al. |
| 2014/0101115 A1 | 4/2014 | Ko et al. |
| 2014/0101298 A1 | 4/2014 | Shukla et al. |
| 2014/0108350 A1 | 4/2014 | Marsden |
| 2014/0108797 A1 | 4/2014 | Johnson et al. |
| 2014/0108863 A1 | 4/2014 | Nowoczynski et al. |
| 2014/0129830 A1 | 5/2014 | Raudaschl |
| 2014/0143207 A1 | 5/2014 | Brewer et al. |
| 2014/0143213 A1 | 5/2014 | Tal et al. |
| 2014/0149355 A1 | 5/2014 | Gupta et al. |
| 2014/0149647 A1 | 5/2014 | Guo et al. |
| 2014/0164715 A1 | 6/2014 | Weiner et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195199 A1 | 7/2014 | Uluyol |
| 2014/0195480 A1 | 7/2014 | Talagala et al. |
| 2014/0195492 A1 | 7/2014 | Wilding et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215147 A1 | 7/2014 | Pan |
| 2014/0215170 A1 | 7/2014 | Scarpino et al. |
| 2014/0215262 A1 | 7/2014 | Li et al. |
| 2014/0223029 A1 | 8/2014 | Bhaskar et al. |
| 2014/0223089 A1 | 8/2014 | Kang et al. |
| 2014/0244962 A1 | 8/2014 | Arges et al. |
| 2014/0250440 A1 | 9/2014 | Carter et al. |
| 2014/0258681 A1 | 9/2014 | Prasky et al. |
| 2014/0259000 A1 | 9/2014 | Desanti et al. |
| 2014/0279917 A1 | 9/2014 | Minh et al. |
| 2014/0279931 A1 | 9/2014 | Gupta et al. |
| 2014/0281017 A1 | 9/2014 | Apte |
| 2014/0281055 A1 | 9/2014 | Davda et al. |
| 2014/0281123 A1 | 9/2014 | Weber |
| 2014/0281131 A1 | 9/2014 | Joshi et al. |
| 2014/0283118 A1 | 9/2014 | Anderson et al. |
| 2014/0289476 A1 | 9/2014 | Nayak |
| 2014/0297980 A1 | 10/2014 | Yamazaki |
| 2014/0304548 A1 | 10/2014 | Steffan et al. |
| 2014/0310231 A1 | 10/2014 | Sampathkumaran et al. |
| 2014/0310373 A1 | 10/2014 | Aviles et al. |
| 2014/0317093 A1 | 10/2014 | Sun et al. |
| 2014/0325117 A1 | 10/2014 | Canepa et al. |
| 2014/0325147 A1 | 10/2014 | Nayak |
| 2014/0344216 A1 | 11/2014 | Abercrombie et al. |
| 2014/0344222 A1 | 11/2014 | Morris et al. |
| 2014/0344539 A1 | 11/2014 | Gordon et al. |
| 2014/0372384 A1 | 12/2014 | Long et al. |
| 2014/0379965 A1 | 12/2014 | Gole et al. |
| 2014/0379990 A1 | 12/2014 | Pan et al. |
| 2014/0379991 A1 | 12/2014 | Lomet et al. |
| 2014/0380092 A1 | 12/2014 | Kim et al. |
| 2015/0019792 A1 | 1/2015 | Swanson et al. |
| 2015/0032928 A1 | 1/2015 | Andrews et al. |
| 2015/0039745 A1 | 2/2015 | Degioanni et al. |
| 2015/0039852 A1 | 2/2015 | Sen et al. |
| 2015/0040052 A1 | 2/2015 | Noel et al. |
| 2015/0052315 A1 | 2/2015 | Ghai et al. |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0089285 A1 | 3/2015 | Lim et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0121021 A1 | 4/2015 | Nakamura et al. |
| 2015/0127922 A1 | 5/2015 | Camp et al. |
| 2015/0134926 A1 | 5/2015 | Yang et al. |
| 2015/0169414 A1 | 6/2015 | Lalsangi et al. |
| 2015/0172111 A1 | 6/2015 | Lalsangi et al. |
| 2015/0186270 A1 | 7/2015 | Peng et al. |
| 2015/0193338 A1 | 7/2015 | Sundaram et al. |
| 2015/0199415 A1 | 7/2015 | Bourbonnais et al. |
| 2015/0213032 A1 | 7/2015 | Powell et al. |
| 2015/0220402 A1 | 8/2015 | Cantwell et al. |
| 2015/0234709 A1 | 8/2015 | Koarashi |
| 2015/0236926 A1 | 8/2015 | Wright |
| 2015/0242478 A1 | 8/2015 | Cantwell et al. |
| 2015/0244795 A1 | 8/2015 | Cantwell et al. |
| 2015/0253992 A1 | 9/2015 | Ishiguro et al. |
| 2015/0254013 A1 | 9/2015 | Chun |
| 2015/0261446 A1 | 9/2015 | Lee |
| 2015/0261792 A1 | 9/2015 | Attarde et al. |
| 2015/0269201 A1 | 9/2015 | Caso et al. |
| 2015/0286438 A1 | 10/2015 | Simionescu et al. |
| 2015/0288671 A1 | 10/2015 | Chan et al. |
| 2015/0293817 A1 | 10/2015 | Subramanian et al. |
| 2015/0301964 A1 | 10/2015 | Brinicombe et al. |
| 2015/0324236 A1 | 11/2015 | Gopalan et al. |
| 2015/0324264 A1 | 11/2015 | Chinnakkonda et al. |

(56) References Cited

U.S. PATENT DOCUMENTS

| | | |
|---|---|---|
| 2015/0339194 A1 | 11/2015 | Kalos et al. |
| 2015/0355985 A1 | 12/2015 | Holtz et al. |
| 2015/0363328 A1 | 12/2015 | Candelaria |
| 2015/0370715 A1 | 12/2015 | Samanta et al. |
| 2015/0378613 A1 | 12/2015 | Koseki |
| 2016/0004733 A1 | 1/2016 | Cao et al. |
| 2016/0011984 A1 | 1/2016 | Speer et al. |
| 2016/0014184 A1 | 1/2016 | Rehan |
| 2016/0014229 A1 | 1/2016 | Seedorf |
| 2016/0026552 A1 | 1/2016 | Holden et al. |
| 2016/0034358 A1 | 2/2016 | Hayasaka et al. |
| 2016/0048342 A1 | 2/2016 | Jia et al. |
| 2016/0070480 A1 | 3/2016 | Babu et al. |
| 2016/0070490 A1 | 3/2016 | Koarashi et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0092125 A1 | 3/2016 | Cowling et al. |
| 2016/0099844 A1 | 4/2016 | Colgrove et al. |
| 2016/0139838 A1 | 5/2016 | D'Sa et al. |
| 2016/0139849 A1 | 5/2016 | Chaw et al. |
| 2016/0149763 A1 | 5/2016 | Ingram et al. |
| 2016/0149766 A1 | 5/2016 | Borowiec et al. |
| 2016/0154834 A1 | 6/2016 | Friedman, II et al. |
| 2016/0179410 A1 | 6/2016 | Haas et al. |
| 2016/0188370 A1 | 6/2016 | Razin et al. |
| 2016/0188430 A1 | 6/2016 | Nitta et al. |
| 2016/0203043 A1 | 7/2016 | Nazari et al. |
| 2016/0283139 A1 | 9/2016 | Brooker et al. |
| 2016/0350192 A1 | 12/2016 | Doherty et al. |
| 2016/0371021 A1 | 12/2016 | Goldberg et al. |
| 2017/0003892 A1 | 1/2017 | Sekido et al. |
| 2017/0017413 A1 | 1/2017 | Aston et al. |
| 2017/0031769 A1 | 2/2017 | Zheng et al. |
| 2017/0031774 A1 | 2/2017 | Bolen et al. |
| 2017/0046257 A1 | 2/2017 | Babu et al. |
| 2017/0068599 A1 | 3/2017 | Chiu et al. |
| 2017/0083535 A1 | 3/2017 | Marchukov et al. |
| 2017/0097873 A1 | 4/2017 | Krishnamachari et al. |
| 2017/0109298 A1 | 4/2017 | Kurita et al. |
| 2017/0123726 A1 | 5/2017 | Sinclair et al. |
| 2017/0212690 A1 | 7/2017 | Babu et al. |
| 2017/0220777 A1 | 8/2017 | Wang et al. |
| 2017/0300248 A1 | 10/2017 | Purohit et al. |
| 2017/0351543 A1 | 12/2017 | Kimura |
| 2018/0081832 A1* | 3/2018 | Longo .................. G06F 13/1689 |
| 2018/0287951 A1 | 10/2018 | Waskiewicz, Jr. et al. |

FOREIGN PATENT DOCUMENTS

| | | |
|---|---|---|
| EP | 2693358 A1 | 2/2014 |
| EP | 2735978 A1 | 5/2014 |
| WO | 2006050455 A2 | 5/2006 |
| WO | 2012132943 A1 | 10/2012 |

OTHER PUBLICATIONS

Extended Search Report received for European Patent Application No. 12863372.4 dated Jul. 16, 2015, 8 pages.
Gulati, Ajay et al., "BASIL: Automated IO Load Balancing Across Storage Devices," USENIX, (Jan. 14, 2010), pp. 1-14.
Van Den Bogaerdt, "Rates, Normalizing and Consolidating", RRDtool Support, http://www.vandenbogaerdt.nl/rrdtool/process.php, 5 pages.
Lim H., et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Metreveli et al. "CPHash: A Cache-Partitioned Hash Table." Nov. 2011 https://people.csail.mit.edu/nickolai/papers/metrevelicphash-tr.pdf.
Moshayedi M., et al., "Enterprise SSDs," ACM Queue—Enterprise Flash Storage, Jul.-Aug. 2008, vol. 6 (4), pp. 32-39.
Odlevak, "Simple Kexec Example", https://www.linux.com/blog/simple-kexec-example, accessed on Feb. 5, 2019 (Year: 2011), 4 pages.
Oetiker, "rrdfetch," http ://oss.oetiker.ch/rrdtool/dodrrdfetch .en. html, Date obtained from the internet: Sep. 9, 2014, 5 pages.
Oetiker, "rrdtool," http ://loss. oetiker.ch/rrdtool/dodrrdtool.en. html Date obtained from the internet: Sep. 9, 2014, 5 pages.
O'Neil P., at al., "The Log-structured Merge-tree (lsm-tree)," Acta Informatica, 33, 1996, pp. 351-385.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
"Pivot Root", Die.net, retrieved from https://linux.die.net/pivot_root on Nov. 12, 2011 (Year: 2012).
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1), Feb. 1992, pp. 26-52.
Rosenblum M., et al., "The Design and Implementation of a Log-Structured File System," (SUN00006867—SUN00006881), Jul. 1991, 15 pages.
Rosenblum M., et al., "The Design and Implementation of a Log-Structured File System,"Proceedings of the 13th ACM Symposium on Operating Systems Principles, (SUN00007382—SUN00007396), Jul. 1991, 15 pages.
Rosenblum M., et al., "The LFS Storage Manager," USENIX Technical Conference, Anaheim, CA, (Sun 00007397—SUN00007412), Jun. 1990, 16 pages.
Rosenblum M., et al., "The LFS Storage Manager," USENIX Technical Conference, Computer Science Division, Electrical Engin. and Computer Sciences, Anaheim, CA, presented at Summer '90 USENIX Technical Conference, SUN00006851—SUN00006866), Jun. 1990, 16 pages.
Rosenblum M., "The Design and Implementation of a Log-Structured File System," UC Berkeley, 1992, pp. 1-101.
Sears., et al., "Blsm: A General Purpose Log Structured Merge Tree," Proceedings of the 2012 ACM SIGMOD International Conference on Management, 2012, 12 pages.
Seltzer M., et al., "An Implementation of a Log Structured File System for UNIX," Winter USENIX, San Diego, CA, Jan. 25-29, 1993, pp. 1-18.
Seltzer M.I., et al., "File System Performance and Transaction Support," University of California at Berkeley Dissertation, 1992, 131 pages.
Smith K., "Garbage Collection," Sand Force, Flash Memory Summit, Santa Clara, CA, Aug. 2011, pp. 1-9.
Stoica et al. "Chord: A Scalable Peer-to-peer Lookup Service for Internet Applications." Aug. 2001. ACM. SIGCOMM 01.
Texas Instruments, User Guide, TMS320C674x/OMAP-L1 x Processor Serial ATA (SATA) Controller, Mar. 2011, 76 pages.
Twigg A., et al., "Stratified B-trees and Versioned Dictionaries," Proceedings of the 3rd US EN IX Conference on Hot Topics in Storage and File Systems, 2011, vol. 11, pp. 1-5.
Waskiewicz, PJ, "Scaling With Multiple Network Namespaces in a Single Application", Netdev 1.2—The Technical Conferenceon Linux Networking, retrieved from intemet: URL; https://netdevconf.org/1.2/papers/pj-netdev-1.2pdf Dec. 12, 2016, 5 pages.
Wei, Y. And D. Shin, "NAND Flash Storage Device Performance in Linux File System," 6th International Conference on Computer Sciences and Convergence Information Technology (ICCIT), 2011.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.

(56) References Cited

OTHER PUBLICATIONS

Wu P-L., et al., "A File-System-Aware FTL Design for Flash-Memory Storage Systems," IEEE, Design, Automation & Test in Europe Conference & Exhibition, 2009, pp. 1-6.
Yossef, "BuildingMurphy-compatible embedded Linux Systems", Proceedings of the Linux Symposium, Ottawa, Ontario Canada, Jul. 20-23, 2005 (Year: 2005).
Agrawal, et al., "Design Tradeoffs for SSD Performance," USENIX Annual Technical Conference, 2008, 14 Pages.
Alvaraez C., "NetApp Deduplication for FAS and V-Series Deployment and Implementation Guide," Technical Report TR-3505, 2011, 75 pages.
Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bitton D. et al., "Duplicate Record Elimination in Large Data Files," Oct. 26, 1999, 11 pages.
Bogaerdt, "cdeftutorial," http://oss.oetiker.ch/rrdtool/tut/cdeftutorial.en.html Date obtained from the internet, Sep. 9, 2014, 14 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm.edu/howmany.shtml.
Cornwellm., "Anatomy of a Solid-state Drive," ACM Queue-Networks, Oct. 2012, vol. 10 (10), pp. 1-7.
Culik K., et al., "Dense Multiway Trees," ACM Transactions on Database Systems, Sep. 1981, vol. 6 (3), pp. 486-512.
Debnath B., et al., "FlashStore: High Throughput Persistent Key-Value Store," Proceedings of the VLDB Endowment VLDB Endowment, Sep. 2010, vol. 3 (1-2), pp. 1414-1425.
Debnath, et al., "ChunkStash: Speeding up In line Storage Deduplication using Flash Memory," USENIX, USENIX ATC '10, Jun. 2010, 15 pages.
Dictionary definition for references, retrieved from: http://www.dictionary.com/browse/reference?s=t on Dec. 23, 2017.
Enclopedia entry for pointers vs. references, retrieved from: https://www.geeksforgeeks.org/pointers-vs-references-cpp/ on Dec. 23, 2017.
Extended European Search Report dated Apr. 9, 2018 for EP Application No. 15855480.8 filed Oct. 22, 2015, 7 pages.
Fan, et al., "MemC3: Compact and Concurrent MemCache with Dumber Caching and Smarter Flashing," USENIX NSDI '13, Apr. 2013, pp. 371-384.
Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.
Gray J., et al., "Flash Disk Opportunity for Server Applications," Queue—Enterprise Flash Storage, Jul.-Aug. 2008, vol. 6 (4), pp. 18-23.
Handy J., "SSSI Tech Notes: How Controllers Maximize SSD Life," SNIA, Jan. 2013, pp. 1-20.

Hwang K., et al., "RAID-x: A New Distributed Disk Array for I/O-centric Cluster Computing," IEEE High-Performance Distributed Computing, Aug. 2000, pp. 279-286.
IBM Technical Disclosure Bulletin, "Optical Disk Axial Runout Test", vol. 36, No. 10, NN9310227, Oct. 1, 1993, 3 pages.
Intel, Product Specification—Intel® Solid-State Drive DC S3700, Jun. 2013, 32 pages.
International Search Report and Written Opinion for Application No. PCT/EP2014/071446 dated Apr. 1, 2015, 14 pages.
International Search Report and Written Opinion for Application No. PCT/US2014/035284 dated Apr. 1, 2015, 8 pages.
International Search Report and Written Opinion for Application No. PCT/US2014/055138 dated Dec. 12, 2014, 13 pages.
International Search Report and Written Opinion for Application No. PCT/US2014/058728 dated Dec. 16, 2014, 11 pages.
International Search Report and Written Opinion for Application No. PCT/US2014/060031 dated Jan. 26, 2015, 9 pages.
International Search Report and Written Opinion for Application No. PCT/US2014/071446 dated Apr. 1, 2015, 13 pages.
International Search Report and Written Opinion for Application No. PCT/US2014/071465 dated Mar. 25, 2015, 12 pages.
International Search Report and Written Opinion for Application No. PCT/US2014/071484 dated Mar. 25, 2015, 9 pages.
International Search Report and Written Opinion for Application No. PCT/US2014/071581 dated Apr. 10, 2015, 9 pages.
International Search Report and Written Opinion for Application No. PCT/US2014/071635 dated Mar. 31, 2015, 13 pages.
International Search Report and Written Opinion for Application No. PCT/US2015/016625 dated Sep. 17, 2015, 8 pages.
International Search Report and Written Opinion for Application No. PCT/US2015/021285 dated Jun. 23, 2015, 8 pages.
International Search Report and Written Opinion for Application No. PCT/US2015/024067 dated Jul. 8, 2015, 7 pages.
International Search Report and Written Opinion for Application No. PCT/US2015/048800 dated Nov. 25, 2015, 11 pages.
International Search Report and Written Opinion for Application No. PCT/US2015/048810 dated Dec. 23, 2015, 11 pages.
International Search Report and Written Opinion for Application No. PCT/US2015/048833 dated Nov. 25, 2015, 11 pages.
International Search Report and Written Opinion for Application No. PCT/US2015/056932 dated Jan. 21, 2016, 11 pages.
International Search Report and Written Opinion for Application No. PCT/US2015/057532 dated Feb. 9, 2016, 12 pages.
International Search Report and Written Opinion for Application No. PCT/US2016/059943 dated May 15, 2017, 14 pages.
International Search Report and Written Opinion for Application No. PCT/US2018/025951, dated Jul. 18, 2018, 16 pages.
Jones, M. Tim, "Next-generation Linux file systems: NiLFS(2) and eofs," IBM, 2009.
Jude Nelson "Syndicate: Building a Virtual Cloud Storage Service Through Service Composition" Princeton University, 2013, pp. 1-14.
Kagel A.S, "two-way merge sort," Dictionary of Algorithms and Data Structures [online], retrieved on Jan. 28, 2015, Retrieved from the Internet : URL: http://xlinux.nist.gov/dads/HTMUIwowaymrgsrl.html, May 2005, 1 page.
Konishi, R., Sato, K, andY. Amagai, "Filesystem Support for Continuous Snapshotting," Ottawa Linux Symposium, 2007.
Lamport L., "The Part-Time Parliament," ACM Transactions on Computer Systems, May 1998, vol. 16 (2), pp. 133-169.
Leventhal A.H., "A File System All its Own," Communications of the ACM Queue, May 2013, vol. 56 (5), pp. 64-67.

* cited by examiner

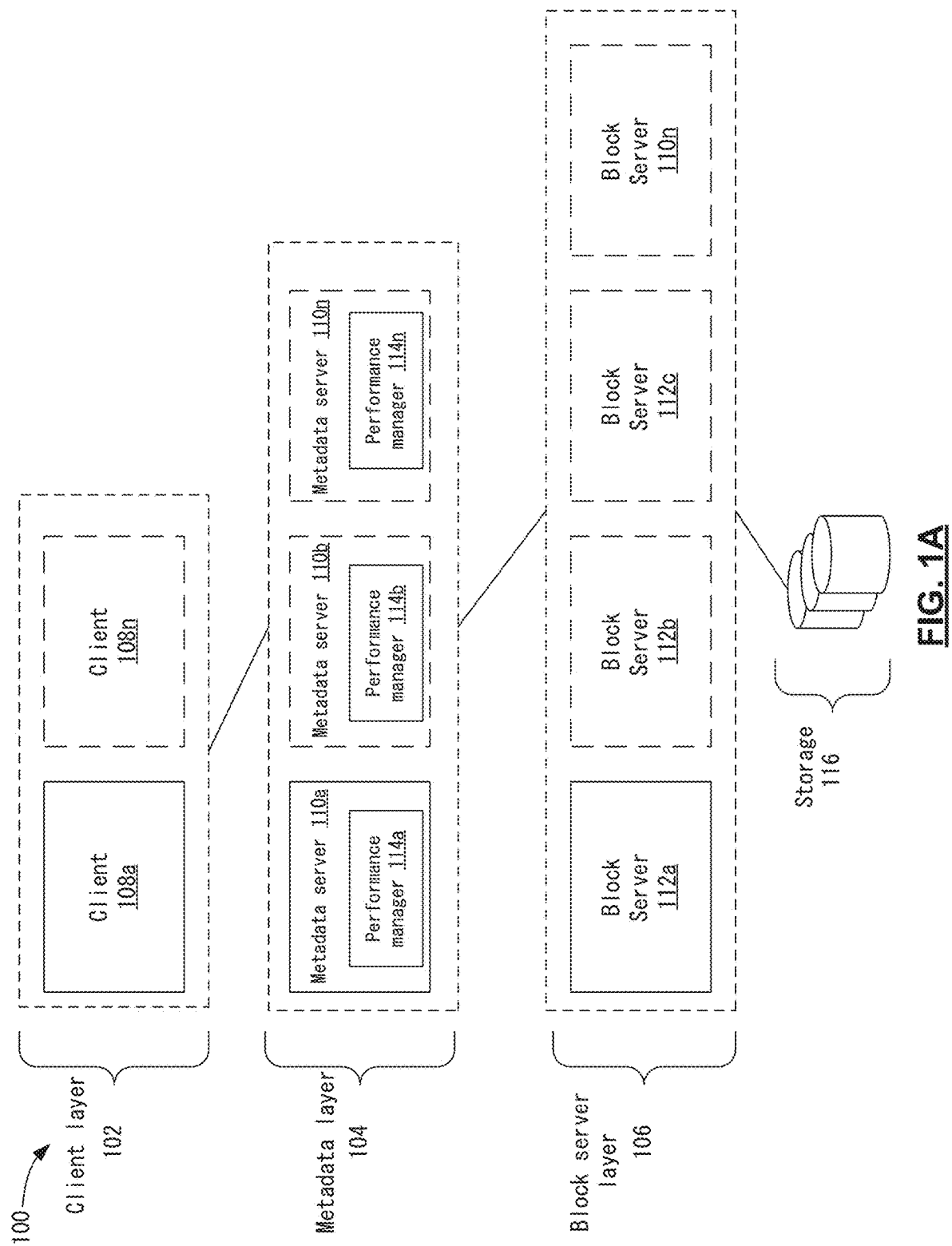

FIG. 10

| Service_ID (1002) | Load(Service) (1004) | |
|---|---|---|
| Service A | Value A1 | ← 1001 |
| Service B | Value B1 | ← 1003 |
| Service C | Value C1 | ← 1005 |
| ⋮ | ⋮ | |

| Service_ID (1102) | Load(Read) (1104) | Load(Write) (1106) | |
|---|---|---|---|
| Service A | Value A2 | Value A3 | ← 1101 |
| Service B | Value B2 | Value B3 | ← 1103 |
| Service C | Value C2 | Value C3 | ← 1105 |
| ⋮ | ⋮ | ⋮ | |

| Client_ID (1202) | Primary Slice Service_ID (1204) | Associated Replication Service_ID(s) (1206) | |
|---|---|---|---|
| Client A | Service A | Service C | ← 1201 |
| Client B | Service E | Service D | ← 1203 |
| Client C | Service E | Service C, Service G | ← 1205 |
| ⋮ | ⋮ | ⋮ | |

↳ 1200

RULE-BASED PERFORMANCE CLASS ACCESS MANAGEMENT FOR STORAGE CLUSTER PERFORMANCE GUARANTEES

CROSS-REFERENCE TO RELATED APPLICATIONS

This application is a continuation of U.S. patent application Ser. No. 15/832,342 filed Dec. 5, 2017, entitled MANAGING CLIENT ACCESS FOR STORAGE CLUSTER PERFORMANCE GUARANTEES, by David D. Wright et al., which is a continuation of U.S. patent application Ser. No. 13/856,958 filed Apr. 4, 2013, entitled QUALITY OF SERVICE POLICY BASED LOAD ADAPTION, by David D. Wright et al., now issued as U.S. Pat. No. 9,838,269 on Dec. 5, 2017, which is a continuation of PCT Patent Application No. PCT/US12/71844, filed on Dec. 27, 2012, entitled PROPORTIONAL QUALITY OF SERVICE BASED ON CLIENT USAGE AND SYSTEM METRICS, by David D. Wright et al., which is a continuation-in-part of U.S. patent application Ser. No. 13/338,039, filed on Dec. 27, 2011, entitled MANAGEMENT OF STORAGE SYSTEM ACCESS BASED ON CLIENT PERFORMANCE AND CLUSER HEALTH, by David D. Wright et al., now issued as U.S. Pat. No. 9,003,021 on Apr. 7, 2015, and also claims the benefit of U.S. Provisional Patent Application Ser. No. 61/697,905, filed on Sep. 7, 2012, entitled a PERFORMANCE VIRTUALIZATION AND QoS PROVISIONING IN DISTRIBUTED STORAGE ARRAY ENVIRONMENTS, by David D. Wright et al., all of which are hereby incorporated by reference.

BACKGROUND

The following description is provided to assist the understanding of the reader. None of the information provided is admitted to be prior art.

In data storage architectures, a client's data may be stored in a volume. Typically, the volume's data resides on a small percentage of drives in a storage cluster. This arrangement leads to issues of hot spots where portions of the cluster are over-utilized while other portions of the cluster are under-utilized. For example, if a client is performing a large number of accesses of data in the volume, the load attributed to the small percentage of drives in which the data is stored increases, resulting in a hot spot. This arrangement may result in a client experience that is inconsistent across all volumes of the cluster as some clients may experience good performance if their data is stored on portions that are under-utilized and some clients experience poor performance if their data is stored on over-utilized portions.

One way of attempting to provide a better client experience is using quality of service based on client prioritization. For example, clients may be assigned different priority levels. Based on these priority levels, access requests (e.g., read and write requests) for various clients are prioritized. Clients' access requests are dispatched based on the load of the cluster and a priority assigned to each client. For example, a client having a higher priority may have more access requests processed than another client having a lower priority during times when the cluster is experiencing higher load. Using the priority system only allows for a slightly better client experience. For example, priorities do not guarantee a specific, consistent level of performance and are based on the idea that the cluster is dividing its full performance among all clients all the time. One reason for this is that a single client's effects on performance of the cluster are not capped, when the system is stressed, the system always runs slow regardless of how many customers are on the system since it is still running prioritized. Prioritization also makes it difficult for customer to understand the actual performance they are receiving, because prioritization does not extend an understandable idea to customers of the actual performance the customers are getting. Also, prioritization does not allow administrators to control how the system supports multiple customers and how the customers drive the system to load.

BRIEF DESCRIPTION OF THE DRAWINGS

The foregoing and other features of the present disclosure will become more fully apparent from the following description and appended claims, taken in conjunction with the accompanying drawings.

FIG. 1A depicts a simplified system for performance management in a storage system in accordance with an illustrative implementation.

FIG. 10 illustrates a specific example embodiment of a LOAD-Service data structure.

FIG. 11 illustrates an alternate example embodiment of a LOAD-Service data structure 1100 which may be configured or designed for tracking system load characteristics and conditions associated with different services which are running within the storage system.

FIG. 12 illustrates a specific example embodiment of a Client-Service data structure.

DETAILED DESCRIPTION OF EXAMPLE EMBODIMENTS

Overview

Figure 1B:
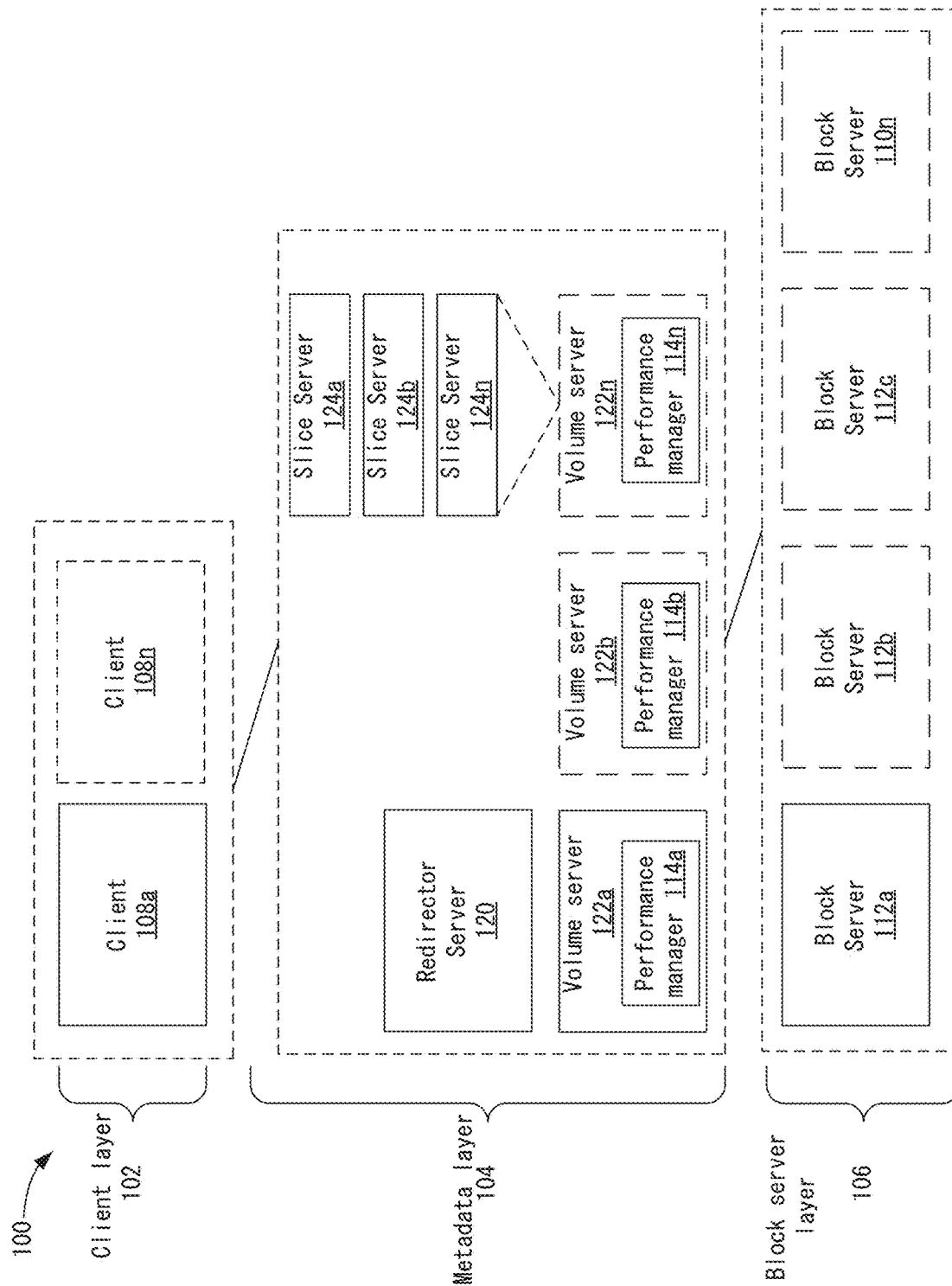
FIG. 1B depicts a more detailed example of a system in accordance with an illustrative implementation.

In general, one aspect of the subject matter described in this specification can be embodied in methods for determining client metrics of a volume in a storage system for a first client of a plurality of clients. The storage system stores data from the plurality of clients. System metrics of a cluster in the storage system are determined based upon use of the storage system by the plurality of clients. A load value of the storage system is determined based upon the system metrics and the client metrics. The load value is determined to be above a predefined threshold. A target performance value is calculated based upon the load value, a minimum quality of service value, and a maximum quality of service value. Performance of the storage system is adjusted for the client based upon the target performance value and the determining the load value is above the predefined threshold. Other implementations of this aspect include corresponding systems, apparatuses, and computer-readable media configured to perform the actions of the method.

Another aspect of the subject matter described in this specification can be embodied in methods for managing performance in a storage system storing data for a plurality of data volumes, wherein an individual data volume has an associated client. A selection of a performance class of use for an individual data volume is received. The performance class of use is selected from a plurality of performance classes in which at least one performance class of use has a different Input Output Per Second (IOPS) quality of service parameter. Access to the individual data volume is managed based on the IOPS quality of service parameter of the selected performance class of use. Other implementations of this aspect include corresponding systems, apparatuses, and computer-readable media configured to perform the actions of the method.

Another aspect of the subject matter described in this specification can be embodied in methods for determining a load value associated with access of data stored in a storage system for a client. The data is divided into a plurality of blocks and are stored substantially evenly across a plurality of nodes of the storage system. The storage system includes data from a plurality of clients. A requested quality of service parameter from the client is received. Access of the data according to the requested quality of service parameter is monitored. Access to the data is throttled based upon the monitoring access of the data. Other implementations of this aspect include corresponding systems, apparatuses, and computer-readable media configured to perform the actions of the method.

Another aspect of the subject matter described in this specification can be embodied in methods for determining an input/output operations per second (IOPS) metric associated with access of data stored in a storage system for a client. The data is divided into a plurality of blocks and the plurality of blocks are stored substantially evenly across a plurality of nodes of the storage system. The storage system includes data from a plurality of clients. A requested IOPS value is received. Access to the data is relegated based upon the requested IOPS value. Other implementations of this aspect include corresponding systems, apparatuses, and computer-readable media configured to perform the actions of the method.

Another aspect of the subject matter described in this specification can be embodied in methods for receiving a minimum performance quality of service parameter associated with a compute device accessing a storage system volume. System metrics associated with the storage system volume are received. A target performance value associated with the compute device is calculated based on the minimum performance quality of service metrics and the system metrics. The target performance value is sent to a controller module when the target performance value satisfies the minimum performance quality of service metric such that the controller module limits a performance of the compute device accessing the storage system volume to the target performance value. Other implementations of this aspect include corresponding systems, apparatuses, and computer-readable media configured to perform the actions of the method.

Another aspect of the subject matter described in this specification can be embodied in methods for determining a total amount of capacity for a storage system. The capacity is defined by a quality of service parameter. A plurality of values of the quality of service parameter that are provisioned for a plurality of clients to access the storage system are received. Each client in the plurality of clients is provisioned with a value of the quality of service parameter. The plurality of values that are provisioned for the plurality of clients in the storage system are monitored and determined if the plurality of values violate a threshold. The threshold being based on the total amount of capacity for the storage system. A signal is automatically output when the plurality of values violate the threshold to indicate an adjustment in a value of the quality of service parameter for one or more clients or the total amount of capacity for the storage system should be performed. Other implementations of this aspect include corresponding systems, apparatuses, and computer-readable media configured to perform the actions of the method.

Another aspect of the subject matter described in this specification can be embodied in methods for provisioning a plurality of clients with quality of service parameters to access a storage system. Access of the storage system by the plurality of clients is monitored. Performance of a client in the plurality of clients in accessing the storage system is monitored. The performance of the client in accessing the storage system is controlled based on the quality of service parameters in which the client is provisioned. The performance of the client and the access of the storage system by the plurality of clients is analyzed to determine a target performance value for the client. Control of the client in accessing the storage system is dynamically adjusted to adjust the performance of the client based on the quality of service parameters. Other implementations of this aspect include corresponding systems, apparatuses, and computer-readable media configured to perform the actions of the method.

Another aspect of the subject matter described in this specification can be embodied in methods for provisioning a plurality of clients with a quality of service parameters to access a storage system. Performance of a client in the plurality of clients in accessing the storage system is monitored. The performance of the client in accessing the storage system is independently controlled based on the quality of service parameters in which the client is provisioned without regard to quality of service parameters provisioned for other clients in the plurality of clients. A load value for the client is calculated based upon the use of the storage system by the client and the quality of service parameters. The performance of the client is analyzed with respect to the quality of service parameters for the client to determine a difference between the performance and the load value. Access to resources of the storage system is dynamically allocated to independently adjust control of the performance of the client based on the difference between the performance and the load value. Other implementations of this aspect include corresponding systems, apparatuses, and computer-readable media configured to perform the actions of the method.

Another aspect of the subject matter described in this specification can be embodied in methods for adjusting client access to data within a server system. A volume server in communication with the client receives a request from the client to access data. A performance manager monitors metrics and adjusts the client's access to the data in response to comparing the metrics against a target value. Other implementations of this aspect include corresponding systems, apparatuses, and computer-readable media configured to perform the actions of the method.

Another aspect of the subject matter described in this specification can be embodied in methods for adjusting access by a client to data within a server system. A target value indicating a target client metric is received. A request by the client to access the data within the server system is received. The client performance is compared to the target value and based upon the comparison to the target value, the client's access to the data is adjusted.

The foregoing summary is illustrative only and is not intended to be in any way limiting. In addition to the illustrative aspects, implementations, and features described above, further aspects, implementations, and features will become apparent by reference to the following drawings and the detailed description.

SPECIFIC EXAMPLE EMBODIMENTS

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

DETAILED DESCRIPTION

Described herein are techniques for a performance management storage system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

FIG. 1A depicts a simplified system for performance management in a storage system 100 in accordance with an illustrative implementation. System 100 includes a client layer 102, a metadata layer 104, a block server layer 106, and storage 116.

Before discussing how particular implementations manage performance of clients 108, the structure of a possible system is described. Client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks that may not be networked together. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and slice servers 124 maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

FIG. 1B depicts a more detailed example of system 100 according to one implementation. Metadata layer 104 may include a redirector server 120 and multiple volume servers 122. Each volume server 122 may be associated with a plurality of slice servers 124.

In this example, client 108a wants to connect to a volume (e.g., client address). Client 108a communicates with redirector server 120, identifies itself by an initiator name, and also indicates a volume by target name that client 108a wants to connect to. Different volume servers 122 may be responsible for different volumes. In this case, redirector server 120 is used to redirect the client to a specific volume server 122. To client 108, redirector server 120 may represent a single point of contact. The first request from client 108a then is redirected to a specific volume server 122. For example, redirector server 120 may use a database of volumes to determine which volume server 122 is a primary volume server for the requested target name. The request from client 108a is then directed to the specific volume server 122 causing client 108a to connect directly to the specific volume server 122. Communications between client 108a and the specific volume server 122 may then proceed without redirector server 120.

Volume server 122 performs functions as described with respect to metadata server 110. Additionally, each volume server 122 includes a performance manager 114. For each volume hosted by volume server 122, a list of block identifiers is stored with one block identifier for each logical block on the volume. Each volume may be replicated between one or more volume servers 122 and the metadata for each volume may be synchronized between each of the volume servers 122 hosting that volume. If volume server 122 fails, redirector server 120 may direct client 108 to an alternate volume server 122.

In one implementation, the metadata being stored on volume server 122 may be too large for one volume server 122. Thus, multiple slice servers 124 may be associated with each volume server 122. The metadata may be divided into slices and a slice of metadata may be stored on each slice server 124. When a request for a volume is received at volume server 122, volume server 122 determines which slice server 124 contains metadata for that volume. Volume server 122 then routes the request to the appropriate slice server 124. Accordingly, slice server 124 adds an additional layer of abstraction to volume server 122.

The above structure allows storing of data evenly across the cluster of disks. For example, by storing data based on block identifiers, data can be evenly stored across drives of a cluster. As described above, data evenly stored across the cluster allows for performance metrics to manage load in system 100. If the system 100 is under a load, clients can be throttled or locked out of a volume. When a client is locked out of a volume, metadata server 110 or volume server 122 may close the command window or reduce or zero the amount of read or write data that is being processed at a time for client 108. The metadata server 110 or the volume server 122 can queue access requests for client 108, such that IO requests from the client 108 can be processed after the client's access to the volume resumes after the lock out period.

Performance Metrics and Load of the Storage System

The storage system 100 can also include a performance manager 114 that can monitor clients' use of the storage system's resources. In addition, performance manager 114 can regulate the client's use of the storage system 100. The client's use of the storage system can be adjusted based upon performance metrics, the client's quality of service parameters, and the load of the storage system. Performance metrics are various measurable attributes of the storage system. One or more performance metrics can be used to calculate a load of the system, which, as described in greater detail below, can be used to throttle clients of the system.

Performance metrics can be grouped in different categories of metrics. System metrics is one such category. System metrics are metrics that reflect the use of the system or components of the system by all clients. System metrics can include metrics associated with the entire storage system or with components within the storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined for at the system level, service level, and the node level. Other examples of system metrics include measured or aggregated metrics such as read latency, write latency, input/output operations per second (IOPS), read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients 108 and the volume of data. Read latency can be the time taken for the system 100 to read data from a volume and return the data to a client. Write latency can be the time taken for the system to write data and return a success indicator to the client. Workload type can indicate if IO access is sequential or random. The data type can identify the type of data being accessed/written, e.g., text, video, images, audio, etc. The write cache capacity refers to a write cache or a node, a block server, or a volume server. The write cache is relatively fast memory that is used to store data before it is written to storage 116. As noted above, each of these metrics can be independently calculated for the system, a cluster, a node, etc. In addition, these values can also be calculated at a client level.

Client metrics are another category of metrics that can be calculated. Unlike system metrics, client metrics are calculated taking into account the client's use of the system. As described in greater detail below, a client metric may include use by other client's that are using common features of the system. Client metrics, however, will not include use of non-common features of the system by other clients. In one implementation, client metrics can include the same metrics as the system metrics, but rather than being component or system wide, are specific to a volume of the client. For example, metrics such as read latency or write IOPS can be monitored for a particular volume of a client.

Metrics, both system and client, can be calculated over a period of time, e.g., 250 ms, 500 ms, 1 s, etc. Accordingly, different values such as a min, max, standard deviation, average, etc., can be calculated for each metric. One or more of the metrics can be used to calculate a value that represents a load of the storage system. As described in greater detail below, various different load calculations can be calculated. Loads can be calculated for the storage system as a whole, for individual components, for individual services, and/or individual clients. Load values, e.g., system load values and/or client load values, can then be used by the quality of service system to determine if and how clients should be throttled.

As described in greater detail below, performance for individual clients can be adjusted based upon the monitored metrics. For example, based on a number of factors, such as system metrics, client metrics, and client quality of service parameters, a number of IOPS that can be performed by a client 108 over a period of time may be managed. In one implementation, performance manager 114 regulates the number of IOPS that are performed by locking client 108 out of a volume for different amounts of time to manage how many IOPS can be performed by client 108. For example, when client 108 is heavily restricted, client 108 may be locked out of accessing a volume for 450 milliseconds every 500 milliseconds and when client 108 is not heavily restricted, client 108 is blocked out of a volume every 50 milliseconds for every 500 milliseconds. The lockout effectively manages the number of IOPS that client 108 can perform every 500 milliseconds. Although examples using IOPS are described, other metrics may also be used, as will be described in more detail below.

The use of metrics to manage load in system 100 is possible because a client's effect on global cluster performance is predictable due to the evenness of distribution of data, and therefore, data load. For example, by locking out client 108 from accessing the cluster, the load in the cluster may be effectively managed. Because load is evenly distributed, reducing access to the client's volume reduces that client's load evenly across the cluster. However, conventional storage architectures where hot spots may occur result in unpredictable cluster performance. Thus, reducing access by a client may not alleviate the hot spots because the client may not be accessing the problem areas of the cluster. Because in the described embodiment, client loads are evenly distributed through the system, a global performance pool can be calculated and individual client contributions to how the system is being used can also be calculated.

Client Quality of Service Parameters

In addition to system metrics and client metrics, client quality of service (QoS) parameters can be used to affect how a client uses the storage system. Unlike metrics, client QoS parameters are not measured values, but rather variables than can be set that define the desired QoS bounds for a client. Client QoS parameters can be set by an administrator or a client. In one implementation, client QoS parameters include minimum, maximum, and max burst values. Using IOPS as an example, a minimum IOPS value is a proportional amount of performance of a cluster for a client. Thus, the minimum IOPS is not a guarantee that the volume will always perform at this minimum IOPS value. When a volume is in an overload situation, the minimum IOPS value is the minimum number of IOPS that the system attempts to provide the client. However, based upon cluster performance, an individual client's IOPS may be lower or higher than the minimum value during an overload situation. In one implementation, the system 100 can be provisioned such that the sum of the minimum IOPS across all clients is such that the system 100 can sustain the minimum IOPS value for all clients at a given time. In this situation, each client should be able to perform at or above its minimum IOPS value. The system 100, however, can also be provisioned such that the sum of the minimum IOPS across all clients is such that the system 100 cannot sustain the minimum IOPS for all clients. In this case, if the system becomes overloaded through the use of all clients, the client's realized IOPS can be less than the client's minimum IOPS value. In failure situations, the system may also throttle users such that their realized IOPS are less than their minimum IOPS value. A maximum IOPS parameter is the maximum sustained IOPS value over an extended period of time. The max burst IOPS parameter is the maximum IOPS value that a client can "burst" above the maximum IOPS parameter for a short period of time based upon credits. In one implementation, credits for a client are accrued when the client is operating under their respective maximum IOPS parameter. Accordingly, a client will only be able to use the system in accordance with their respective maximum IOPS and maximum burst IOPS parameters. For example, a single client will not be able to use the system's full resources, even if they are available, but rather, is bounded by their respective maximum IOPS and maximum burst IOPS parameters.

Figure 2:
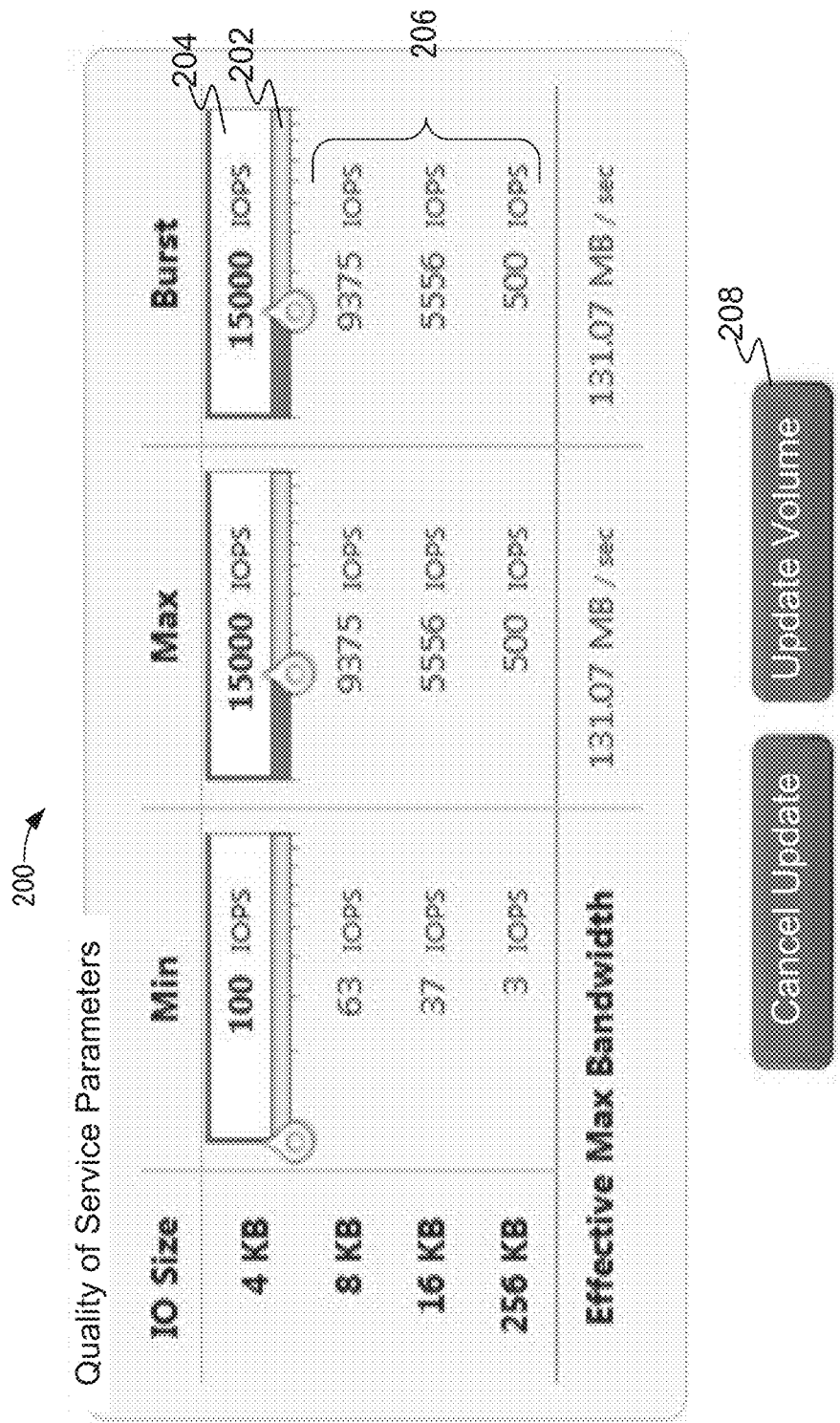
FIG. 2 depicts a user interface for setting quality of service parameters in accordance with an illustrative implementation.

As noted above, client QoS parameters can be changed at any time by the client or an administrator. FIG. 2 depicts a user interface 200 for setting client QoS in accordance with one illustrative implementation. The user interface 200 can include inputs that are used to change various QoS parameters. For example, slide bars 202 and/or text boxes 204 can be used to adjust QoS parameters. As noted above in one implementation, client QoS parameters include a minimum IOPS, a maximum IOPS, and a maximum burst IOPS. Each of these parameters can be adjusted with inputs, e.g., slide bars and/or text boxes. In addition, the IOPS for different size IO operations can be shown. In the user interface 200, the QoS parameters associated with 4k sized IO operations are changed. When any performance parameter is changed, the corresponding IOPS for different sized IO operations are automatically adjusted. For example, when the burst parameter is changed, IOPS values 206 are automatically adjusted.

The updated values can be based upon a performance curve as described in greater detail below. Once the QoS parameters have been set, activating a save changes button 208 updates the client's QoS parameters. As described below, the target performance manager 402 can use the updated QoS parameters, such that the updated QoS parameters take effect immediately. The updated QoS parameters take effect without requiring any user data to be moved in the system.

Performance Management

Figure 3:
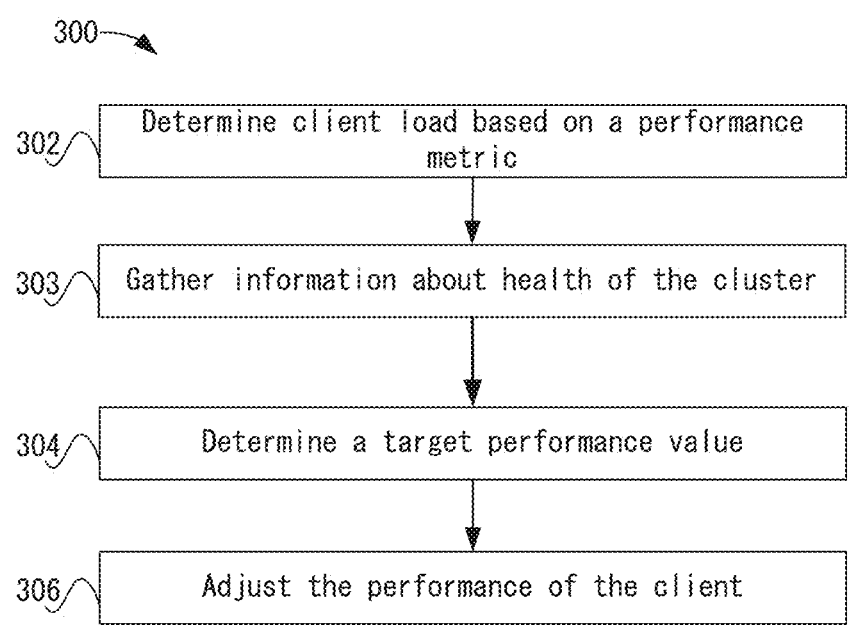
FIG. 3 depicts a simplified flowchart of a method of performing performance management in accordance with an illustrative implementation.

FIG. 3 depicts a simplified flowchart 300 of a method of performing performance management according to one implementation. Additional, fewer, or different operations of the method 300 may be performed, depending on the particular embodiment. The method 300 can be implemented on a computing device. In one implementation, the method 300 is encoded on a computer-readable medium that contains instructions that, when executed by a computing device, cause the computing device to perform operations of the method 300.

At 302, performance manager 114 determines a client load based on one or more performance metrics. For example, performance manager 114 may calculate a client's load based on different performance metrics, such as IOPS, bandwidth, and latency. The metrics may be historical metrics and/or current performance metrics. Historical performance may measure previous performance for an amount of time, such as the last week of performance metrics. Current performance may be real-time performance metrics. Using these performance metrics, e.g., system metrics and/or client metrics, a load value is calculated. Example load values are described in greater detail below.

At 303, performance manager 114 gathers information about health of the cluster. The health of the cluster may be information that can quantify performance of the cluster, such as a load value. The cluster health information may be gathered from different parts of system 100, and may include health in many different aspects of system 100, such as system metrics and/or client metrics. In addition and as described in greater detail below, cluster health information can be calculated as a load value from the client and/or system metrics. As described in greater detail below, the health information may not be cluster-wide, but may include information that is local to the volume server 122 that is performing the performance management. The cluster health may be affected; for example, if there is a cluster data rebuild occurring, total performance of the cluster may drop. Also, when data discarding, adding or removing of nodes, adding or removing of volumes, power failures, used space, or other events affecting performance are occurring, performance manager 114 gathers this information from the cluster.

At 304, performance manager 114 determines a target performance value. For example, based on the load values and client quality of service parameters, a target performance value is determined. As will be described in more detail below, the target performance value may be based on different criteria, such as load values, client metrics, system metrics, and quality of service parameters. The target performance value is the value at which performance manager 114 would like client 108 to operate. For example, the target performance may be 110 IOPS.

At 306, performance manager 114 adjusts the performance of client 108. For example, the future client performance may be adjusted toward the target performance value. If IOPS are being measured as the performance metric, the number of IOPS a client 108 performs over a period of time may be adjusted to the target performance value. For example, latency can be introduced or removed to allow the number of IOPS that a client can perform to fluctuate. In one example, if the number of IOPS in the previous client performance is 80 and the target performance value is 110 IOPS, then the performance of the client is adjusted to allow client 108 to perform more IOPS such that the client's performance moves toward performing 110 IOPS.

Traditional provisioning systems attempt to achieve a quality of service by placing a client's data on a system that should provide the client with the requested quality of service. A client requesting a change to their quality of service, therefore, can require that the client's data be moved from one system to another system. For example, a client that wants to greatly increase its quality of service may need to be moved to a more robust system to ensure the increased quality of service. Unlike the traditional provisioning systems, the performance manager can dynamically adjust quality of service for specific clients without moving the client's data to another cluster. Accordingly, quality of service for a client can be adjusted instantly, and a client can change QoS parameters without requiring manual intervention for those QoS parameters to take effect. This feature allows the client to schedule changes to their QoS parameters. For example, if a client performs backups on the first Sunday of every month from 2:00 am-4:00 am, they could have their QoS parameters automatically change just prior to the start of the backup and change back after the backup finishes. This aspect allows a client the flexibility to schedule changes to their QoS parameters based upon the client's need. As another example, the client can be presented with a turbo button. When selected, the turbo button increases the client's QoS parameters by some factor, e.g., 3, 4, 5, etc., or to some large amount. Clients could use this feature if their data needs were suddenly increased, such as when a client's website is experiencing a high number of visitors. The client could then unselect the turbo button to return to their original QoS parameters. Clients could be charged for how long they use the turbo button features. In another implementation, the turbo button remains in effect for a predetermined time before the client's original QoS parameters are reset.

In addition to the above examples, clients and/or administrators can set client QoS parameters based upon various conditions. In addition, as noted above client QoS parameters are not limited to IOPS. In different implementations, client QoS parameters can be bandwidth, latency, etc. According to different embodiments, the storage system may be configured or designed to allow service providers, clients, administrators and/or users, to selectively and dynamically configure and/or define different types of QoS and provisioning rules which, for example, may be based on various different combinations of QoS parameters and/or provisioning/QoS target types, as desired by a given user or client.

According to different embodiments, examples of client QoS parameters may include, but are not limited to, one or more of the following (or combinations there:

IOPS;
Bandwidth;
Write Latency;
Read Latency;
Write buffer queue depth;
I/O Size (e.g., amount of bytes accessed per second);
I/O Type (e.g., Read I/Os, Write I/Os, etc.);
Data Properties such as, for example, Workload Type (e.g., Sequential, Random); Dedupe-ability; Compressability; Data Content; Data Type (e.g., text, video, images, audio, etc.);
etc.

According to different embodiments, examples of various provisioning/QoS target types may include, but are not limited to, one or more of the following (or combinations thereof):

Service or group of Services;
Client or group of Clients;
Connection (e.g. Client connection);
Volume, or group of volumes;
Node or group of nodes;
Account/Client;
User;
iSCSI Session;
Time segment;
Read IOPS amount;
Write IOPS amount;
Application Type;
Application Priority;
Region of Volume (e.g., Subset of LBAs);
Volume Session(s);
I/O size;
Data Property type;
etc.

Figure 8:
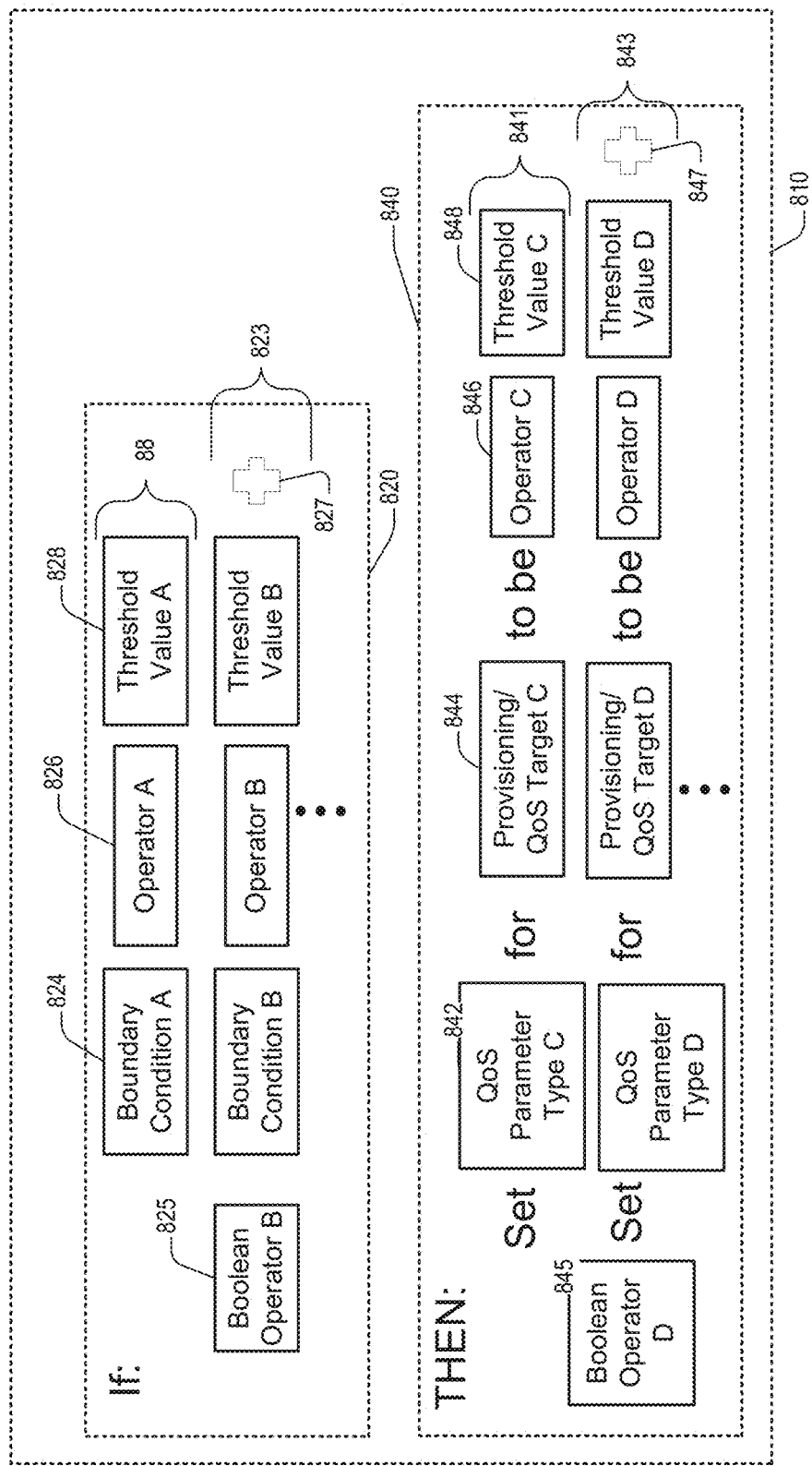
FIG. 8 shows an example QoS Interface GUI 800 which may be configured or designed to enable service providers, users, and/or other entities to dynamically define and/or create different performance classes of use and/or to define performance/QoS related customizations in the storage system in accordance with an illustrative implementation.

FIG. 8 shows an example QoS Interface GUI 800 which may be configured or designed to enable service providers, users, and/or other entities to dynamically define and/or create different performance classes of use and/or to define performance/QoS related customizations in the storage system. In at least one embodiment, the QoS Interface GUI may be configured or designed to allow service providers, users, and/or other entities dynamically switch between the different performance classes of use, allowing such clients to dynamically change their performance settings on the fly (e.g., in real-time).

For example, according to various embodiments, a service provider may dynamically define and/or create different performance classes of use in the storage system, may allow clients to dynamically switch between the different performance classes of use, allowing such clients to dynamically modify or change their performance settings on the fly (e.g., in real-time). In at least one embodiment, the storage system is configured or designed to immediately implement the specified changes for the specified provisioning/QoS Targets, and without requiring the client's storage volume to be taken off-line to implement the performance/QoS modifications. In at least one embodiment, the different performance classes of use may each have associated therewith a respective set of QoS and/or provisioning rules (e.g., 810) which, for example, may be based on various different combinations of QoS parameters and/or provisioning/QoS target types.

The above process for performing performance management may be performed continuously over periods of time. For example, a period of 500 milliseconds is used to evaluate whether performance should be adjusted. As will be described in more detail below, client 108 may be locked out of performing IOPS for a certain amount of time each period to reduce or increase the number of IOPS being performed.

Examples of different types of conditions, criteria and/or other information which may be used to configure the QoS Interface GUI of FIG. 8 may include, but are not limited to, one or more of the following (or combinations thereof):

Example Boundary Conditions (e.g., 824)

---

LOAD(Service);
LOAD(Read);
LOAD(Write);
LOAD(Write_Buffer);
LOAD(Client-Read);
LOAD(Client-Write);
LOAD(Client);
LOAD(Cluster);
LOAD(System)
Write Latency;
Read Latency;
Write buffer queue depth;
LOAD(Client);
Volume ID
Group ID
Account ID
Client ID
User ID
iSCSI Session ID
Time
Date
Read IOPS
Write IOPS
Application Type
Application Priority
Region of Volume
LBA ID
Volume Session ID
Connection ID
I/O size
I/O Type
Workload Type
Dedupe-ability
Compressability
Data Content
Data Type
Data Properties
Detectable Condition and/or Event
Etc.

---

Example QoS Parameters (e.g., 842)

---

MAX IOPS
MIN IOPS
BURST IOPS
MAX Bandwidth
MIN Bandwidth
BURST Bandwidth
MAX Latency
MIN Latency
BURST Latency
MAX I/O Size
MIN I/O Size
BURST I/O Size
I/O Type
MAX Read I/O
MIN Read I/O
BURST Read I/O
MAX Write I/O
MIN Write I/O
BURST Write I/O
I/O Type
Workload Type
Dedupe-ability
Compressability
Data Content
Data Type
Billing Amount

---

Example Provisioning/QoS Targets (e.g., 844)

---

Cluster ID
Service ID
Client ID
Connection ID
Node ID
Volume ID

-continued

|  |
| --- |
| Group ID |
| Account ID |
| Client ID |
| User ID |
| iSCSI Session ID |
| Time |
| Date |
| Read IOPS |
| Write IOPS |
| Application Type |
| Application Priority |
| Region of Volume |
| LBA ID |
| Volume Session ID |
| Connection ID |
| I/O size |
| I/O Type |
| Workload Type |
| Dedupe-ability |
| Compressability |
| Data Content |
| Data Type |
| Data Properties |
| Etc. |

Example Operators (e.g., 826, 846)

|  |
| --- |
| Equal To |
| Less Than |
| Greater Than |
| Less Than or Equal To |
| Greater Than or Equal To |
| Within Range of |
| Not Equal To |
| Contains |
| Does Not Contain |
| Matches |
| Regular Expression(s) |

Example Threshold Values (e.g., 828, 848)

|  |
| --- |
| Alpha-numeric value(s) |
| Numeric value(s) |
| Numeric Range(s) |
| Numeric value per Time Interval value (e.g., 5000 IOPS/sec) |
| Sequential Type |
| Random Type |
| Text Type |
| Video Type |
| Audio Type |
| Image Type |
| Performance Class of Use Value |

Example Boolean Operators (e.g., 825, 845)
AND
OR
XOR
NOT
EXCEPT
NAND
NOR
XNOR The following example scenarios help to illustrate the various features and functionalities enabled by the QoS Interface GUI 800, and help to illustrate the performance/QoS related provisioning features of the storage system:

Example A

Configuring/provisioning the storage system to automatically and/or dynamically increase storage performance to enable a backup to go faster during a specified window of time. For example, in one embodiment, the speed of a volume backup operation may be automatically and dynamically increased during a specified time interval by causing a MAX IOPS value and/or MIN IOPS value to be automatically and dynamically increased during that particular time interval.

Example B

Configuring/provisioning the storage system to automatically and/or dynamically enable a selected initiator to perform faster sequential IOs from 10 pm to Midnight.

Example C

Configuring/provisioning the storage system to automatically and/or dynamically enable a selected application to have increased I/O storage performance.

Example D

Configuring/provisioning the storage system to automatically and/or dynamically enable a selected group of clients to have their respective MAX, MIN and BURST IOPS double on selected days/dates of each month.

Example E

Configuring/provisioning the storage system to present a client or user with a "Turbo Boost" interface which includes a virtual Turbo Button. Client may elect to manually activate the Turbo Button (e.g., on the fly or in real-time) to thereby cause the storage system to automatically and dynamically increase the level of performance provisioned for that Client. For example, in one embodiment, client activation of the Turbo Button may cause the storage system to automatically and dynamically increase the client's provisioned performance by a factor of 3× for one hour. In at least one embodiment, the dynamic increase in provisioned performance may automatically cease after a predetermined time interval. In at least one embodiment, the storage system may be configured or designed to charge the client an increased billing amount for use of the Turbo Boost service/feature.

Example F

Configuring/provisioning the storage system to automatically and/or dynamically charge an additional fee or billing amount for dynamically providing increased storage array performance (e.g., to allow a faster backup) to go faster at a particular time.

Example G

Configuring/provisioning the storage system to automatically and/or dynamically charge an additional fee or billing amount for IOPS and/or I/O access of the storage system which exceeds minimum threshold value(s) during one or more designated time intervals.

Figure 4:
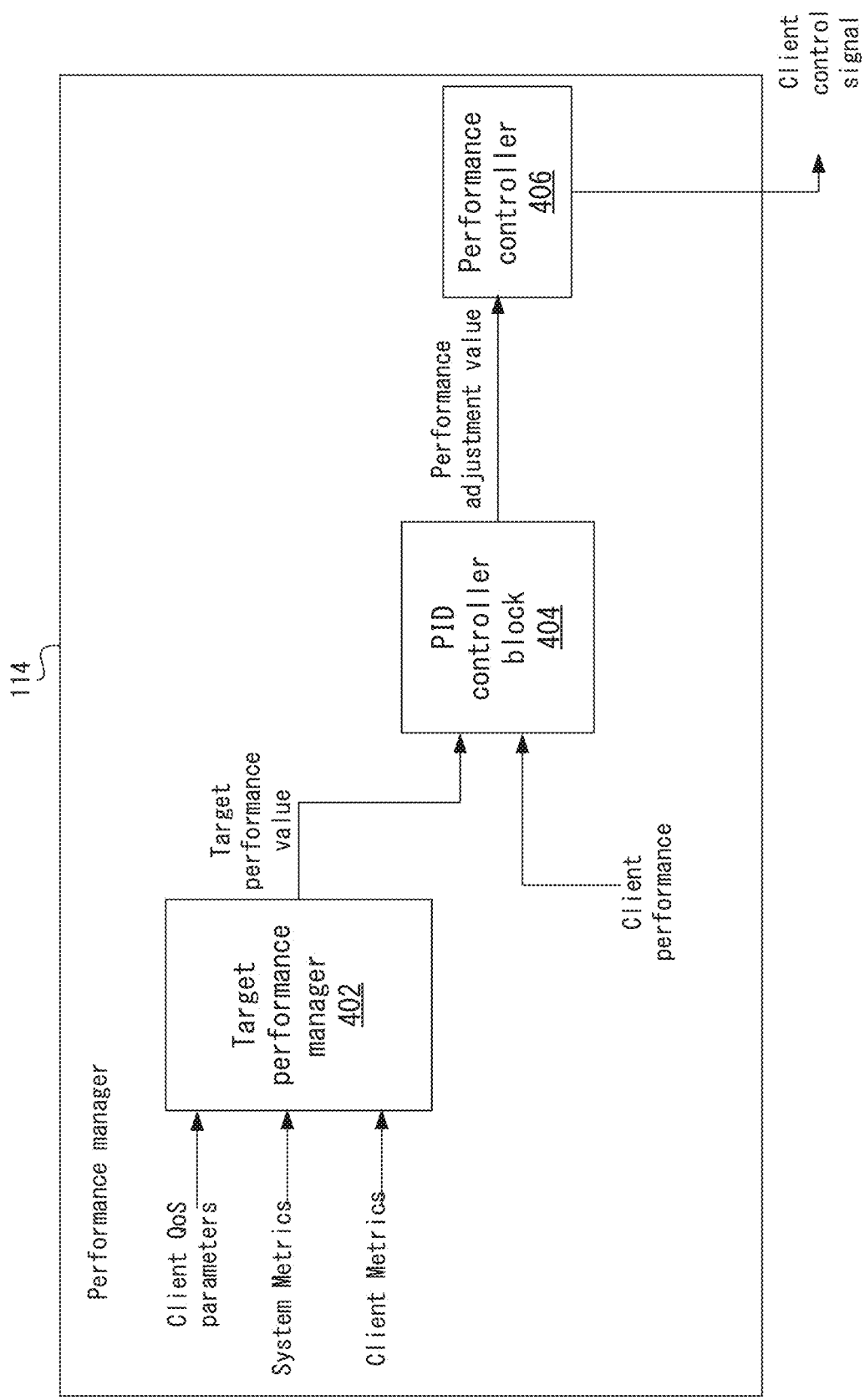
FIG. 4 depicts a more detailed example of adjusting performance using a performance manager in accordance with an illustrative implementation.

Performance manager 114 may use different ways of adjusting performance. FIG. 4 depicts a more detailed example of adjusting performance using performance manager 114 according to one implementation. A target performance manager 402 determines a target performance value. In one implementation, target performance manager 402 uses the client's QoS parameters, system metrics, and client metrics to determine the target performance value. As will be described in greater detail below, system metrics and client metrics can be used to determine the system load and client load. As an example, client load can be measured based on a client metrics, such as in IOPS, bytes, or latency in milliseconds.

In one implementation, system metrics are data that quantifies the current load of the cluster. As will be described in greater detail below, various system load values can be calculated based upon the system metrics. The load values can be normalized measures of system load. For example, different load values can be compared to one another, even if the load values use different metrics in their calculations. As an example, system load can be expressed in a percentage based on the current load of the cluster. In one example, a cluster that is overloaded with processing requests may have a lower value than when the system is not overloaded. In another implementation, the target performance manger 402 receives calculated load values as input, rather than system and/or client metrics.

The target performance manager 402 can read the client QoS parameters, relevant system metrics, and relevant client metrics. These values can be used to determine the target performance value for client 108. The QoS parameters may also be dynamically adjusted during runtime by the administrator or the client as described above, such as when a higher level of performance is desired (e.g., the customer paid for a higher level of performance). The calculation of the target performance value is explained in greater detail below.

In one implementation, the target performance manager 402 outputs the target performance value to a proportion-integral-derivative (PID) controller block 404. PID controller block 404 may include a number of PID controllers for different performance metrics. Although PID controllers are described, other controllers may be used to control the performance of clients 108. In one example, PID controller block 404 includes PID controllers for IOPS, bandwidth, and latency. Target performance manager 402 outputs different target performance values for the performance metrics into the applicable PID controllers. The PID controllers also receive information about previous and/or current client performance and the target performance value. For example, the PID controllers can receive client metrics, system metrics, and/or load values, that correspond with the target performance value. The PID controller can then determine a client performance adjustment value. For example, a PID controller is configured to take feedback of previous client performance and determine a value to cause a system to move toward the target performance value. For example, a PID can cause varied amounts of pressure to be applied, where pressure in this case causes client 108 to slow down, speed up or stay the same in performing IOPS. As an example, if the target performance value is 110 IOPS and client 108 has been operating at 90 IOPS, then the client performance adjustment value is output, which by being applied to the client 108 should increase the number of IOPS being performed.

In one implementation, PID controller block 404 outputs a performance adjustment value. As an example, the performance adjustment value can be a pressure value that indicates an amount of time that the client is locked out performing IO operations within the storage system. This lock out time will cause client performance to move toward the target performance value. For example, a time in milliseconds is output that is used to determine how long to lock a client 108 out of a volume. Locking a client out of performing IO operations artificially injects latency into the client's IO operations. In another of implementations, the performance adjustment value can be a number of IO operations that the client can perform in a period of time. If the client attempts to do more IO operations, the client can be locked out of doing those IO operations until a subsequent period of time. Locking client 108 out of the volume for different times changes the number of IOPS performed by client 108. For example, locking client 108 out of the volume for shorter periods of time increases the number of IOPS that can be performed by client 108 during that period.

A performance controller 406 receives the performance adjustment value and outputs a client control signal to control the performance of client 108. For example, the amount of lockout may be calculated and applied every half second. In one implementation, clients 108 are locked out by closing and opening a command window, such as an Internet small computer system interface (iSCSI) command window. Closing the command window does not allow a client 108 to issue access requests to a volume and opening the command window allows a client 108 to issue access requests to the volume. Locking clients 108 out of a volume may adjust the number of IOPS, bandwidth, or latency for client 108. For example, if a client 108 is locked out of a volume every 50 milliseconds of every 500 milliseconds as compared to being locked out of the volume for 450 milliseconds of every 500 milliseconds, the client may issue more IOPS. For a bandwidth example, if bandwidth is constrained, then client 108 is locked out of a volume for a longer period of time to increase available bandwidth. In another implementation, the amount of data that is being serviced at a time is modified, either to zero or some number, to affect the performance at which the system services that client's IO.

Figure 5:
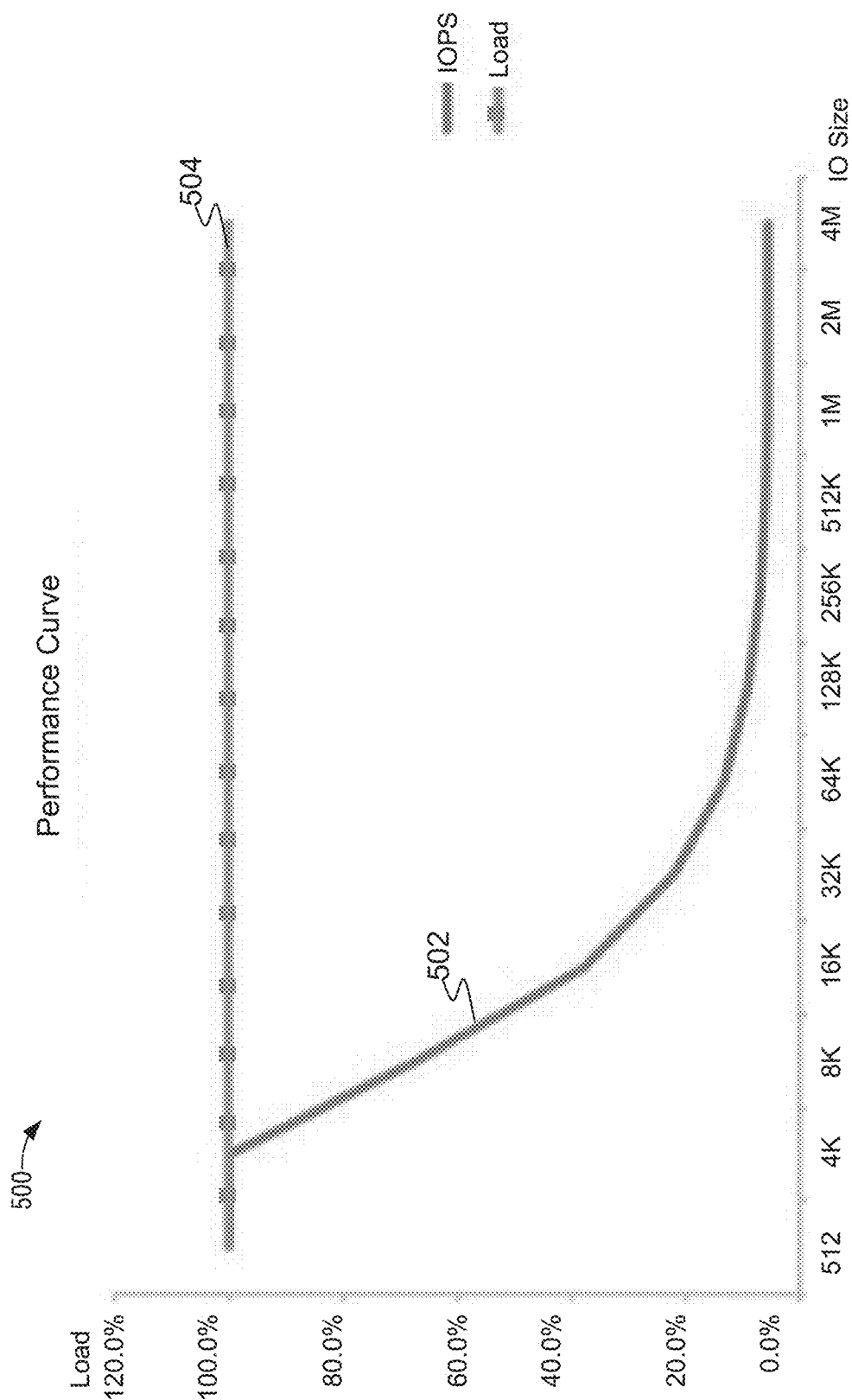
FIG. 5 depicts a performance curve comparing the size of input/output operations with system load in accordance with an illustrative implementation.

As described above, IOPS are metrics that can be used to manage performance of a client. IOPS include both write IOPS and read IOPS. Individual input/output operations do not have a set size. That is, an input operation can be writing 64 k of data to a drive, while another input operation can be writing 4 k of data to the drive. Accordingly, capturing the raw number of input/output operations over a period of time does not necessarily capture how expensive the IO operation actually is. To account for this situation, an input/output operation can be normalized based upon the size of the I/O operation. This feature allows for consistent treatment of IOPS, regardless of each operation's size of the data. This normalization can be achieved using a performance curve. FIG. 5 depicts a performance curve 500 comparing the size of input/output operations with system load in accordance with an illustrative implementation. Line 504 indicates the system at full load, while line 502 indicates the load of the system for IO operations of differing sizes. The performance curve can be determined based upon empirical data of the system 100. The performance curve allows IOPS of different sizes to be compared and to normalize IOPS of different sizes. For example, an IOP of size 32 k is roughly five times more costly than a 4 k IOP. That is, the number of IOPS of size 32 k to achieve 100% load of a system is roughly 20% of the number of IOPS of size 4 k. This is because larger block sizes have a discount of doing IP and not having to process smaller blocks of data. In various implementations, this curve can be used as a factor in deciding a client's target performance value. For example, if the target performance value for a client is determined to be 1,000 IOPS, this number can be changed based upon the average size of IOs the client has done in the past. As an example, if a client's average IO size is 4 k, the client's target performance value can remain at 1,000 IOPS. However, if the client's average IO size is determined to be 32 k, the client's target performance value can be reduced to 200 IOPS, e.g., 1,000*0.2. The 200 IOPS of size 32 k is roughly equivalent to 1,000 IOPS of size 4 k.

In determining a target performance value, the target performance manager 402 uses a client's QoS parameters to determine the target performance value for a client. In one implementation, an overload condition is detected and all clients are throttled in a consistent manner. For example, if the system load is determined to be at 20%, all clients may be throttled such that their target performance value is set to 90% of their maximum IOPS setting. If the system load increases to 50%, all clients can be throttled based upon setting their target performance value to 40% of their maximum IOPS setting. Additional examples of how overload conditions are determined are provided below.

Clients do not have to be throttled in a similar manner. For example, clients can belong to different classes of uses. In one implementation, classes of uses can be implemented simply by setting the QoS parameters of different clients differently. For example, a premium class of use could have higher QoS parameters, e.g., min IOPS, max IOPS, and burst IOPS, values compared to a normal class of use. In another implementation, the class of use can be taken into account when calculating the target performance value. For example, taking two different classes, one class could be throttled less than the other class. Using the example scenario above, clients belonging to the first class could be throttled 80% of their maximum IOPS value when the system load reaches 20%. The second class of clients, however, may not be throttled at all or by a different amount, such as 95% of their maximum IOPS value.

In another implementation, the difference between a client's minimum IOPS and maximum IOPS can be used to determine how much to throttle a particular client. For example, a client with a large difference can be throttled more than a client whose difference is small. In one implementation, the difference between the client's maximum IOPS and minimum IOPS is used to calculate a factor that is applied to calculate the target performance value. In this implementation, the factor can be determined as the IOPS difference divided by some predetermined IOPS amount, such as 5,000 IOPS. In this example, a client whose difference between their maximum IOPS and their minimum IOPS was 10,000, would be throttled twice as much as a client whose IOPS difference was 5,000. Clients of the system can be billed different amounts based upon their class. Accordingly, clients could pay more to be throttled later and/or less than other classes of clients.

In another implementation, throttling of clients can be based upon the client's use of the system. In this implementation, the target performance manager 402 can review system metrics to determine what metrics are currently overloaded. Next, the client metrics can be analyzed to determine if that client is contributing to an overloaded system value. For example, the target performance manager 402 can determine that the system is overloaded when the cluster's write latency is overloaded. The read/write IOPS ratio for a client can be used to determine if a particular client is having a greater impact on the overload condition. Continuing this example, a client whose read/write IOPS ratio was such that the client was doing three times more writes than reads and was doing 1,500 writes would be determined to be negatively impacting the performance of the cluster. Accordingly, the target performance manager 402 could significantly throttle this client. In one implementation, this feature can be done by calculating a factor based upon the read/write IOPS ratio. This factor could be applied when calculating the target performance value, such that the example client above would be throttled more than a client whose read/write IOPS ratio was high. In this example, a high read/write IOPS ratio indicates that the client is doing more reads than writes. The factor can also be based upon the number of IOPS that each client is doing. In addition, the number of IOPS for a particular client can be compared to the number of IOPS for the cluster, such that an indication of how heavily a particular client is using the cluster can be determined. Using this information, the target performance manager can calculate another factor than can be used to scale the target performance value based upon how much a client is using the system compared to all other clients.

Figure 6:
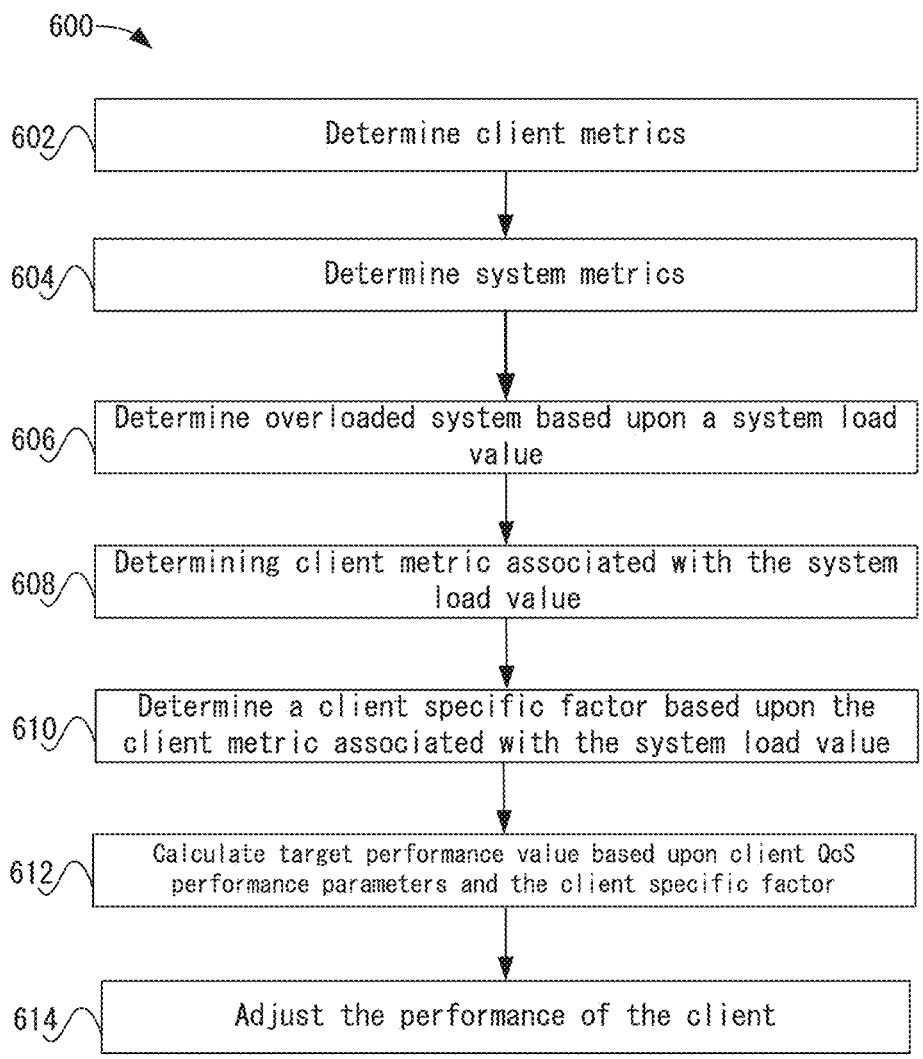
FIG. 6 depicts a simplified flowchart of a method of performing performance management that matches an overloaded system metric with a client metric in accordance with an illustrative implementation.

FIG. 6 depicts a simplified flowchart of a method 600 of performing performance management that matches an overloaded system metric with a client metric in accordance with one illustrative implementation. Additional, fewer, or different operations of the method 600 may be performed, depending on the particular embodiment. The method 600 can be implemented on a computing device. In one implementation, the method 600 is encoded on a computer-readable medium that contains instructions that, when executed by a computing device, cause the computing device to perform operations of the method 600.

In an operation 602, client metrics can be determined. For example, a performance manager 114 can determine client metrics, as described above, for a preceding period of time, e.g., 100 ms, 1 s, 10 s, etc. In an operation 604, system metrics can be determined. For example, the performance manager 114 or another process can determine system metrics as described above. In one implementation, the client metrics and/or system metrics are used to calculate one or more load values. The calculation of load values is described in greater detail below. In an operation 606, the target performance manager 402 can then determine if the system is overloaded in way based upon various load values. For example, the target performance manager 402 can determine if a system is overloaded by comparing system load values with corresponding thresholds. Any load value above its corresponding threshold indicates an overload condition. In one implementation, the system load values are analyzed in a prioritized order and the first overloaded load value is used to determine how to throttle clients.

In an operation 608, one or more corresponding client metrics associated with the overloaded load value are determined. For example, if the overloaded system load is the number of read operations, the client's number of read operations can be used as the associated client metric. The client's metric does not have to be the same as the overloaded system metric. As another example, if the overloaded system load is read latency, the corresponding client metrics can be the ratio of read to write IO operations and the total number of read operations for a client. In an operation 610, a client-specific factor is determined based upon the client metric associated with the overloaded system load value. In the first example above, the factor can be the number of the client's read operations divided by the total number of read operations of the cluster. The client factor, therefore, would be relative to how much the client is contributing to the system load value. Clients that were dong a relatively larger number of reads would have a greater client metric compared with a client that was doing a relatively smaller number of reads.

In an operation 612, the client-specific factor is used to calculate the target performance value for the client. In one implementation, an initial target performance value can be calculated and then multiplied by the client specific factor. In another implementation, a cluster reduction value is determined and this value is multiplied by the client specific factor. Continuing the example above, the cluster reduction value can be the number of read IOPS that should be throttled. Compared to throttling each client equally based upon the cluster reduction value, using the client-specific factor results in the same number of read IOPS that are throttled, but clients who have a large number of read IO operations are throttled more than clients who have a smaller number of read IO operations. Using client-specific factors helps the target performance manager 402 control the throttling of clients to help ensure that the throttling is effective. For example, if client-specific factors were not used and throttling was applied equally across all clients, a client whose use of the system was not contributing to the system's overloading would be unnecessarily throttled. Worse, the throttling of all of the clients might not be as effective since the throttling of clients who did not need to be throttled would not help ease the overloading condition, which could result in even more throttling being applied to clients.

In an operation 614, the performance manager 114 can adjust the performance of client 108. For example, the client's use of the system can be throttled as described above.

Using the above system, clients 108 may be offered performance guarantees based on performance metrics, such as IOPS. For example, given that system 100 can process a total number of IOPS, the total number may be divided among different clients 108 in terms of a number of IOPS within the total amount. The IOPS are allocated using the min, max, and burst. If it is more than the total then possible, the administrator is notified that too many IOPS are being guaranteed and instructed to either add more performance capacity or change the IOP guarantees. This notification may be before a capacity threshold is reached (e.g., full capacity or a pre-defined threshold below full capacity). The notification can be sent before the capacity is reached because client performance is characterized in terms of IOPS and the administrator can be alerted that performance is overprovisioned by N number of IOPS. For example, clients 108 may be guaranteed to be operating between a minimum and maximum number of IOPS over time (with bursts above the maximum at certain times). Performance manager 114 can guarantee performance within these QoS parameters using the above system. Because load is evenly distributed, hot spots will not occur and system 100 may operate around the total amount of IOPS regularly. Thus, without hot spot problems and with system 100 being able to provide the total amount of IOPS regularly, performance may be guaranteed for clients 108 as the number of IOPS performed by clients 108 are adjusted within the total to make sure each client is operating within the QoS parameters for each given client 108. Since each client's effect on a global pool of performance is measured and predictable, the administrator can consider the entire cluster's performance as a pool of performance as opposed to individual nodes, each with its own performance limits. This feature allows the cluster to accurately characterize its performance and guarantee its ability to deliver performance among all of its volumes.

Accordingly, performance management is provided based on the distributed data architecture. Because data is evenly distributed across all drives in the cluster, the load of each individual volume is also equal across every single drive in storage system 100. This feature may remove hot spots and allow performance management to be accurate and fairly provisioned and to guarantee an entire cluster performance for individual volumes.

Load Value Calculations

Load values can be used to determine if a client should be throttled to help ensure QoS among all clients. Various load values can be calculated based upon one or more system metric and/or client metric. As an example, a load value can be calculated that corresponds to a client's data read latency. When calculating a load value that corresponds with a client, how the client's data is managed on the storage system becomes important.

Figure 9:
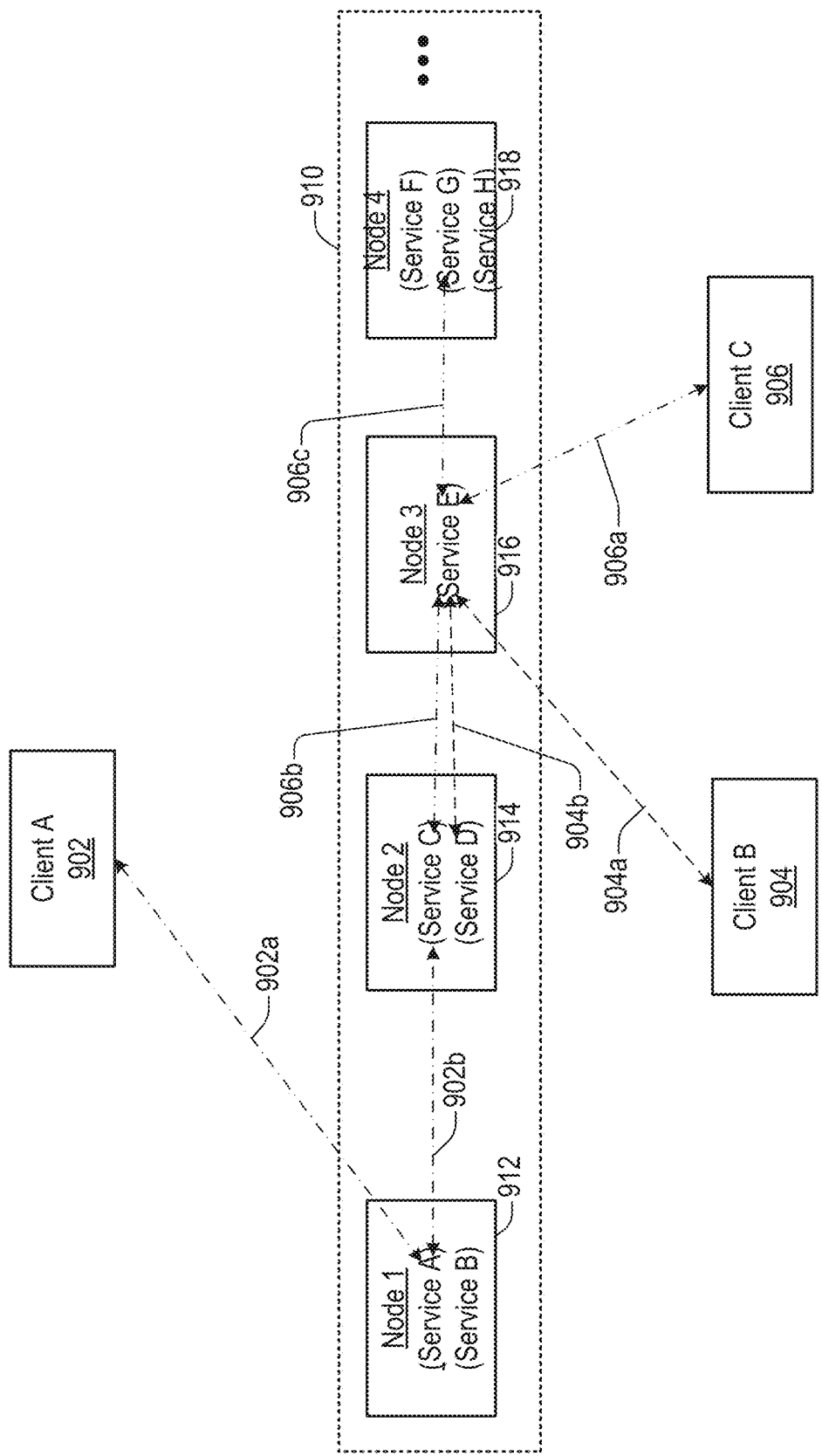
FIG. 9 shows a portion of a storage system in accordance with an illustrative implementation.

FIG. 9 shows a portion of a storage system in accordance with one illustrative implementation. In the specific example embodiment of FIG. 9, the storage system is shown to include a cluster 910 of nodes (912, 914, 916, and 918). According to different embodiments, each node may include one or more storage devices such as, for example, one or more solid state drives (SSDs). In the example embodiment of FIG. 9, it is assumed for purposes of illustration that three different clients (e.g., Client A 902, Client B 904, and Client C 906) are each actively engaged in the reading/writing of data from/to storage cluster 910.

Additionally, as illustrated in the example embodiment of FIG. 9, each node may have associated therewith one or more services (e.g., Services A-H), wherein each service may be configured or designed to handle a particular set of functions and/or tasks. For example, as illustrated in the example embodiment of FIG. 9: Services A and B may be associated with (and/or may be handled by) Node 1 (912); Services C and D may be associated with (and/or may be handled by) Node 2 (914); Service E may be associated with (and/or may be handled by) Node 3 (916); Services F, G, H may be associated with (and/or may be handled by) Node 4 (918). In at least one embodiment, one or more of the services may be configured or designed to implement a slice server. A slice server can also be described as providing slice service functionality.

Additionally, according to different embodiments, a given service may have associated therewith at least one primary role and further may have associated therewith one or more secondary roles. For example, in the example embodiment of FIG. 9, it is assumed that Service A has been configured or designed to include at least the following functionality: (1) a primary role of Service A functions as the primary slice service for Client A, and (2) a secondary role of Service A handles the data/metadata replication tasks (e.g., slice service replication tasks) relating to Client A, which, in this example involves replicating Client A's write requests (and/or other slice-related metadata for Client A) to Service C. Thus, for example, in one embodiment, write requests initiated from Client A may be received at Service A 902a, and in response, Service A may perform and/or initiate one or more of the following operations (or combinations thereof):

process the write request at Service A's slice server, which, for example, may include generating and storing related metadata at Service A's slice server;
   (if needed) cause the data (of the write request) to be saved in a first location of block storage (e.g., managed by Service A);
   forward (902b) the write request (and/or associated data/metadata) to Service C for replication.

In at least one embodiment, when Service C receives a copy of the Client A write request, it may respond by processing the write request at Service C's slice server, and (if needed) causing the data (of the write request) to be saved in a second location of block storage (e.g., managed by Service C) for replication or redundancy purposes. In at least one embodiment, the first and second locations of block storage may each reside at different physical nodes. Similarly Service A's slice server and Service C's slice server may each be implemented at different physical nodes.

Accordingly, in the example embodiment of FIG. 9, the processing of a Client A write request may involve two distinct block storage write operations—one initiated by Service A (the primary Service) and another initiated by Service C (the redundant Service). On the other hand, the processing of a Client A read request may only be handled by Service A (e.g., under normal conditions) since Service A is without involving Service C) since Service A is able to handle the read request without necessarily involving Service C.

For purposes of illustration, in the example embodiment of FIG. 9, it is also assumed that Service E has been configured or designed to include at least the following functionality: (1) a primary role of Service E functions as the primary slice service for Client B, and (2) a secondary role of Service E handles the data and/or metadata replication tasks (e.g., slice service replication tasks) relating to Client B, which, in this example involves replicating Client B's write requests (and/or other Slice-related metadata for Client B) to Service D. Thus, for example, in one embodiment, write requests initiated from Client B may be received at Service E 904a, and in response, Service E may perform and/or initiate one or more of the following operations (or combinations thereof):

process the write request at Service E's slice server, which, for example, may include generating and storing related metadata at Service E's slice server;

(if needed) cause the data (of the write request) to be saved in a first location of block storage (e.g., managed by Service E);

forward (904b) the write request (and/or associated data/metadata) to Service D for replication.

In at least one embodiment, when Service D receives a copy of the Client B write request, it may respond by processing the write request at Service D's slice server, and (if needed) causing the data (of the write request) to be saved in a second location of block storage (e.g., managed by Service D) for replication or redundancy purposes. In at least one embodiment, the first and second locations of block storage may each reside at different physical nodes. Similarly Service E's slice server and Service D's slice server may each be implemented at different physical nodes.

According to different embodiments, it is also possible to implement multiple replication (e.g., where the data/metadata is replicated at two or more other locations within the storage system/cluster). For example, as illustrated in the example embodiment of FIG. 9, it is assumed that Service E has been configured or designed to include at least the following functionality: (1) a primary role of Service E functions as the primary slice service for Client C, (2) a secondary role of Service E handles the data and/or metadata replication tasks (e.g., slice service replication tasks) relating to Client C, which, in this example involves replicating Client C's write requests (and/or other Slice-related metadata for Client C) to Service C; and (3) a secondary role of Service E handles the data and/or metadata replication tasks (e.g., slice service replication tasks) relating to Client C, which, in this example involves replicating Client C's write requests (and/or other Slice-related metadata for Client C) to Service G. Thus, for example, in one embodiment, write requests initiated from Client C may be received at Service E 906a, and in response, Service E may perform and/or initiate one or more of the following operations (or combinations thereof):

process the write request at Service E's slice server, which, for example, may include generating and storing related metadata at Service E's slice server;

(if needed) cause the data (of the write request) to be saved in a first location of block storage (e.g., managed by Service E);

forward (906b) the write request (and/or associated data/metadata) to Service C for replication;

forward (906c) the write request (and/or associated data/metadata) to Service G for replication.

In at least one embodiment, when Service C receives a copy of the Client C write request, it may respond by processing the write request at Service C's slice server, and (if needed) causing the data (of the write request) to be saved in a second location of block storage (e.g., managed by Service C) for replication or redundancy purposes. Similarly, In at least one embodiment, when Service G receives a copy of the Client C write request, it may respond by processing the write request at Service G's slice server, and (if needed) causing the data (of the write request) to be saved in a third location of block storage (e.g., managed by Service G) for replication or redundancy purposes.

Load Values and Quality of Service (QoS) Analysis

According to different embodiments, the QoS functionality of the storage system may use as input various load values determined from system metrics and/or client metrics. For example, in one embodiment, the storage system may be configured or designed to measure, track, and/or analyze system resources that are used or are impacted for read and/or write operations to help determine the degree to which one or more system resources may be loaded, stressed and/or overloaded.

In at least one embodiment, different types of metrics can be used to calculate load values that can be used to express the degree to which one or more system resources (e.g., nodes, components, services, etc.) are loaded, stressed and/or overloaded. For example, in at least one embodiment, one or more different types of load values may be automatically and/or dynamically calculated to express or quantify the relative degrees to which various types system resources may be loaded, stressed and/or overloaded. Examples of various types of load values may include, but are not limited to, one or more of the following (or combinations thereof):

LOAD(Service) which, for example, may express the relative degree or amount of system resource load or stress relating to an identified Service running at the system. According to different embodiments, the LOAD(Service) value may be automatically and/or dynamically calculated (e.g., in real-time) based, at least partially, on measured amount(s) of read latency and/or write latency relating to read and/or write operations associated with the identified Service. In at least one embodiment where the Service has been assigned to handle read/write operations from multiple Clients, the LOAD(Service) value may reflect read latencies and/or write latencies attributable to read/write operations associated with the multiple Clients to which the Service has been assigned.

LOAD(Read) which, for example, may express the relative degree or amount of system resource load or stress relating to Read IOPS. According to different embodiments, the LOAD(Read) value may be automatically and/or dynamically calculated (e.g., in real-time) based, at least partially, on measured amount(s) of system latency relating to Read IOPS. According to different embodiments, the LOAD(Read) metric may be configured to express the relative degree or amount of system resource load or stress relating to Read IOPS which are associated with one or more of the following (or combinations thereof): an identified Service, a group of identified Services, an identified Client, an identified connection (e.g., Client connection), an identified volume (or portion thereof), an identified group of volumes, an identified node, an identified group of nodes, and/or other specifically identified system resources.

LOAD(Write) which, for example, may express the relative degree or amount of system resource load or stress relating to Write IOPS. According to different embodiments, the LOAD(Write) value may be automatically and/or dynamically calculated (e.g., in real-time) based, at least partially, on measured amount(s) of system latency relating to Write IOPS. According to different embodiments, the LOAD(Write) metric may be configured to express the relative degree or amount of system resource load or stress relating to Write IOPS which are associated with one or more of the following (or combinations thereof): an identified Service, a group of identified Services, an identified Client, an identified connection (e.g., Client connection), an identified volume (or portion thereof), an identified group of volumes, an identified node, an identified group of nodes, and/or other specifically identified system resources.

LOAD(Write_Buffer) which, for example, may express the relative amount of write buffer cache capacity being used. According to different embodiments, the LOAD (Write_Buffer) value may be automatically and/or dynamically calculated (e.g., in real-time) based, at least partially, on the percentage of fullness of the write buffer cache.

LOAD(Client) which, for example, may express the relative degree or amount of system resource load or stress relating to IO activities associated with the Service(s) (e.g., primary Service and secondary Service(s)) which have been assigned to handle read, write and replication operations for the identified Client. According to different embodiments, the LOAD(Client) value may be automatically and/or dynamically calculated (e.g., in real-time) based, at least partially, on measured amount(s) of read latency and/or write latency relating to the Service(s) which have been assigned to handle read, write and replication operations for the identified Client.

LOAD(Client-Read) which, for example, may express the relative degree or amount of system resource load or stress relating to IO activities associated with the Service(s) which have been assigned to handle read operations for the identified Client. According to different embodiments, the LOAD(Client-Read) value may be automatically and/or dynamically calculated (e.g., in real-time) based, at least partially, on measured amount(s) of read latency relating to the Service(s) which have been assigned to handle IO operations for the identified Client.

LOAD(Client-Write) which, for example, may express the relative degree or amount of system resource load or stress relating to IO activities associated with the Service(s) which have been assigned to handle Write operations for the identified Client. According to different embodiments, the LOAD(Client-Write) value may be automatically and/or dynamically calculated (e.g., in real-time) based, at least partially, on measured amount(s) of write latency relating to the Service(s) which have been assigned to handle IO operations for the identified Client.

LOAD(Resource) which, for example, may express the relative degree or amount of system load or stress relating to the identified Resource (e.g., cache memory, disk storage space, cluster storage space, etc.). According to different embodiments, the LOAD(Resource) value may be automatically and/or dynamically calculated (e.g., in real-time) (e.g., in real-time) based, at least partially, on resource availability/usage characteristics and/or performance characteristics relating to one or more of the following (or combinations thereof): cluster level metrics and/or drive level metrics, read latency, write latency, input/output operations per second (IOPS), read IOPS, write IOPS, I/O size, write cache capacity, dedupe-ability, compressibility, total bandwidth, read bandwidth, write bandwidth, read/write ratio, workload type, data content, data type, etc.

LOAD(System) which, for example, may express the relative degree or amount of system load or stress relating to a selected portion of the storage system.

LOAD(DSU-Service) which, for example, may express the relative amount of disk space utilization (DSU) for an identified Service.

LOAD(DSU-Cluster) which, for example, may express the relative amount of disk space utilization (DSU) for an identified Storage Cluster.

LOAD(Cluster) which, for example, may express the relative degree or amount of system load or stress relating to an identified Storage Cluster (e.g., Storage Cluster 910, FIG. 9)

As shown above, a client load value can be calculated based upon both the read latency and the write latency metrics of the client. In addition, separate client load values can be calculated based on read latency and write latency metrics. In at least one embodiment, one or more aspects relating to QoS management may be initiated and/or facilitated by monitoring and differentiating between read-related IOPS and write-related IOPS (e.g., for a given Client, Service, and/or group of Services). For example, in one embodiment, to facilitate QoS implementation for read-related operations relative to a given service (e.g., Service A), read latency of the volumes associated with Service A may be monitored and/or measured. In one embodiment, read latency of given volume may be calculated or determined based on the amount of time it takes for the system to internally service and complete a data read operation(s) conducted between the identified service (e.g., slice service) and the corresponding block service from which the data is read.

To initiate and/or facilitate QoS implementation for write-related operations relative to a given service (e.g., Service A), write latency of the volumes associated with Service A may be monitored and/or measured. In one embodiment, write latency of given volume may be calculated or determined based on the amount of time it takes for the system to internally service and complete the data write operation(s) conducted between the identified service (e.g., slice service) and the corresponding block service to which the data is written.

In at least one embodiment, to facilitate QoS implementation for write-related operations relative to a given Client (e.g., Client A 902), write latency of the Services (e.g., Service A, Service C) associated with Client A may be monitored and/or measured. For example, in one embodiment, write latency for a given Client may be calculated or determined based on the amount of time it takes for the system to internally service and complete the associated data write operation(s), which may include, for example: (i) the data write operation(s) handled by the primary slice service (e.g., Service A), and (ii) the data write operation(s) handled by each of the secondary (e.g., replication) service(s) (e.g., Service C).

In at least some embodiments, the degree or amount (e.g., percentage) of available write buffer cache capacity (for one or more identified nodes) may also be used or taken into account when performing write latency measurements/calculations. For example, for at least some write-related operations, the storage system may utilize one or more write cache(s) (or write buffers) which, for example, may be implemented using fast-write memory (e.g., such as that associated with battery backed RAM, Marvell™ card, etc.). In at least one embodiment, the storage system may monitor the size or amount of queued writes stored on the write cache(s), and use this information to proactively manage throttle clients.

For example, in one embodiment, as the load value associated with the amount of data in a given write cache approaches or exceeds predefined threshold limits, the storage system automatically and/or dynamically identify and/or implement appropriate procedures to help maintain QoS standards such as, for example, by applying back pressure during conditions when it is detected or determined that the data flushing process (e.g., from slice service write cache to block storage) cannot keep up with incoming client writes. In some embodiments, the system may apply back pressure only to a subset of nodes and/or volumes which have been identified as having write caches which meet or exceed predefined threshold limits.

According to different embodiments, various examples of procedures which may be automatically and/or dynamically initiated and/or implemented by the storage system may include, but are not limited to, one or more of the following (or combinations thereof):

Temporarily throttling read and write IOPS for one or more selected services, nodes, volumes, clients, and/or connections;

Temporarily throttling read-related IOPS for one or more selected services, nodes, volumes, clients, and/or connections;

Temporarily throttling write-related IOPS for one or more selected services, nodes, volumes, clients, and/or connections;

Deferring internal message requests between one or more selected services, nodes, volumes, clients, and/or connections;

and/or other types of actions/activities which may help reduce or alleviate the relative degree or amount of system resource load or stress.

Example Load Calculations

According to different embodiments, various types of techniques and/or computer-implemented algorithms may be used for dynamically calculating desired LOAD values. By way of illustration, several different example embodiments of LOAD calculation techniques are described below with reference to the example system embodiment illustrated in FIG. 9.

Example LOAD Calculation Technique A

In one embodiment, referring to the example system embodiment illustrated in FIG. 9, respective LOAD(Client) values may be automatically and/or dynamically calculated according to:

$$\text{LOAD(Client } A) = a*\text{LOAD(Service } A) + b*\text{LOAD(Service } C);$$

$$\text{LOAD(Client } B) = c*\text{LOAD(Service } E) + d*\text{LOAD(Service } D);$$

$$\text{LOAD(Client } C) = e*\text{LOAD(Service } E) + f*\text{LOAD(Service } C) + g*\text{LOAD(Service } G);$$

where: a, b, c are weighted variables (e.g., weighted coefficients) each having a respective value between 0 and 1; and where: a+b=1, c+d=1, and e+g+f=1.

In at least one embodiment, the value of coefficients may be automatically and/or dynamically adjusted (e.g., in real-time) based, for example, on measured percentages of Read/Write workloads.

In one embodiment, referring to the example system embodiment illustrated in FIG. 9, LOAD(Service) value(s) for an identified service (Service_ID) may be automatically and/or dynamically calculated according to:

$$\text{LOAD(Service\_ID)} = \\ h*\text{LOAD(Read@Service\_ID)} + j*\text{LOAD(Write@Service\_ID)} + \\ k*\text{LOAD(Write Buffer@Service\_ID)} + m*\text{LOAD(DSU-Service\_ID)}$$

where:
h, j, k, m are weighted variables (e.g., weighted coefficients) each having a respective value between 0 and 1; and where: h+j+k+m=1;

LOAD(Read@Service_ID) represents a normalized value (e.g., between 0-1) which expresses the relative degree or amount of system resource load/stress associated with read IOPS which are handled by the Service identified by Service_ID;

LOAD(Write@Service_ID) represents a normalized value (e.g., between 0-1) which expresses the relative degree or amount of system resource load/stress associated with write IOPS which are handled by the Service identified by Service_ID;

LOAD(Write_Buffer@Service_ID) represents a normalized value (e.g., between 0-1) which expresses the relative size or amount of queued write requests which are queued on the write cache of the node which is assigned for use by the Service identified by Service_ID;

LOAD(DSU-Service_ID) represents a normalized value (e.g., between 0-1) which expresses the relative amount of disk space utilization (DSU) for the Service identified by Service_ID.

In at least one embodiment where the Service has been assigned to handle read/write operations from multiple Clients, the LOAD(Read) value may reflect read latencies attributable to read operations associated with the multiple Clients to which the Service has been assigned. Similarly, where the Service has been assigned to handle read/write operations from multiple Clients, the LOAD(Write) value may reflect write latencies attributable to write operations associated with the multiple Clients to which the Service has been assigned.

Example LOAD Calculation Technique B

In another embodiment, a LOAD(Client) value for a given client may be automatically and/or dynamically determined by identifying and selecting a relatively highest value from a set of values which, for example, may include LOAD(client-read) and LOAD(client-write).

Thus, for example, referring to the example system embodiment illustrated in FIG. 9, the LOAD(Client A) value may be automatically and/or dynamically calculated according to:

$$\text{LOAD(Client } A) = \text{MAX\_VALUE } \{(\text{LOAD(Read@Service } A),$$
$$\text{LOAD(Write@(Service } A), \text{LOAD(Write@Service } C)\}$$

where:
- MAX_VALUE {x,y,z} represents a function which returns a relatively highest value selected from the set {x,y,z};
- LOAD(Read@Service A) represents a normalized value (e.g., between 0-1) which expresses the relative degree or amount of system resource load/stress associated with read IOPS which are handled by Service A;
- LOAD(Write@(Service A) represents a normalized value (e.g., between 0-1) which expresses the relative degree or amount of system resource load/stress associated with write IOPS which are handled by Service A;
- LOAD(Write@Service C) represents a normalized value (e.g., between 0-1) which expresses the relative degree or amount of system resource load/stress associated with write IOPS which are handled by Service C.

Similarly, the respective LOAD(Client B) and LOAD (Client C) values may each be automatically and/or dynamically calculated according to:

$$\text{LOAD(Client } B) = \text{MAX\_VALUE } \{(\text{LOAD(Read@Service } E),$$
$$\text{LOAD(Write@(Service } E), \text{LOAD(Write@Service } D)\}$$

$$\text{LOAD(Client } C) = \text{MAX\_VALUE}$$
$$\{(\text{LOAD(Read@Service } E), \text{LOAD(Write@Service } E),$$
$$\text{LOAD(Write@Service } C), \text{LOAD(Write@Service } G)\}.$$

Load Value Data Structures

FIGS. 10-12 illustrate example embodiments of different types of data and data structures which may be used to facilitate read, write, and replication functionality within the storage system. In at least one embodiment, a separate instance of one or more of the data structures of FIGS. 10-12 may be associated with each respective Service which is running within the storage cluster (e.g., 910) and instantiated and updated at the same physical node where it's respective Service is instantiated. According to different embodiments, the storage system may be configured or designed to periodically and dynamically generate, populate, and update the various data structures illustrated in FIGS. 10-12.

FIG. 10 illustrates a specific example embodiment of a LOAD-Service data structure 1000. In at least one embodiment, the LOAD-Service data structure may be configured or designed for tracking system load characteristics and conditions associated with different services which are running within the storage system. In at least one embodiment, the LOAD-Service data structure 1000 may be used for tracking current or updated LOAD conditions for selected service(s) running at the storage cluster. In one embodiment, the LOAD-Service data structure 1000 may be used for tracking current or updated LOAD conditions for each active slice service running at the storage cluster.

An example embodiment of the LOAD-Service data structure 1000 will now be described by way of example with reference to the storage system configuration illustrated in FIG. 9. As illustrated in the example embodiment of FIG. 10, the LOAD-Service data structure 1000 may include a plurality of records (or entries) (e.g., 1001, 1003, 1005) relating to specifically identified services within the storage cluster (e.g., 910, FIG. 9). In at least one embodiment, each record may include one or more of the following types of information (or combinations thereof):
- Service Identifier information (e.g., Service_ID 1002) which identifies a specific Service running at the storage cluster;
- System Load information (e.g., LOAD(Service) 1004) which may include a value (e.g., LOAD(Service) value) representing the real-time (or near real-time) degree or amount of system load or stress associated the identified Service.

According to different embodiments, the LOAD(Service) value for a given Service may be automatically and/or dynamically calculated by the storage system (e.g., in real-time) based, at least partially, on measured amount(s) of read latency and/or write latency relating to read and/or write operations associated with the identified Service. For example, in one embodiment, the system may utilize the LOAD(Service) Analysis Procedure 1300 (FIG. 13A) to populate and/or update the LOAD-Service data structure 1000.

FIG. 11 illustrates an alternate example embodiment of a LOAD-Service data structure 1100 which may be configured or designed for tracking system load characteristics and conditions associated with different services which are running within the storage system. As illustrated in the example embodiment of FIG. 11, the LOAD-Service data structure 1100 may include a plurality of records (or entries) (e.g., 1101, 1103, 1105) relating to specifically identified services within the storage cluster. In at least one embodiment, each record may include one or more of the following types of information (or combinations thereof):
- Service Identifier information (e.g., Service_ID 1102) which identifies a specific Service running at the storage cluster;
- LOAD(Read) information 1104 which may include a LOAD(Read value representing the real-time (or near real-time) degree or amount of read-related system load or stress associated with the identified Service;
- LOAD(Write) information 1104 which may include a LOAD(Write) value representing the real-time (or near real-time) degree or amount of write-related system load or stress associated with the identified Service.

According to different embodiments, the LOAD(Read) values may be automatically and/or dynamically calculated (e.g., in real-time) based, at least partially, on measured amount(s) of read I/O latency which are associated with the identified Service. According to different embodiments, the LOAD(Write) values may be automatically and/or dynamically calculated (e.g., in real-time) based, at least partially, on measured amount(s) of write I/O latency and/or write cache queue depth(s) which are associated with the identified Service.

FIG. 12 illustrates a specific example embodiment of a Client-Service data structure 1200. In at least one embodiment, the Client-Service data structure 1200 may be configured or designed for tracking the respective Services which have been assigned to handle read/write operations associated with each Client interacting with the storage cluster. For illustrative purposes, the example Client-Service data structure embodiment of FIG. 12 will now be described by way of example with reference to the storage system configuration illustrated in FIG. 9. As illustrated in the example embodiment of FIG. 12, the Client-Service data structure 1200 may include a plurality of records (or entries) (e.g., 1201, 1203, 1205) each relating to a specifically identified Client of the storage system. In at least one embodiment, each record may include one or more of the following types of information (or combinations thereof):

- Client Identifier information (e.g., Client_ID 1202) which identifies a specific Client (e.g., Client A, Client B, Client C, etc.). In some embodiments, each Client which interacts with the storage cluster may have associated therewith a respectively unique connection identifier (Connection_ID which may be used by the system to identify and track communications, requests (e.g., read/write requests), activities, and/or other information which is associated with a given Client. Thus, for example, in one embodiment, the Client_ID portion 1202 of a given Client-Service data record (e.g., 1201) may be represented using that Client's assigned Connection_ID identifier.
- Primary slice service_ID information 1204 which identifies the primary slice service assigned to handle communications with the identified Client, including the servicing of read/write requests originating from the identify client.
- Associated Replication Service_ID(s) information 1206 which identifies one or more secondary Service(s) associated with the identified client, such as, for example, those Services which have been assigned to handle metadata (e.g., slice) and/or data replication tasks which are associated with the identified Client.

In at least one embodiment, each node in the Cluster reports to each other node its calculated load values. In this way each node (and/or Service) may be informed about each other node's (and/or Service's) load values. This information may be used to determine (e.g., on the slice service to which the Client is connected), the load value of the nodes and/or Services in the cluster of which that Client is using.

Load values can be calculated or determined using the shared node/Service resource usage information. In some embodiments, the storage system may be configured or designed to distinguish between overloaded conditions which are due to or caused by different System load values such as, for example, one or more of the following (or combinations thereof): reads, writes, bandwidth, compression, etc. For example, in at least one embodiment, the storage system may determine that the system (or portion thereof) is: read overloaded, write overloaded, bandwidth overloaded, compression overloaded, etc.

In at least one embodiment, the calculated load values (which, for example, may be unique to at least one Client volume) may be used by, along with client metrics, the target performance manager 402 (of FIG. 4) to determine a target performance value to be implemented for each respective Client.

Example Procedures And Flow Diagrams

FIGS. 13-17 illustrate various example embodiments of different procedures and/or procedural flows which may be used for facilitating activities relating to one or more of the storage system QoS aspects disclosed herein.

Figure 13A:
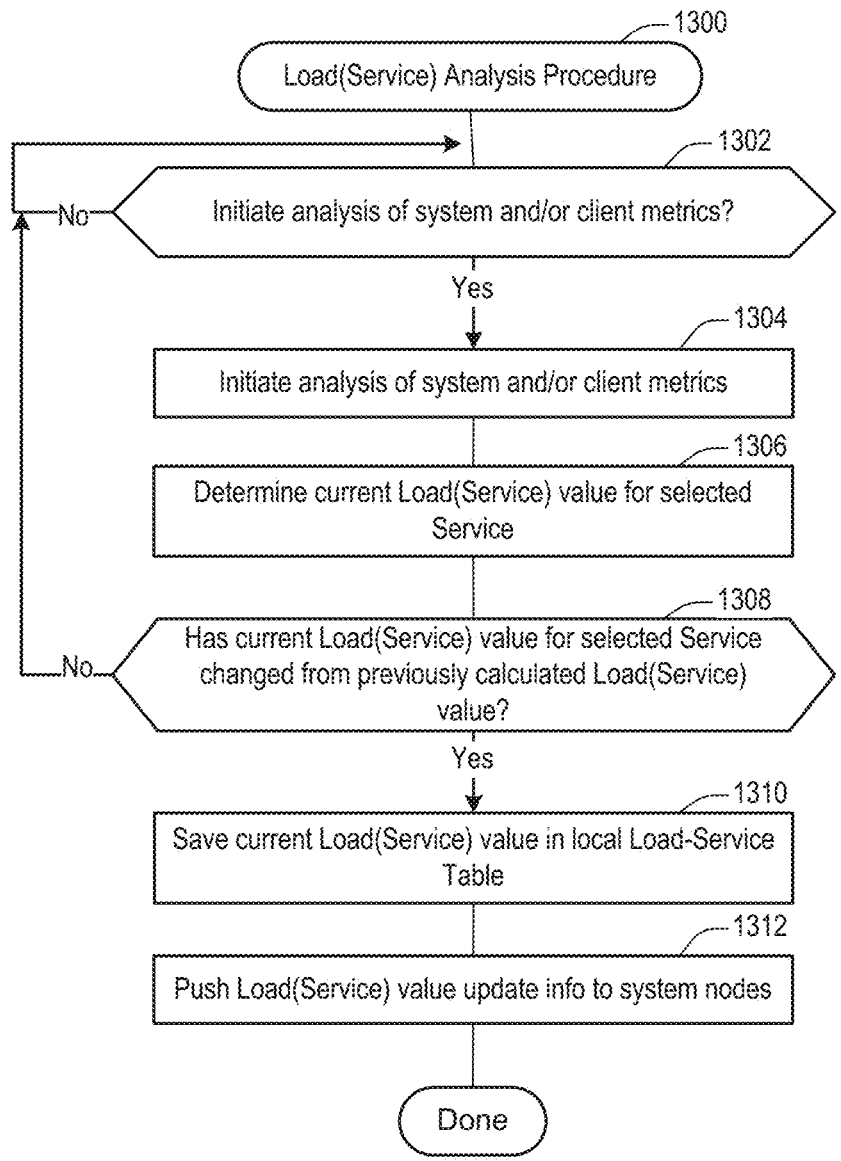
FIG. 13A shows a flow diagram of a LOAD(Service) Analysis Procedure in accordance with an illustrative implementation.

FIG. 13A shows a flow diagram of a LOAD(Service) Analysis Procedure 1300 in accordance with a specific embodiment. Additional, fewer, or different operations of the procedure 1300 may be performed, depending on the particular embodiment. The procedure 1300 can be implemented on a computing device. In one implementation, the procedure 1300 is encoded on a computer-readable medium that contains instructions that, when executed by a computing device, cause the computing device to perform operations of the procedure 1300. According to different embodiments, at least a portion of the various types of functions, operations, actions, and/or other features provided by the LOAD(Service) Analysis Procedure may be implemented at one or more nodes and/or volumes of the storage system. In at least one embodiment, the LOAD(Service) Analysis Procedure may be operable to perform and/or implement various types of functions, operations, actions, and/or other features relating to the analysis, measurement, calculation, and updating of LOAD information for one or more selected Services running at the storage cluster. According to specific embodiments, multiple instances or threads of the LOAD (Service) Analysis Procedure may be concurrently implemented and/or initiated via the use of one or more processors and/or other combinations of hardware and/or hardware and software.

According to different embodiments, one or more different threads or instances of the LOAD(Service) Analysis Procedure may be automatically and/or dynamically initiated and/or implemented at one or more different time intervals (e.g., during a specific time interval, at regular periodic intervals, at irregular periodic intervals, upon demand, etc.).

As illustrated in the example embodiment of FIG. 13A, at 1302 it is assumed that at least one condition or event has been detected for initiating execution of the LOAD(Service) Analysis Procedure. For example, in one embodiment, a given instance of the LOAD(Service) Analysis Procedure may be configured or designed to automatically run on a schedule, e.g., every 500 ms, 1 s, 10 s, 20 s, etc., to thereby analyze and determine an updated LOAD(Service) value for the identified Service. In some embodiments, the frequency of execution of the LOAD(Service) Analysis Procedure for a given Service may automatically and/or dynamically vary based on other events and/or conditions such as, for example, system metrics, client metrics, changes in QoS management policies, etc.

As shown at 1304, the LOAD(Service) Analysis Procedure may initiate analysis of system and/or client metrics for the identified Service. In at least one embodiment, the analysis of system and/or client metrics may include measuring, acquiring, and/or determining real-time information relating to read latency and/or write latency for read and/or write operations associated with the identified Service.

As shown at 1306, the LOAD(Service) Analysis Procedure may determine a current LOAD(Service) value for the identified Service. According to different embodiments, the LOAD(Service) value may be determined or calculated, for example, using one or more of the various LOAD calculation techniques described herein.

As shown at 1308, an optional determination can be made as to whether or not the current calculated LOAD(Service) value for the selected Service has changed from a previously calculated LOAD(Service) value. For example, in one embodiment, the LOAD(Service) Analysis Procedure may use the Service_ID of the identified Service to retrieve or access the LOAD(Service) value (e.g., 904, FIG. 9) from the local LOAD-Service Table (e.g., 900, FIG. 9), which, for example, may represent the most recent historical LOAD value for the identified Service. In at least one embodiment, the LOAD(Service) Analysis Procedure may compare the currently calculated LOAD(Service) value to the corresponding LOAD(Service) value retrieved from the LOAD-Service Table in order to determine whether or not the current calculated LOAD(Service) value for the selected Service has changed.

In one embodiment, if it is determined that the current calculated LOAD(Service) value for the selected Service has not changed from the LOAD(Service) value stored in the LOAD-Service Table, no additional actions may be needed at this time. Alternatively, if it is determined that the current calculated LOAD(Service) value for the selected Service has changed from the SLOAD(Service) value stored in the LOAD-Service Table calculated LOAD(Service) value, the currently calculated LOAD(Service) value for the selected Service may be stored (1310) in the local LOAD-Service Table. Additionally, information and/or notification relating to this update of the LOAD(Service) value for the selected Service may be pushed (1312) to one or more of the other nodes of the storage cluster. In at least one embodiment, upon receiving the LOAD(Service) value notification update, the other node(s) may automatically and dynamically update their respective local LOAD-Service Tables using the updated LOAD(Service) value information.

Figures 13B, 13C:
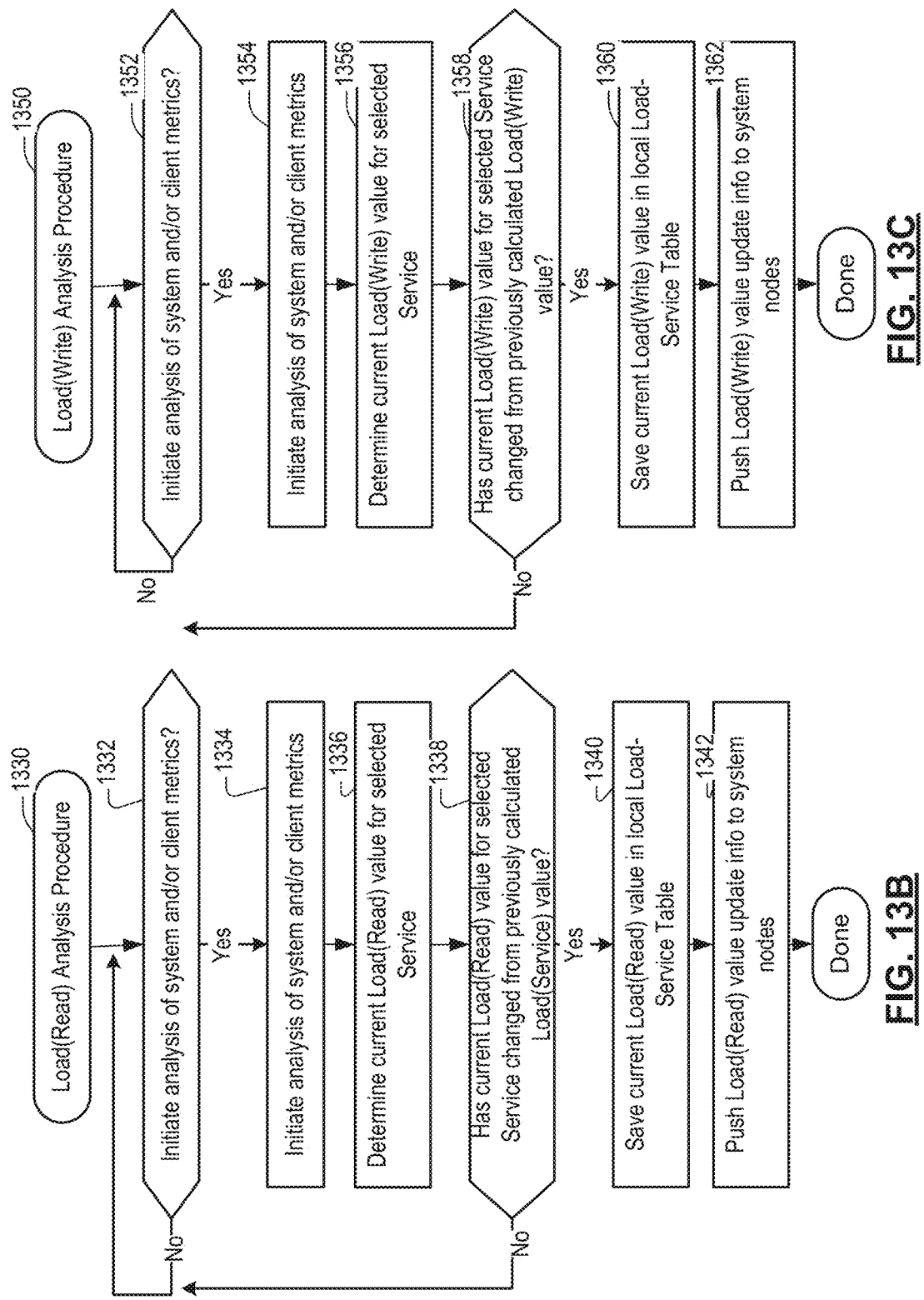
FIG. 13B shows a flow diagram of a LOAD(Read) Analysis Procedure in accordance with an illustrative implementation.
FIG. 13C shows a flow diagram of a LOAD(Write) Analysis Procedure in accordance with an illustrative implementation.

FIG. 13B shows a flow diagram of a LOAD(Read) Analysis Procedure 1330 in accordance with a specific embodiment. Additional, fewer, or different operations of the procedure 1330 may be performed, depending on the particular embodiment. The procedure 1330 can be implemented on a computing device. In one implementation, the procedure 1330 is encoded on a computer-readable medium that contains instructions that, when executed by a computing device, cause the computing device to perform operations of the procedure 1330. According to different embodiments, at least a portion of the various types of functions, operations, actions, and/or other features provided by the LOAD(Read) Analysis Procedure may be implemented at one or more nodes and/or volumes of the storage system. In at least one embodiment, the LOAD(Read) Analysis Procedure may be operable to perform and/or implement various types of functions, operations, actions, and/or other features relating to the analysis, measurement, calculation, and updating of LOAD information for read-related transactions associated with one or more selected Services running at the storage cluster.

As illustrated in the example embodiment of FIG. 13B, at 1332 it is assumed that at least one condition or event has been detected for initiating execution of the LOAD(Read) Analysis Procedure. As shown at 1334, the LOAD(Read) Analysis Procedure may initiate analysis of read-related system and/or client metrics for the identified Service. In at least one embodiment, the analysis of system and/or client metrics may include measuring, acquiring, and/or determining real-time information relating to read latency for read operations handle by (or associated with) the identified Service.

As shown at 1336, the LOAD(Read) Analysis Procedure may determine a current LOAD(Read) value for the identified Service. According to different embodiments, the LOAD(Read) value may be determined or calculated, for example, using one or more of the various LOAD calculation techniques described herein.

As shown at 1338, an optional determination can be made as to whether or not the current calculated LOAD(Read) value for the selected Service has changed from a previously calculated LOAD(Read) value. For example, in one embodiment, the LOAD(Read) Analysis Procedure may use the Service_ID of the identified Service to retrieve or access the LOAD(Read) value (e.g., 1104, FIG. 11) from the local LOAD-Service Table (e.g., 1100, FIG. 11), which, for example, may represent the most recent historical LOAD (Read) value for the identified Service. In at least one embodiment, the LOAD(Read) Analysis Procedure may compare the currently calculated LOAD(Read) value to the corresponding LOAD(Read) value retrieved from the LOAD-Service Table 1100 in order to determine whether or not the current calculated LOAD(Read) value for the selected Service has changed.

In one embodiment, if it is determined that the current calculated LOAD(Read) value for the selected Service has not changed from the LOAD(Read) value stored in the LOAD-Service Table, no additional actions may be needed at this time. Alternatively, if it is determined that the current calculated LOAD(Read) value for the selected Service has changed from the SLOAD(Read) value stored in the LOAD-Service Table calculated LOAD(Read) value, the currently calculated LOAD(Read) value for the selected Service may be stored (1340) in the local LOAD-Service Table 1100. Additionally, information and/or notification relating to this update of the LOAD(Read) value for the selected Service may be pushed (1342) to one or more of the other nodes of the storage cluster. In at least one embodiment, upon receiving the LOAD(Read) value notification update, the other node(s) may automatically and dynamically update their respective local LOAD-Service Tables using the updated LOAD(Read) value information.

FIG. 13C shows a flow diagram of a LOAD(Write) Analysis Procedure 1350 in accordance with a specific embodiment. Additional, fewer, or different operations of the procedure 1350 may be performed, depending on the particular embodiment. The procedure 1350 can be implemented on a computing device. In one implementation, the procedure 1350 is encoded on a computer-readable medium that contains instructions that, when executed by a computing device, cause the computing device to perform operations of the procedure 1350. According to different embodiments, at least a portion of the various types of functions, operations, actions, and/or other features provided by the LOAD(Write) Analysis Procedure may be implemented at one or more nodes and/or volumes of the storage system. In at least one embodiment, the LOAD(Write) Analysis Procedure may be operable to perform and/or implement various types of functions, operations, actions, and/or other features relating to the analysis, measurement, calculation, and updating of LOAD information for write-related transactions associated with one or more selected Services running at the storage cluster.

As illustrated in the example embodiment of FIG. 13C, at 1352 it is assumed that at least one condition or event has been detected for initiating execution of the LOAD(Write) Analysis Procedure. As shown at 1354, the LOAD(Write) Analysis Procedure may initiate analysis of write-related system and/or client metrics for the identified Service. In at least one embodiment, the analysis of system and/or client metrics may include measuring, acquiring, and/or determining real-time information relating to write latency for write operations handle by (or associated with) the identified Service.

As shown at 1356, the LOAD(Write) Analysis Procedure may determine a current LOAD(Write) value for the identified Service. According to different embodiments, the LOAD(Write) value may be determined or calculated, for example, using one or more of the various LOAD calculation techniques described herein.

As shown at 1358, an optional determination can be made as to whether or not the current calculated LOAD(Write) value for the selected Service has changed from a previously calculated LOAD(Write) value. For example, in one embodiment, the LOAD(Write) Analysis Procedure may use the Service_ID of the identified Service to retrieve or access the LOAD(Write) value (e.g., 1106, FIG. 11) from the local LOAD-Service Table (e.g., 1100, FIG. 11), which, for example, may represent the most recent historical LOAD (Write) value for the identified Service. In at least one embodiment, the LOAD(Write) Analysis Procedure may compare the currently calculated LOAD(Write) value to the corresponding LOAD(Write) value retrieved from the LOAD-Service Table 1100 in order to determine whether or not the current calculated LOAD(Write) value for the selected Service has changed.

In one embodiment, if it is determined that the current calculated LOAD(Write) value for the selected Service has not changed from the LOAD(Write) value stored in the LOAD-Service Table, no additional actions may be needed at this time. Alternatively, if it is determined that the current calculated LOAD(Write) value for the selected Service has changed from the SLOAD(Write) value stored in the LOAD-Service Table calculated LOAD(Write) value, the currently calculated LOAD(Write) value for the selected Service may be stored (1360) in the local LOAD-Service Table 1000. Additionally, information and/or notification relating to this update of the LOAD(Write) value for the selected Service may be pushed (1362) to one or more of the other nodes of the storage cluster. In at least one embodiment, upon receiving the LOAD(Write) value notification update, the other node(s) may automatically and dynamically update their respective local LOAD-Service Tables using the updated LOAD(Write) value information.

Figure 14:
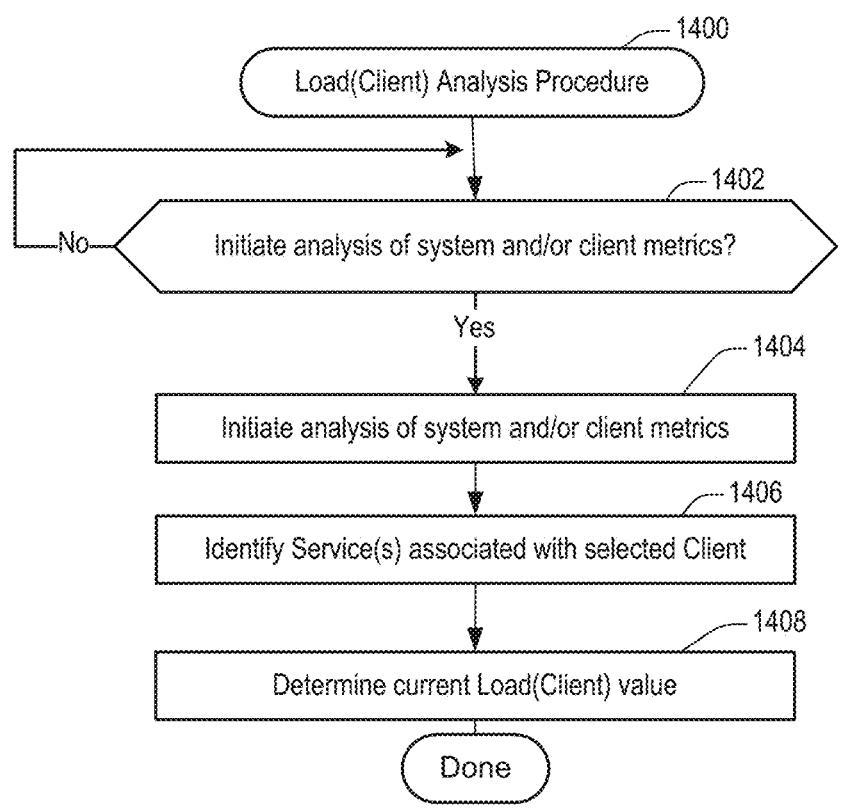
FIG. 14 shows a flow diagram of a LOAD(Client) Analysis Procedure in accordance with an illustrative implementation.

FIG. 14 shows a flow diagram of a LOAD(Client) Analysis Procedure 1400 in accordance with a specific embodiment. Additional, fewer, or different operations of the procedure 1400 may be performed, depending on the particular embodiment. The procedure 1400 can be implemented on a computing device. In one implementation, the procedure 1400 is encoded on a computer-readable medium that contains instructions that, when executed by a computing device, cause the computing device to perform operations of the procedure 1400. According to different embodiments, at least a portion of the various types of functions, operations, actions, and/or other features provided by the LOAD(Client) Analysis Procedure may be implemented at one or more nodes and/or volumes of the storage system. For example, in one embodiment, the LOAD(Client) Analysis Procedure may be initiated and/or performed by the primary slice service which has been assigned for handling read/write communications with the identified Client. In at least one embodiment, the LOAD(Client) Analysis Procedure may be operable to perform and/or implement various types of functions, operations, actions, and/or other features relating to the analysis, measurement, calculation, and updating of LOAD information for one or more selected Clients of the storage system.

According to specific embodiments, multiple instances or threads of the LOAD(Client) Analysis Procedure may be concurrently implemented and/or initiated via the use of one or more processors and/or other combinations of hardware and/or hardware and software. In one embodiment, a separate instance or thread of the LOAD(Client) Analysis Procedure may be initiated for each respective Client of the storage system. In the specific example embodiment of FIG. 14, it is assumed that the LOAD(Client) Analysis Procedure has been instantiated to dynamically determine a current or updated LOAD(Client) value for a selected Client (e.g., Client A, FIG. 9).

According to different embodiments, one or more different threads or instances of the LOAD(Client) Analysis Procedure may be automatically and/or dynamically initiated and/or implemented at one or more different time intervals (e.g., during a specific time interval, at regular periodic intervals, at irregular periodic intervals, upon demand, etc.). For example, in one embodiment, a given instance of the LOAD(Client) Analysis Procedure may be configured or designed to automatically run about every 10-20 sec (e.g., for a given Client) to thereby analyze and determine an updated LOAD(Client) value for the identified Client. In some embodiments, the frequency of execution of the LOAD(Client) Analysis Procedure for a given Client may automatically and/or dynamically vary based on other events and/or conditions such as, for example, system metrics, client metrics, changes in QoS management policies, etc.

In the example embodiment of FIG. 14, at 1402 it is assumed that at least one condition or event has been detected for initiating execution of the LOAD(Client) Analysis Procedure. As shown at 1404, the LOAD(Client) Analysis Procedure may initiate analysis of system and/or client metrics. In at least one embodiment, the analysis of system and/or client metrics may include measuring, acquiring, and/or determining real-time information relating to read latency and/or write latency for read/write operations associated with the identified Client.

In the specific example embodiment of FIG. 14, the process of determining a current LOAD(Client) value for the identified Client (e.g., Client A) may include identifying (1406) the appropriate Service(s) which are associated with selected Client, and which are to be factored into the computation of the LOAD(Client) value. In this example, it is assumed that the LOAD(Client) value is a client-specific value which reflects real-time system load for selected Services (e.g., primary slice service, replication services) which have been identified as being associated with the identified Client. For example, in one embodiment, the LOAD(Client) Analysis Procedure may use the Client_ID of the identified Client to access information from the local Client-Service data structure (e.g., 1100, FIG. 11) in order to identify the specific Services which are associated with the identified Client (e.g., for purposes of LOAD(Client) calculation). By way of example, referring to the specific example embodiment of the Service-Client data structure 1100 of FIG. 11, if it is assumed that the identified Client corresponds to Client A, the specific Services associated with Client A may be identified as Service A (e.g., which has been assigned as the primary slice service of Client A), and Service C (e.g., which has been assigned as a secondary Service of Client A for handling replication of Client A data/metadata).

As shown at 1408, a current LOAD(Client) value for the identified Client may be dynamically determined or calculated. According to different embodiments, the LOAD(Client) value may be dynamically determined or calculated, for example, using one or more of the various LOAD(Client) calculation techniques described herein. For example, in one embodiment, a current LOAD(Client) value for Client A may be dynamically calculated according to:

LOAD(Client A)=MAX_VALUE{(LOAD
(Read@Service A), LOAD(Write@(Service A)
LOAD(Write@Service C)}.

In at least one embodiment, the calculated LOAD(Client) value may be representative of relative degree or amount of system resource load or stress relating to JO activities associated with the Service(s) (e.g., primary Service and secondary Service(s)) which have been assigned to handle read, write and replication operations for the identified Client. In at least one embodiment, the storage system may be configured or designed to differentiate between read and write related transactions, and to separately analyze, determine and/or track LOAD(Read) and LOAD(Write) values associated with the identified Client. Example embodiments of such techniques are illustrated, for example, in FIGS. 16, 17, 20, and 21, and described in greater detail below.

One concern with the QoS implementation in the storage system is that clients of relatively "lower" importance may cause or contribute to increased latencies in the storage cluster, making it more difficult for those Clients of relatively higher importance (e.g., with relatively higher minimum QoS performance guarantees) to get fair, proportional throughput of the system.

By way of example with reference to FIG. 9, it may be assumed that the storage cluster 910 has been configured to implement the following QoS performance guarantees:

Client A (902) volume set at 15 k MIN IOPS
40 other Client volumes (including Clients B and C) set at 1 k MIN IOPS
IOs for each Client are 80% read IOPS and 20% write IOPS
Size of each IO transaction is 4 kb.

In this example embodiment, it may be assumed for illustrative purposes that the storage system is not able to provide Client A with the specified minimum guaranteed 15 k IOPS. Further, in this example, it is assumed that any increased read latency is caused by the other 40 Client volumes driving heavy read workloads. In at least one embodiment, the storage system may be configured or designed to dynamically determine that, because the Client A workload is read IOPS heavy, the write-based LOAD values may not play a significant role in the detected increase in read latency which may be contributing to the inability of Client A to achieve its MIN IOPS guarantees.

Target Performance Value Calculations

Figure 15:
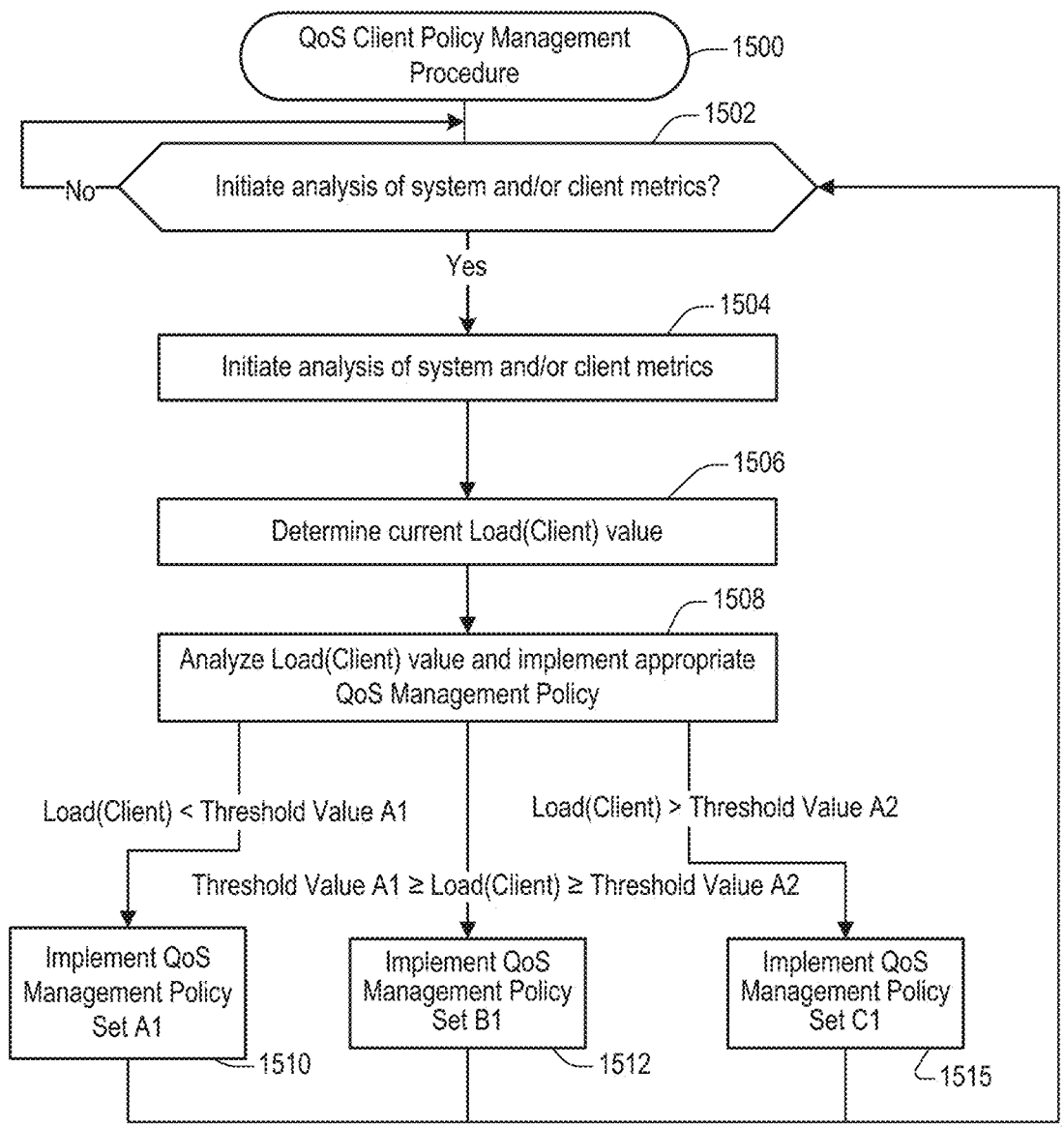
FIG. 15 shows a flow diagram of a QoS Client Policy Management Procedure in accordance with an illustrative implementation.

As noted above, the target performance manager 402 calculates a target performance value based upon system load values, client load values, and client QoS parameters. The target performance value is then used to control how the client can access resources of the storage system FIG. 15 shows a flow diagram of a QoS Client Policy Management Procedure 1500 in accordance with a specific embodiment. Additional, fewer, or different operations of the procedure 1500 may be performed, depending on the particular embodiment. The procedure 1500 can be implemented on a computing device. In one implementation, the procedure 1500 is encoded on a computer-readable medium that contains instructions that, when executed by a computing device, cause the computing device to perform operations of the procedure 1500. According to different embodiments, at least a portion of the various types of functions, operations, actions, and/or other features provided by the QoS Client Policy Management Procedure may be implemented at one or more nodes and/or volumes of the storage system. For purposes of illustration, it is assumed that the QoS Client Policy Management Procedure 1500 has been instantiated to perform QoS policy management for a selected Client (e.g., Client A, FIG. 9).

In at least one embodiment, the QoS Client Policy Management Procedure may be operable to perform and/or implement various types of functions, operations, actions, and/or other features relating to the analysis, measurement, calculation, and updating of LOAD information for one or more selected Clients of the storage system. According to specific embodiments, multiple instances or threads of the QoS Client Policy Management Procedure may be concurrently implemented and/or initiated via the use of one or more processors and/or other combinations of hardware and/or hardware and software. In one embodiment, a separate instance or thread of the QoS Client Policy Management Procedure may be initiated for performing or facilitating QoS policy management for each respective Client of the storage system.

According to different embodiments, one or more different threads or instances of the QoS Client Policy Management Procedure may be automatically and/or dynamically initiated and/or implemented at one or more different time intervals (e.g., during a specific time interval, at regular periodic intervals, at irregular periodic intervals, upon demand, etc.). For example, in one embodiment, a given instance of the QoS Client Policy Management Procedure may be configured or designed to automatically run about every 250-1000 milliseconds (e.g., every 500 ms for a given Client) to thereby analyze and determine an updated LOAD (Client) value for the identified Client. In some embodiments, the frequency of execution of the QoS Client Policy Management Procedure for a given Client may automatically and/or dynamically vary based on other events and/or conditions such as, for example, system metrics, client metrics, changes in QoS management policies, etc.

In the example embodiment of FIG. 15, at 1502 it is assumed that at least one condition or event has been detected for initiating execution of the QoS Client Policy Management Procedure. As shown at 1504, the QoS Client Policy Management Procedure may initiate analysis of system and/or client metrics. In at least one embodiment, the analysis of system and/or client metrics may include measuring, acquiring, and/or determining real-time information relating to read latencies and/or write latencies for IO activities associated with the Service(s) (e.g., primary Service and secondary Service(s)) which have been assigned to handle read, write, and replication operations for the identified Client.

As shown at 1506, the QoS Client Policy Management Procedure may determine a current Load(Client) value for the identified Client. According to different embodiments, the Load(Client) value may be determined or calculated, for example, using one or more of the various Load(Client) calculation techniques described herein. In the specific example embodiment of FIG. 15, it is assumed that the Load(Client) value is a client-specific Load value which factors in both read latency and write latency metrics for IO activities associated with the Service(s) (e.g., primary Service and secondary Service(s)) which have been assigned to handle read, write, and replication operations for the identified Client.

As shown at 1508, the QoS Client Policy Management Procedure may analyze the current Load(Client) value, and in response, may select and implement an appropriate QoS Management Policy for the identified Client. For example, as illustrated in the example embodiment of FIG. 15:

If it is determined that Load(Client)<Threshold Value A1, the QoS Client Policy Management Procedure may implement (1510) QoS Management Policy Set A1;
If it is determined that Threshold Value A1≥Load-(Client)≥Threshold Value A2, the QoS Client Policy Management Procedure may implement (1512) QoS Management Policy Set B1;
If it is determined that Load(Client)>Threshold Value A2, the QoS Client Policy Management Procedure may implement (1514) QoS Management Policy Set C1.

In at least one embodiment, the storage system may be configured or designed to: (1) differentiate between read and write related transactions, and to separately analyze, determine and/or track Load(Client-Read) and Load(Client-Write) values associated with a given Client; and (2) independently evaluate and implement different respective QoS Management Policy sets for Client-related Read IOPS and Client-related Write IOPS. Example embodiments of such techniques are illustrated, for example, in FIGS. 16, 17, 20, and 21, and described in greater detail below.

Figure 18:
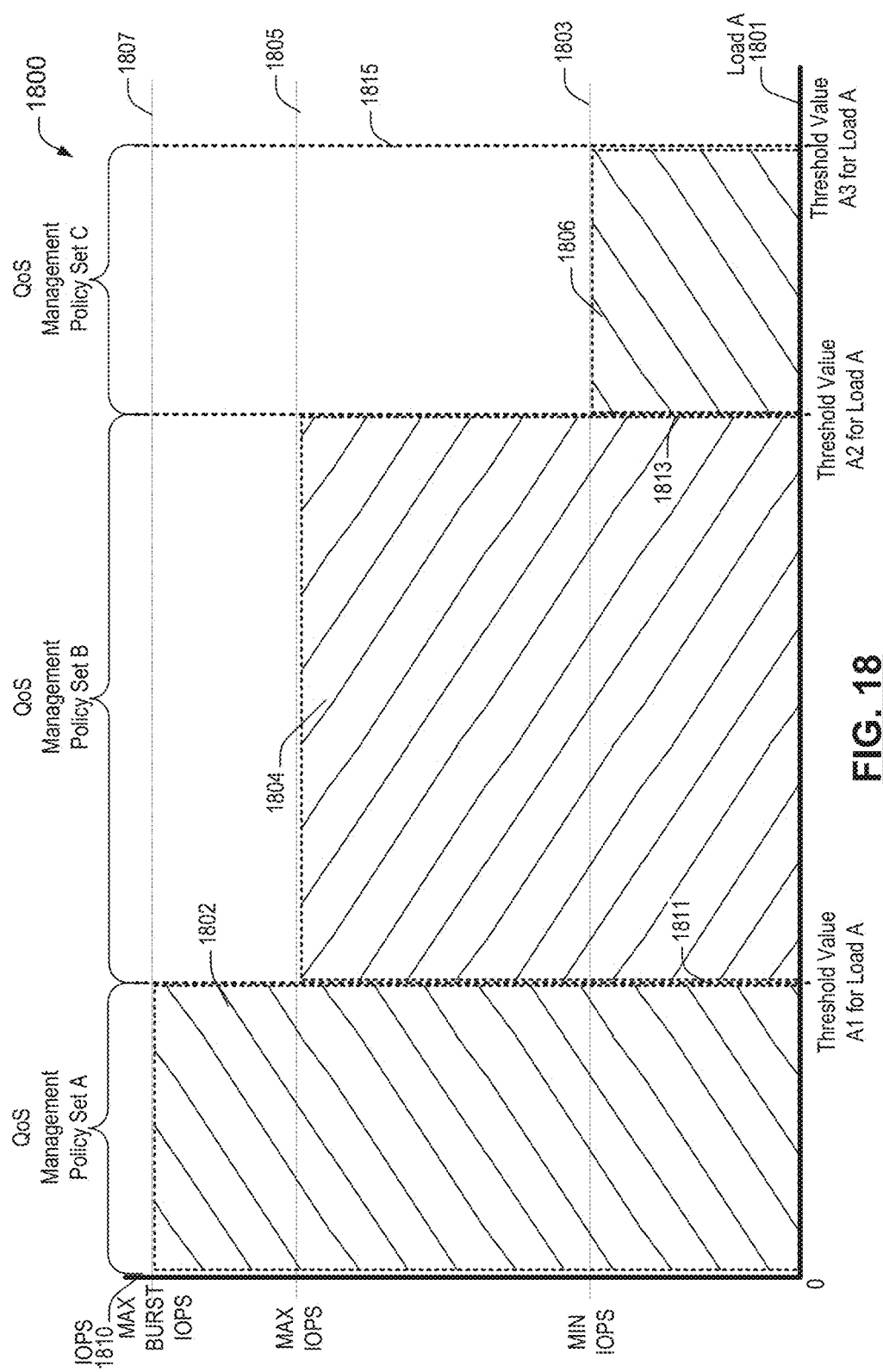
FIG. 18 shows a graphical representation illustrating how the storage system implements aspects of a QoS Client Policy Management Procedure such as that illustrated in FIG. 15 in accordance with an illustrative implementation.

FIG. 18 shows a graphical representation illustrating how the storage system may implement aspects of a QoS Client Policy Management Procedure such as that described with reference to FIG. 15. As illustrated in the example embodiment of FIG. 18, an X-Y graph portion 1800 is shown which includes a Y-axis representing target performance values corresponding to client IOPS 1810 (e.g., both read and write IOPS) and an X-axis representing a selected Load value (Load A, 1801). For purposes of illustration, it is assumed Load A corresponds to the Load(Client) metric for a selected Client (e.g., Client A). However, it will be appreciated that, in alternate embodiments (not shown) Load A may correspond to one of a variety of different metrics described herein such as, for example, one or more of the following (or combinations thereof): Load(Service); Load(Read); Load (Write); Load(Write_Buffer); Load(Client-Read); Load(Client-Write); etc.

As illustrated in the example embodiment of FIG. 18, graph portion 1800 includes reference lines 1803, 1805, 1807 which represent the min IOPS QoS parameter 1805; max IOPS QoS parameter 1805; and max burst IOPS QoS parameter 1807 for the identified Client. Additionally, graph portion 1800 includes reference lines 1811, 1813, 1815 which, in this example embodiment, represent threshold values which may be used to determine and select the current QoS Management Policy Set in effect for the identified Client. For example, as illustrated in FIG. 18:

During times when Load A<Threshold Value A1, QoS Management Policy Set A1 may be set into effect for the identified Client. In the specific example embodiment of FIG. 18, region 1802 provides a graphical representation of the possible values of IOPS that a client can operate at in accordance with the QoS Management Policy Set A1. In this example embodiment, the QoS Management Policy Set A1 may specify that the Client is allowed to accrue IOPS credits, and that the Client's IOPS: can be equal to or less than the Client's max IOPS QoS parameter 1805; may be allowed to operate above the Client's max burst IOPS QoS parameter based upon accrued credits; but is not to exceed the Client's max burst IOPS QoS parameter 1807.

During times when Threshold Value A1≥Load A≥Threshold Value A2, QoS Management Policy Set B1 may be set into effect for the identified Client. In the specific example embodiment of FIG. 18, region 1804 provides a graphical representation of the range of IOPS that a client can perform. In this example embodiment, the QoS Management Policy Set B1 may specify that the Client's IOPS are to be throttled to a target performance IOPS value which is within a range between the Client's max IOPS QoS parameter and min IOPS QoS parameter. A client can of course use less IOPS that the minimum IOPS depending upon client's use of the storage system. Additionally, the QoS Management Policy Set B1 may also specify that: (i) that the Client's IOPS are not to exceed the Client's max IOPS QoS parameter; and (ii) the throttling of the Client's IOPS increases as the Client's Load(Client) value increases from Threshold Value A1 (1811) to Threshold Value A2 (1813).

During times when Load A>Threshold Value A2, QoS Management Policy Set C1 may be set into effect for the identified Client. In the specific example embodiment of FIG. 18, region 1806 provides a graphical representation of the possible values of IOPS that a client can operate at in accordance with the QoS Management Policy Set C1. In this example embodiment, the QoS Management Policy Set B1 may specify that the Client's IOPS are to be throttled to a target performance IOPS value which is within a range between the Client's min IOPS QoS parameter and zero. Additionally, the QoS Management Policy Set C1 may also specify that the throttling of the Client's IOPS increases as the Client's Load(Client) value increases from Threshold Value A2 (1813) to Threshold Value A3 (1815).

Figure 19A:
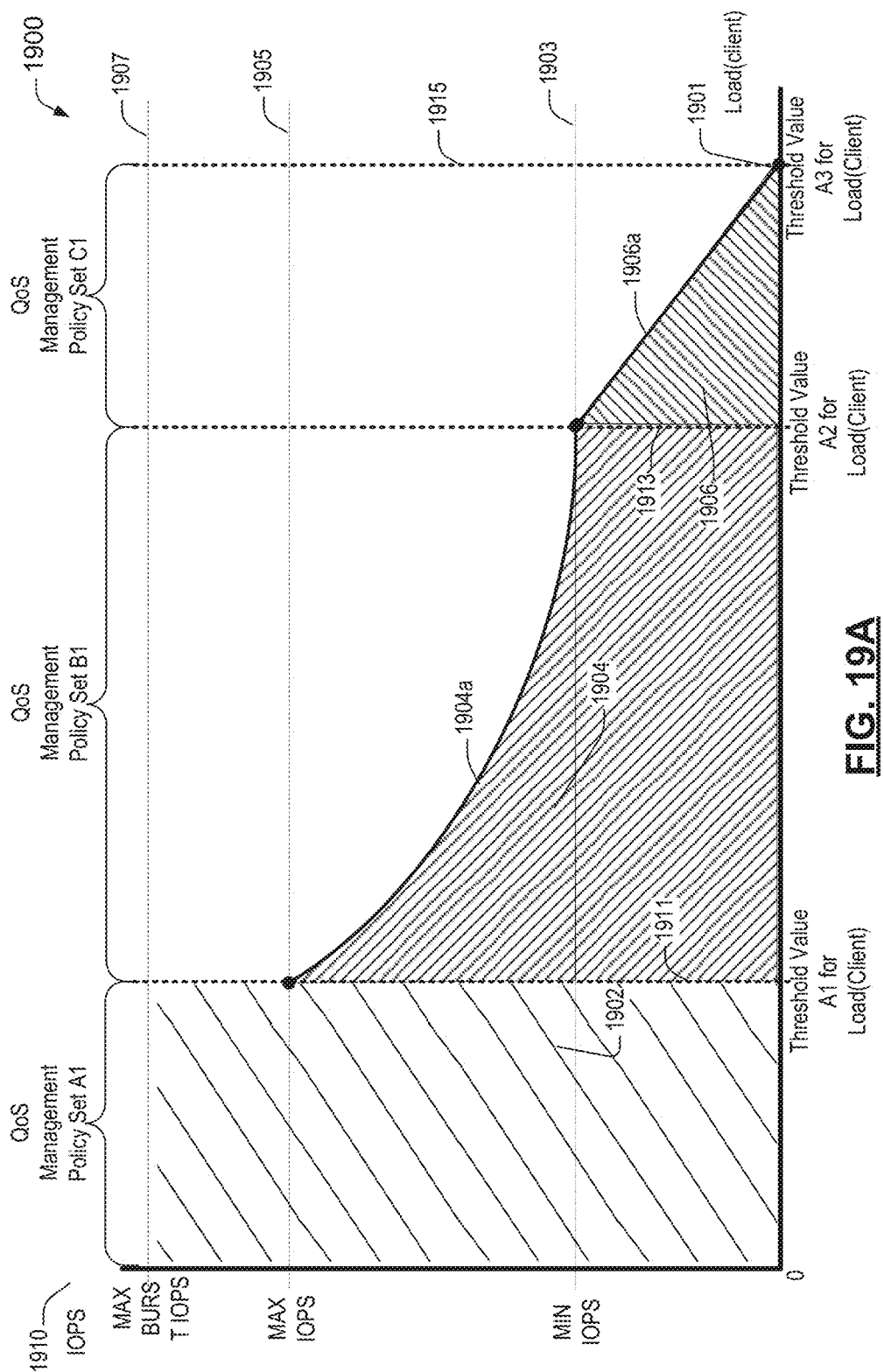
FIG. 19A shows a graphical representation illustrating how different QoS Management Policy Sets for throttling Client IOPS can be automatically and/or dynamically implemented in response changing Load(Client) conditions in accordance with an illustrative implementation.

FIG. 19A shows a graphical representation illustrating an example embodiment of how different QoS Management Policy Sets for throttling Client IOPS may be automatically and/or dynamically implemented in response changing Load (Client) conditions. As illustrated in the example embodiment of FIG. 19A, an X-Y graph portion 1900 is shown which includes a Y-axis representing target performance values corresponding to Client IOPS 1910 (e.g., both read and write IOPS) and an X-axis representing a client Load (Client) metric for a selected Client (e.g., Client A). As illustrated in the example embodiment of FIG. 19A, graph portion 1900 includes reference lines 1903, 1905, 1907 which represent the min IOPS QoS parameter 1905; max IOPS QoS parameter 1905; and max burst IOPS QoS parameter 1907 for the identified Client. Additionally, graph portion 1900 includes reference lines 1911, 1913, 1915 which, in this example embodiment, represent threshold values which may be used to determine and select the current QoS Management Policy Set to be put into effect for the identified Client. For example, as illustrated in FIG. 19A:

During times when Load(Client)<Threshold Value A1, QoS Management Policy Set A1 may be set into effect for the identified Client. In the specific example embodiment of FIG. 19A, region 1902 provides a graphical representation of the possible values of IOPS that a client can operate at in accordance with the QoS Management Policy Set A1. In this example embodiment, the QoS Management Policy Set A1 may specify that the Client is allowed to accrue IOPS credits, and that the Client's IOPS: can be equal to or less than the Client's max IOPS QoS parameter 1905; may be allowed to operate above the Client's max burst IOPS QoS parameter based upon accrued credits; but is not to exceed the Client's max burst IOPS QoS parameter 1907. In one embodiment, the Threshold Value A1 may be defined to be a numeric value within the range of 0.2-0.4 (e.g., Threshold Value A1=0.33);

During times when Threshold Value A1≥Load(Client) ≥Threshold Value A2, QoS Management Policy Set B1 may be set into effect for the identified Client. In the specific example embodiment of FIG. 19A, region 1904 provides a graphical representation of the possible values of IOPS that a client can operate at in accordance with the QoS Management Policy Set B1. In this example embodiment, the QoS Management Policy Set B1 may specify that the Client's IOPS are to be throttled to a target performance IOPS value which is within a range between the Client's max IOPS parameter and min IOPS parameter. Additionally, the QoS Management Policy Set B1 may also specify that, at any given time (while Threshold Value A1≥Load(Client)≥Threshold Value A2), the Client's IOPS are to be throttled to a target performance IOPS value which is dynamically determined based on the Client's current (e.g., real-time) Load(Client) value. For example, in the example embodiment of FIG. 19A, while the QoS Management Policy Set B1 is in effect, the Client's IOPS are to be throttled to a target performance IOPS value which does not exceed the corresponding IOPS value defined by boundary curve 1904a (e.g., which defines the upper limit of the Client's allowable IOPS relative to the Client's current Load(Client) value). In one embodiment, the Threshold Value A2 may be defined to be a numeric value within the range of 0.5-0.8 (e.g., Threshold Value A2=0.66);

During times when Load(Client)>Threshold Value A2, QoS Management Policy Set C1 may be set into effect for the identified Client. In the specific example embodiment of FIG. 19A, region 1906 provides a graphical representation of the possible values of IOPS that a client can operate at in accordance with the QoS Management Policy Set C1. In this example embodiment, the QoS Management Policy Set C1 may specify that the Client's IOPS are to be throttled to a target performance IOPS value which is within a range between the Client's min IOPS parameter and zero. Additionally, the QoS Management Policy Set C1 may also specify that, at any given time (Load(Client)>Threshold Value A2), the Client's IOPS are to be throttled to an target performance IOPS value which is dynamically determined based on the Client's Load (Client) value. For example, in the example embodiment of FIG. 19A, while the QoS Management Policy Set C1 is in effect, the Client's IOPS are to be throttled to an IOPS value which does not exceed the corresponding IOPS value defined by boundary curve 1906a (e.g., which defines the upper limit of the Client's allowable IOPS relative to the Client's current Load (Client) value). In one embodiment, the Threshold Value A3 may be defined to be a numeric value within the range of 0.75-1.0 (e.g., Threshold Value A3=0.85)

According to different embodiments, QoS Management Policy Sets (and IOPS boundary curves associated therewith) may be Client specific, and may therefore differ for one or more Clients. For example, in one embodiment the QoS Management Policy Sets which may be implemented for Client A may differ from the QoS Management Policy Sets implemented for Clients B and C. Additionally, in at least one embodiment, IOPS throttling may be independently implemented and managed across multiple different Clients on a per Client basis.

Figure 19B:
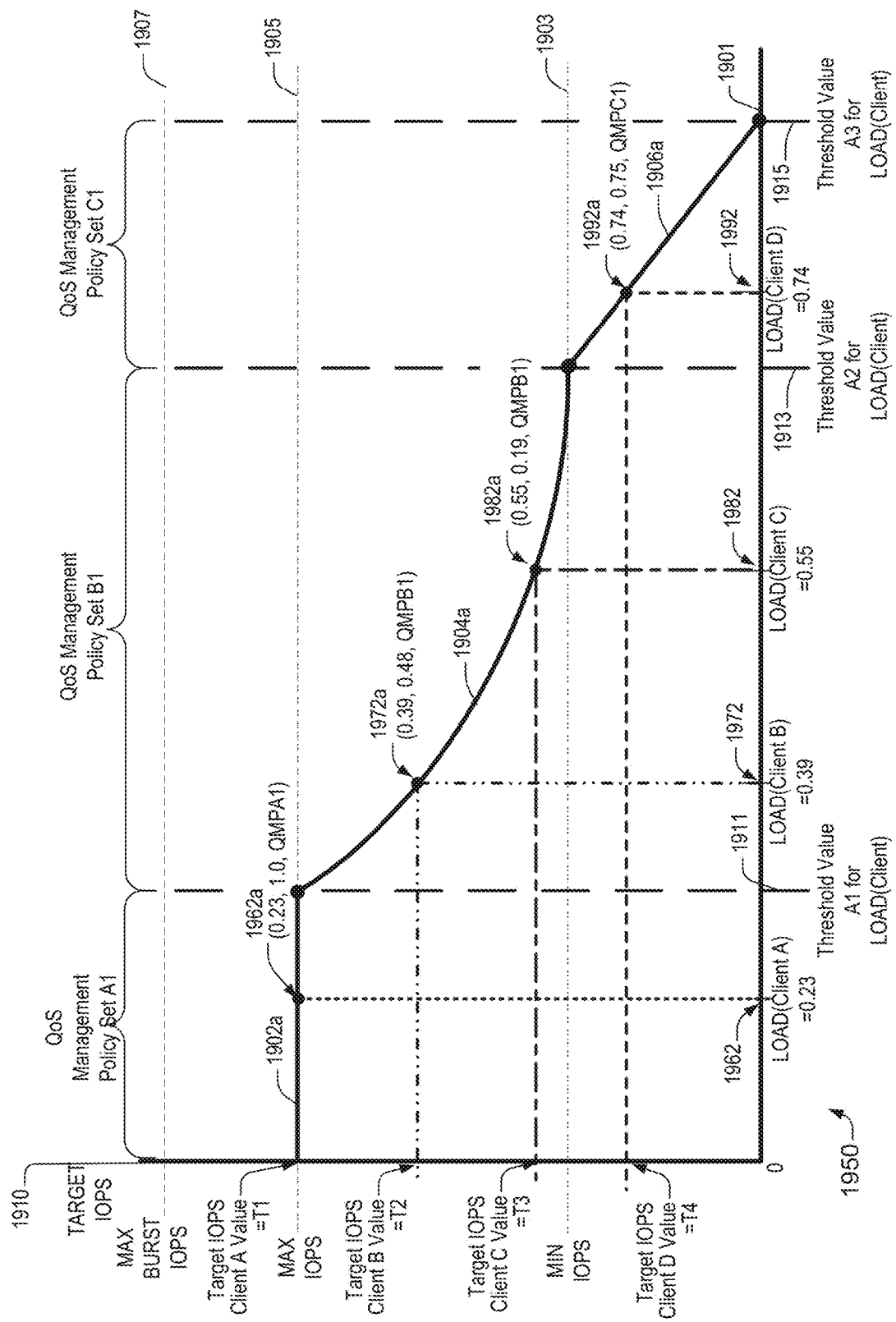
FIG. 19B shows a graphic representation illustrating how QoS Management and IOPS throttling may be simultaneously, independently, and dynamically implemented for multiple different clients of the storage system in accordance with an illustrative implementation.

For example, FIG. 19B shows an example embodiment illustrating how QoS Management and IOPS throttling may be simultaneously, independently, and dynamically implemented for multiple different Clients (e.g., Client A, Client B, Client C) of the storage system. As illustrated in the example embodiment of FIG. 19B, an X-Y graph portion 1950 is shown which includes a Y-axis representing target performance values corresponding to client IOPS 1910 (e.g., both read and write IOPS) and an X-axis representing client Load(Client) values.

As illustrated in the example embodiment of FIG. 19B, graph portion 1950 includes indications of the each Client's min IOPS QoS parameter 1903, max IOPS QoS parameter 1905; and max burst IOPS QoS parameter 1909. Additionally, graph portion 1950 includes reference lines 1911, 1913, 1915 which, in this example embodiment, represent threshold values which may be used to determine the particular QoS Management Policy Set(s) to be used for determining QoS management and/or IOPS throttling for each Client.

In the specific example embodiment of FIG. 19B, it is assumed, for ease of illustration, that the min IOPS, max IOPS, and max burst IOPS values for Clients A, B, C are identical. However, in other embodiments, the respective the min IOPS, max IOPS, and max burst IOPS values for Clients A, B, C may differ for each Client. Similarly, it is assumed for ease of illustration, that the same LOAD threshold values (e.g., A1, A2, A3) are to be applied to Clients A, B, C. However, in other embodiments, each Client may have associated therewith a respective set of LOAD threshold values which may be used for determining the particular QoS Management Policy Set(s) to be used for that Client.

As illustrated in the example embodiment of FIG. 19B, it is assumed, for purposes of illustration, that Client A's current LOAD value ("LOAD(Client A)") 1962 has been calculated to be LOAD(Client A)=0.23, which is assumed to be less than the LOAD(Client) Threshold Value A1. Accordingly, in this example embodiment, the Storage system may determine that QoS Management Policy Set A1 is to be used for determining the Target IOPS value for Client A.

Thus, for example, in the example embodiment of FIG. 19B, the Target IOPS value for Client A may be determined by the coordinate (1962a) at which the LOAD(Client A) value intersects with QoS Management Policy Set A1 ("QMPA1") curve 1902a. As illustrated in this example, the values associated with coordinate 1962a are: (0.23, 1.0, QMPA1), where:

0.23 represents the LOAD(Client A) value;
QMPA1 represents QoS Management Policy Set A1;
1.0 represents a scaled (and/or normalized) target IOPS ratio whose value may be determined based on a function of the QoS Management Policy Set A and the LOAD(Client) value. For example, in the specific example embodiment of FIG. 19B, the target IOPS ratio value may be determined by the point of intersection (e.g., 1962a) at which the LOAD(Client A) value intersects with QoS Management Policy Set A1 ("QMPA1") curve 1902a.

In at least one embodiment, the Target IOPS value (e.g., T1) for Client A may be expressed as a function which is relative to Client A's min and max IOPS values, such as, for example:

TargetIOPS(ClientA)=T1

$$T2 = (1.0 * (MAX_{IOPS(ClientA)} + MIN_{IOPS(ClientA)})) + MIN_{IOPS(ClientA)}$$

Thus, for example, the storage system may implement QoS Management for Client A's IOs by causing Client A's IOPS to be throttled (at least temporarily) to an IOPS value not to exceed T1. In the example embodiment of FIG. 19B, the Target IOPS value for Client A (T1) may be determined to be equal to Client A's MAX IOPS Value. Additionally, the QoS Management Policy Set A1 may also permit use of Client A's credits for enabling Client A's IOPS to burst above its respective MAX IOPS value.

Further, as illustrated in the example embodiment of FIG. 19B, it is assumed, for purposes of illustration, that Client B's current LOAD value ("LOAD(Client B)") 1972 has been calculated to be LOAD(Client B)=0.39, which is assumed to be greater than the LOAD(Client) Threshold Value A1, but less than LOAD(Client) Threshold Value A2. Accordingly, in this example embodiment, the storage system may determine that QoS Management Policy Set B1 is to be used for determining the Target IOPS value for Client B.

Thus, for example, in the example embodiment of FIG. 19B, the Target IOPS value for Client B may be determined by the coordinate (1972a) at which the LOAD(Client B) value intersects with QoS Management Policy Set B1 ("QMPB1") curve 1904a. As illustrated in this example, the values associated with coordinate 1972a are: (0.39, 0.48, QMPB1), where:
- 0.39 represents the LOAD(Client B) value;
- QMPB1 represents QoS Management Policy Set B1;
- 0.48 represents a scaled (and/or normalized) target IOPS ratio whose value may be determined based on a function of the QoS Management Policy Set B and the LOAD(Client) value. For example, in the specific example embodiment of FIG. 19B, the target IOPS ratio value may be determined by the point of intersection (e.g., 1972a) at which the LOAD(Client B) value intersects with QoS Management Policy Set B1 ("QMPB1") curve 1904a.

In at least one embodiment, the Target IOPS value (e.g., T2) for Client B may be expressed as a function which is relative to Client B's MIN and MAX IOPS values, such as, for example:

TargetIOPS(ClientB)=$T2$ $T2=(0.48*(MAX_{IOPS(ClientB)}+MIN_{IOPS(ClientB)}))+MIN_{IOPS(ClientB)}$ Thus, for example, the storage system may implement QoS Management for Client B's IOs by causing Client B's IOPS to be throttled (at least temporarily) to an IOPS value not to exceed T2.

Similarly, as illustrated in the example embodiment of FIG. 19B, it is assumed, for purposes of illustration, that Client C's current LOAD value ("LOAD(Client C)") 1982 has been calculated to be LOAD(Client C)=0.55, which is assumed to be greater than the LOAD(Client) Threshold Value A1, but less than LOAD(Client) Threshold Value A2. Accordingly, in this example embodiment, the storage system may determine that QoS Management Policy Set B1 is to be used for determining the Target IOPS value for Client C.

Thus, for example, in the example embodiment of FIG. 19B, the Target IOPS value for Client C may be determined by the coordinate (1982a) at which the LOAD(Client C) value intersects with QoS Management Policy Set B1 ("QMPB1") curve 1904a. As illustrated in this example, the values associated with coordinate 1982a are: (0.55, 0.18, QMPB1), where:
- 0.55 represents the LOAD(Client C) value;
- QMPB1 represents QoS Management Policy Set B1;
- 0.19 represents a scaled (and/or normalized) target IOPS ratio whose value may be determined based on a function of the QoS Management Policy Set B and the LOAD(Client) value. For example, in the specific example embodiment of FIG. 19B, the target IOPS ratio value may be determined by the point of intersection (e.g., 1982a) at which the LOAD(Client C) value intersects with QoS Management Policy Set B1 ("QMPB1") curve 1904a.

In at least one embodiment, the Target IOPS value (e.g., T3) for Client C may be expressed as a function which is relative to Client C's MIN and MAX IOPS values, such as, for example:

TargetIOPS(ClientC)=$T3$ $T3=(0.19*(MAX_{IOPS(ClientC)}+MIN_{IOPS(ClientC)}))+MIN_{IOPS(ClientC)}$ Thus, for example, the Storage system may implement QoS Management for Client C's IOs by causing Client C's IOPS to be throttled (at least temporarily) to an IOPS value not to exceed T3.

Additionally, as illustrated in the example embodiment of FIG. 19B, it is assumed, for purposes of illustration, that Client D's current LOAD value ("LOAD(Client D)") 1992 has been calculated to be LOAD(Client D)=0.74, which is assumed to be greater than the LOAD(Client) Threshold Value A2. Accordingly, in this example embodiment, the Storage system may determine that QoS Management Policy Set C1 is to be used for determining the Target IOPS value for Client D.

Thus, for example, in the example embodiment of FIG. 19B, the Target IOPS value for Client D may be determined by the coordinate (1992a) at which the LOAD(Client D) value intersects with QoS Management Policy Set C1 ("QMPC1") curve 1906a. As illustrated in this example, the values associated with coordinate 1992a are: (0.74, 0.74, QMPC1), where:
- 0.74 represents the LOAD(Client D) value;
- QMPC1 represents QoS Management Policy Set C1;
- 0.75 represents a scaled (and/or normalized) target IOPS ratio whose value may be determined based on a function of the QoS Management Policy Set C and the LOAD(Client) value. For example, in the specific example embodiment of FIG. 19B, the target IOPS ratio value may be determined by the point of intersection (e.g., 1992a) at which the LOAD(Client D) value intersects with QoS Management Policy Set C1 ("QMPC1") curve 1906a.

In at least one embodiment, the Target IOPS value (e.g., T4) for Client D may be expressed as a function which is relative to Client D's MIN and MAX IOPS values, such as, for example:

TargetIOPS(ClientD)=$T4$ $T4=0.75*MIN_{IOPS(ClientD)}$

Thus, for example, the storage system may implement QoS Management for Client D's IOs by causing Client D's IOPS to be throttled (at least temporarily) to an IOPS value not to exceed T4.

It will be appreciated that, in at least some embodiments, the Storage system may proportionally throttle IOPS for each Client relative to that Clients defined range of MIN and MAX IOPS. In some embodiments, the different QoS Management Policy Sets which are implemented for each respective client may have the effect of prioritizing some Clients over others. Additionally, in some embodiments, the QoS Management Policy Sets may preemptively decrease the target IOPS values for one or more Clients in order to help prevent the system from getting overloaded.

As mentioned previously, the storage system may be configured or designed to: (1) differentiate between read and write related transactions, and to separately analyze, determine and/or track Load(Client-Read) and Load(Client-Write) values associated with a given Client; and (2) independently evaluate and implement different respective QoS Management Policy sets for Client-related Read IOPS and Client-related Write IOPS. Example embodiments of such techniques are illustrated, for example, in FIGS. 16, 17, 20, and 21.

Figure 16:
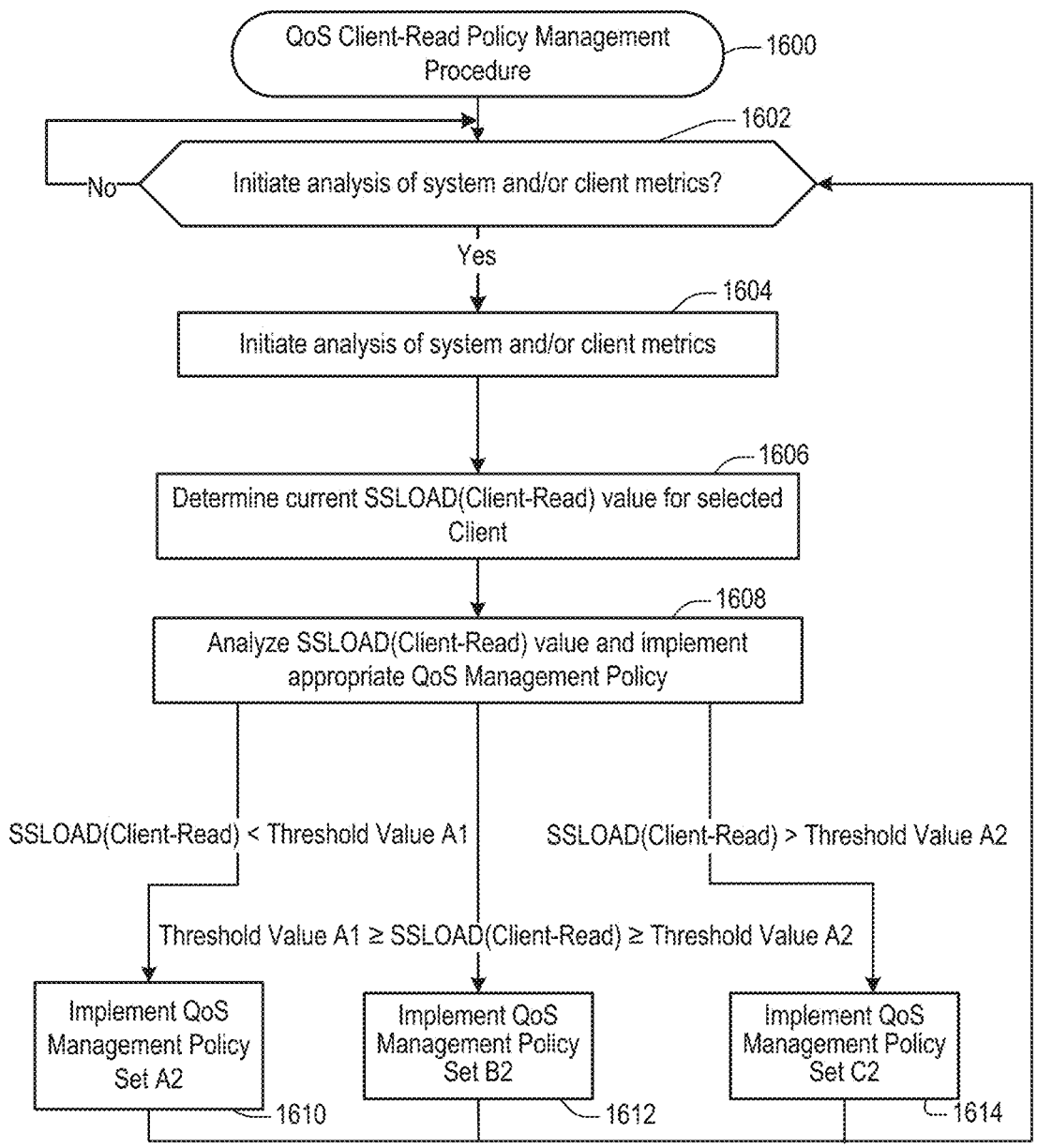
FIG. 16 shows a flow diagram of a QoS Client-Read Policy Management Procedure in accordance with an illustrative implementation.

FIG. 16 shows a flow diagram of a QoS Client-Read Policy Management Procedure 1600 in accordance with a specific embodiment. Additional, fewer, or different operations of the procedure 1600 may be performed, depending on the particular embodiment. The procedure 1600 can be implemented on a computing device. In one implementation, the procedure 1600 is encoded on a computer-readable medium that contains instructions that, when executed by a computing device, cause the computing device to perform operations of the procedure 1600. According to different embodiments, at least a portion of the various types of functions, operations, actions, and/or other features provided by the QoS Client-Read Policy Management Procedure may be implemented at one or more nodes and/or volumes of the storage system. For purposes of illustration, it is assumed that the QoS Client-Read Policy Management Procedure 1600 has been instantiated to perform QoS policy management for a selected Client (e.g., Client A, FIG. 9).

In at least one embodiment, the QoS Client-Read Policy Management Procedure may be operable to perform and/or implement various types of functions, operations, actions, and/or other features relating to the analysis, measurement, calculation, and updating of Load information for one or more selected Clients of the storage system. According to specific embodiments, multiple instances or threads of the QoS Client-Read Policy Management Procedure may be concurrently implemented and/or initiated via the use of one or more processors and/or other combinations of hardware and/or hardware and software. In one embodiment, a separate instance or thread of the QoS Client-Read Policy Management Procedure may be initiated for performing or facilitating QoS policy management for each respective Client of the storage system.

According to different embodiments, one or more different threads or instances of the QoS Client-Read Policy Management Procedure may be automatically and/or dynamically initiated and/or implemented at one or more different time intervals (e.g., during a specific time interval, at regular periodic intervals, at irregular periodic intervals, upon demand, etc.). or example, in one embodiment, a given instance of the QoS Client-Read Policy Management Procedure may be configured or designed to automatically run about every 250-1000 milliseconds (e.g., every 500 ms for a given Client) to thereby analyze and determine an updated Load(Client-Read) value for the identified Client. In some embodiments, the frequency of execution of the QoS Client-Read Policy Management Procedure for a given Client may automatically and/or dynamically vary based on other events and/or conditions such as, for example, system metrics, client metrics, changes in QoS management policies, etc.

In the example embodiment of FIG. 16, at 1602 it is assumed that at least one condition or event has been detected for initiating execution of the QoS Client-Read Policy Management Procedure. As shown at 1604, the QoS Client-Read Policy Management Procedure may initiate analysis of system and/or client metrics. In at least one embodiment, the analysis of system metrics may include measuring, acquiring, and/or determining real-time information relating to read latencies for IO activities associated with the Service(s) which have been assigned to handle read operations for the identified Client.

As shown at 1606, the QoS Client-Read Policy Management Procedure may determine a current Load(Client-Read) value for the identified Client. According to different embodiments, the Load(Client-Read) value may be determined or calculated, for example, using one or more of the various Load(Client-Read) calculation techniques described herein. In at least one embodiment, the Load(Client-Read) value may be expressed as a client-specific Load value which takes into account read latency metrics for IO activities associated with the Service(s) which have been assigned to handle read operations for the identified Client.

As shown at 1608, the QoS Client-Read Policy Management Procedure may analyze the current Load(Client-Read) value, and in response, may select and implement an appropriate QoS Management Policy for the identified Client. For example, as illustrated in the example embodiment of FIG. 16:

If it is determined that Load(Client-Read)<Threshold Value A1, the QoS Client-Read Policy Management Procedure may implement (1610) QoS Management Policy Set A2;

If it is determined that Threshold Value A1≥Load(Client-Read)≥Threshold Value A2, the QoS Client-Read Policy Management Procedure may implement (1612) QoS Management Policy Set B2;

If it is determined that Load(Client-Read)>Threshold Value A2, the QoS Client-Read Policy Management Procedure may implement (1615) QoS Management Policy Set C2.

Figure 20:
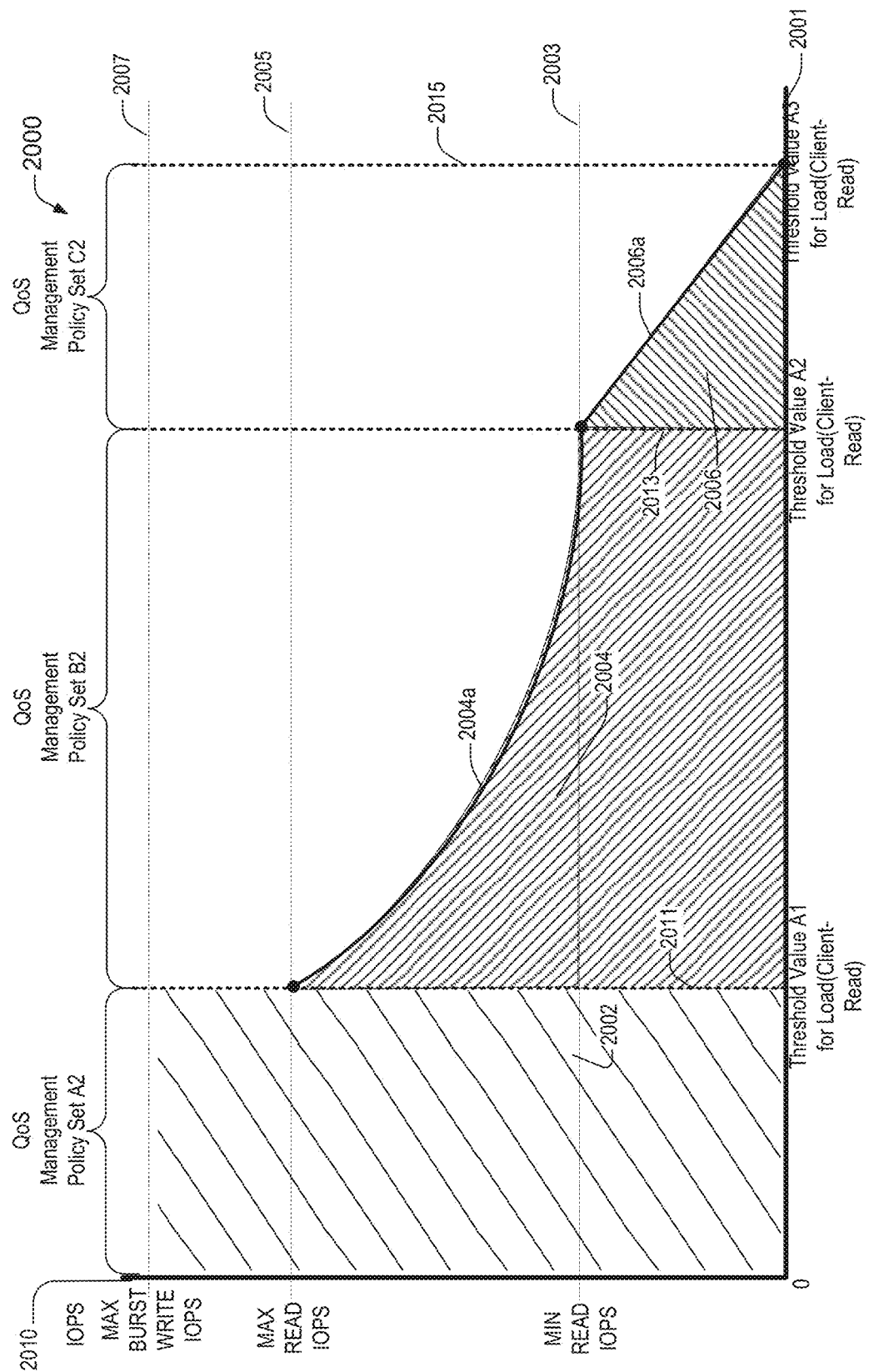
FIG. 20 shows a graphical representation illustrating how different QoS Management Policy Sets for throttling Client IOPS can be automatically and/or dynamically implemented in response changing Load(Client-Read) conditions in accordance with an illustrative implementation.

FIG. 20 shows a graphical representation illustrating an example embodiment of how different QoS Management Policy Sets for throttling Client IOPS may be automatically and/or dynamically implemented in response changing Load (Client-Read) conditions. As illustrated in the example embodiment of FIG. 20, an X-Y graph portion 2000 is shown which includes a Y-axis representing target performance values corresponding to Client read IOPS 2010 and an X-axis representing Load(Client-Read) values for a selected Client (e.g., Client A). As illustrated in the example embodiment of FIG. 20, graph portion 2000 includes reference lines 2003, 2005, 2007 which represent the min read IOPS QoS parameter 2003; max read IOPS QoS parameter 2005; and max burst read IOPS QoS parameter 2007 for the identified Client. Additionally, graph portion 2000 includes reference lines 2011, 2013, 2015 which, in this example embodiment, represent threshold values which may be used to determine and select the current QoS Management Policy Set to be put into effect for the identified Client. For example, as illustrated in FIG. 20:

During times when Load(Client-Read)<Threshold Value A2, QoS Management Policy Set A2 may be set into effect for the identified Client. In the specific example embodiment of FIG. 20, region 2002 provides a graphical representation of the possible values of IOPS that a client can operate at in accordance with the QoS Management Policy Set A2. In this example embodiment, the QoS Management Policy Set A2 may specify that the Client is allowed to accrue IOPS credits, and that the Client's IOPS: can be equal to or less than the Client's max IOPS QoS parameter 2005; may be allowed to operate above the Client's max burst IOPS QoS parameter based upon accrued credits; but is not to exceed the Client's max burst IOPS QoS parameter 2007.

During times when Threshold Value A2≥Load(Client-Read)≥Threshold Value A2, QoS Management Policy Set B2 may be set into effect for the identified Client. In the specific example embodiment of FIG. 20, region 2004 provides a graphical representation of the possible values of IOPS that a client can operate at in accordance with the QoS Management Policy Set B2. In this example embodiment, the QoS Management Policy Set B2 may specify that the Client's read IOPS are to be throttled to a target performance IOPS value which is within a range between the Client's max read IOPS QoS parameter and min read IOPS QoS parameter.

Additionally, the QoS Management Policy Set B2 may also specify that, at any given time (while Threshold Value A1≥Load(Client-Read)≥Threshold Value A2), the Client's read IOPS are to be throttled to a target performance IOPS value which is dynamically determined based on the Client's current (e.g., real-time) Load(Client-Read) value. For example, in the example embodiment of FIG. 20, while the QoS Management Policy Set B2 is in effect, the Client's read IOPS are to be throttled to a target performance IOPS value which does not exceed the corresponding IOPS value defined by boundary curve 2004a (e.g., which defines the upper limit of the Client's allowable read IOPS relative to the Client's current Load(Client-Read) value).

During times when Load(Client-Read)>Threshold Value A2, QoS Management Policy Set C2 may be set into effect for the identified Client. In the specific example embodiment of FIG. 20, region 2006 provides a graphical representation of the possible values of IOPS that a client can operate at in accordance with the QoS Management Policy Set C2. In this example embodiment, the QoS Management Policy Set C2 may specify that the Client's read IOPS are to be throttled to a target performance IOPS value which is within a range between the Client's min read IOPS QoS parameter and zero. Additionally, the QoS Management Policy Set C2 may also specify that, at any given time (Load(Client-Read)>Threshold Value A2), the Client's read IOPS are to be throttled to a target performance IOPS value which is dynamically determined based on the Client's Load(Client-Read) value. For example, in the example embodiment of FIG. 20, while the QoS Management Policy Set C2 is in effect, the Client's read IOPS are to be throttled to an IOPS value which does not exceed the corresponding IOPS value defined by boundary curve 2006a (e.g., which defines the upper limit of the Client's allowable read IOPS relative to the Client's current Load(Client-Read) value).

Figure 17:
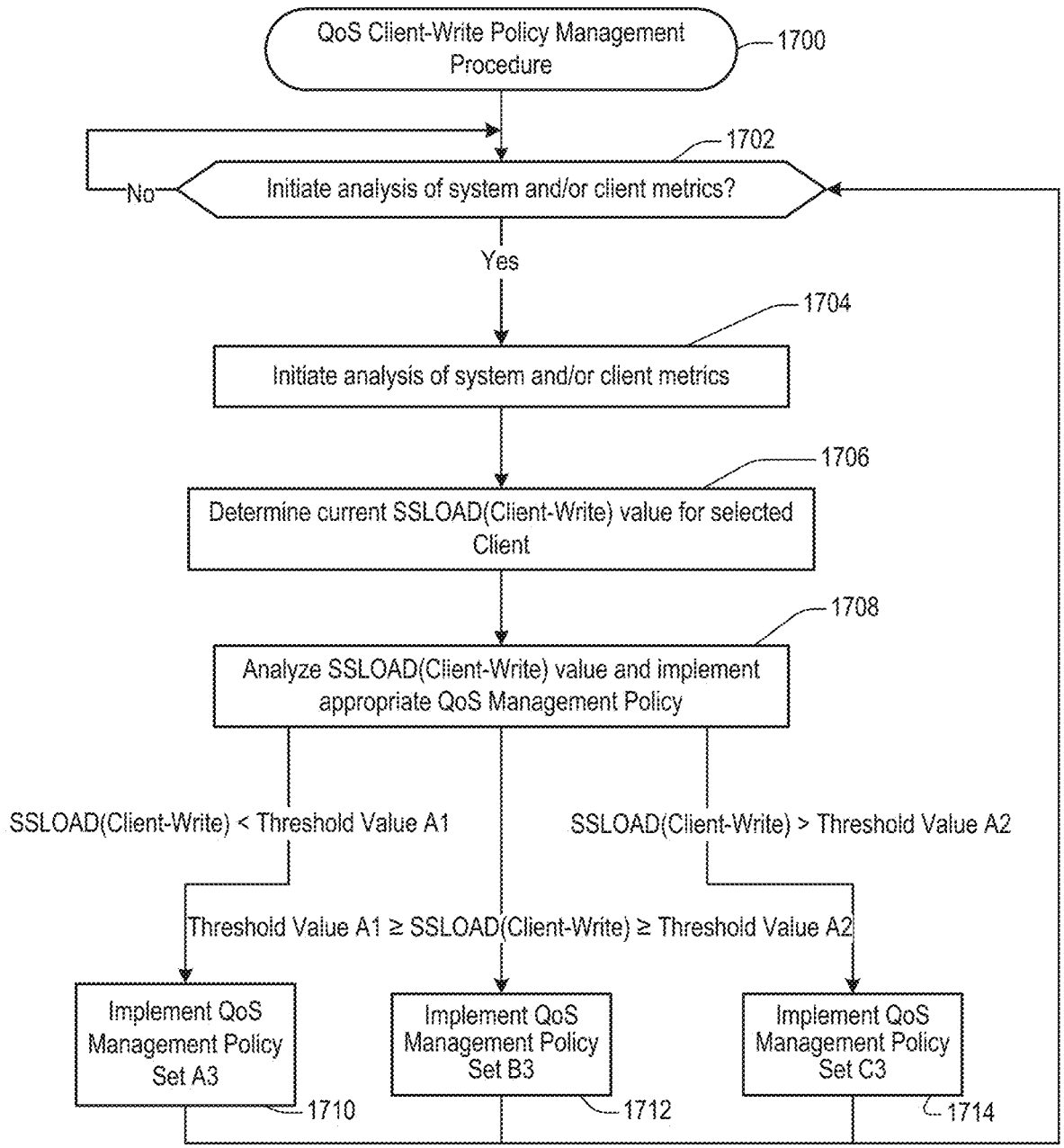
FIG. 17 shows a flow diagram of a QoS Client-Write Policy Management Procedure in accordance with an illustrative implementation.

FIG. 17 shows a flow diagram of a QoS Client-Write Policy Management Procedure 1700 in accordance with a specific embodiment. Additional, fewer, or different operations of the procedure 1700 may be performed, depending on the particular embodiment. The procedure 1700 can be implemented on a computing device. In one implementation, the procedure 1700 is encoded on a computer-readable medium that contains instructions that, when executed by a computing device, cause the computing device to perform operations of the procedure 1700. According to different embodiments, at least a portion of the various types of functions, operations, actions, and/or other features provided by the QoS Client-Write Policy Management Procedure may be implemented at one or more nodes and/or volumes of the storage system. For purposes of illustration, it is assumed that the QoS Client-Write Policy Management Procedure 1700 has been instantiated to perform QoS policy management for a selected Client (e.g., Client A, FIG. 9).

In at least one embodiment, the QoS Client-Write Policy Management Procedure may be operable to perform and/or implement various types of functions, operations, actions, and/or other features relating to the analysis, measurement, calculation, and updating of Load information for one or more selected Clients of the storage system. According to specific embodiments, multiple instances or threads of the QoS Client-Write Policy Management Procedure may be concurrently implemented and/or initiated via the use of one or more processors and/or other combinations of hardware and/or hardware and software. In one embodiment, a separate instance or thread of the QoS Client-Write Policy Management Procedure may be initiated for performing or facilitating QoS policy management for each respective Client of the storage system.

According to different embodiments, one or more different threads or instances of the QoS Client-Write Policy Management Procedure may be automatically and/or dynamically initiated and/or implemented at one or more different time intervals (e.g., during a specific time interval, at regular periodic intervals, at irregular periodic intervals, upon demand, etc.). For example, in one embodiment, a given instance of the QoS Client-Write Policy Management Procedure may be configured or designed to automatically run about every 250-1000 milliseconds (e.g., every 500 ms for a given Client) to thereby analyze and determine an updated Load(Client-Write) value for the identified Client. In some embodiments, the frequency of execution of the QoS Client-Write Policy Management Procedure for a given Client may automatically and/or dynamically vary based on other events and/or conditions such as, for example, system metrics, client metrics, changes in QoS management policies, etc.

In the example embodiment of FIG. 17, at 1702 it is assumed that at least one condition or event has been detected for initiating execution of the QoS Client-Write Policy Management Procedure. As shown at 1704, the QoS Client-Write Policy Management Procedure may initiate analysis of system and/or client metrics. In at least one embodiment, the analysis of system and/or client metrics may include measuring, acquiring, and/or determining real-time information relating to write latencies for IO activities associated with the Service(s) which have been assigned to handle write and/or replication operations for the identified Client.

As shown at 1706, the QoS Client-Write Policy Management Procedure may determine a current Load(Client-Write) value for the identified Client. According to different embodiments, the Load(Client-Write) value may be determined or calculated, for example, using one or more of the various Load(Client-Write) calculation techniques described herein. In at least one embodiment, the Load(Client-Write) value may be expressed as a client-specific Load value which takes into account write latency metrics for IO activities associated with the Service(s) which have been assigned to handle write and replication operations for the identified Client.

As shown at 1708, the QoS Client-Write Policy Management Procedure may analyze the current Load(Client-Write) value, and in response, may select and implement an appropriate QoS Management Policy for the identified Client. For example, as illustrated in the example embodiment of FIG. 17:

If it is determined that Load(Client-Write)<Threshold Value A1, the QoS Client-Write Policy Management Procedure may implement (1710) QoS Management Policy Set A3;

If it is determined that Threshold Value A1≥Load(Client-Write)≥Threshold Value A2, the QoS Client-Write Policy Management Procedure may implement (1712) QoS Management Policy Set B3;

If it is determined that Load(Client-Write)>Threshold Value A2, the QoS Client-Write Policy Management Procedure may implement (1716) QoS Management Policy Set C1.

Figure 21:
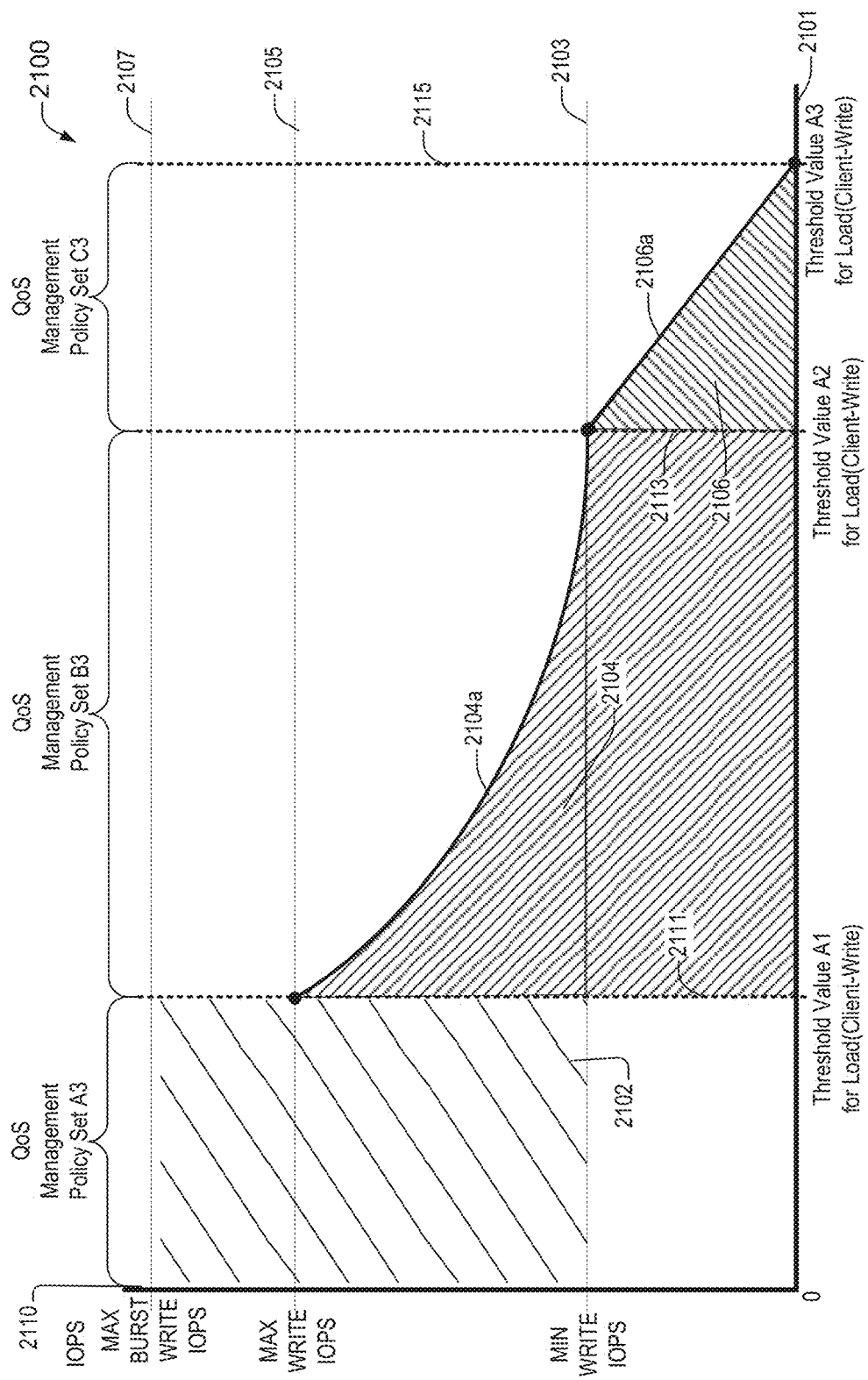
FIG. 21 shows a graphical representation illustrating how different QoS Management Policy Sets for throttling Client IOPS can be automatically and/or dynamically implemented in response changing Load(Client-Write) conditions in accordance with an illustrative implementation.

FIG. 21 shows a graphical representation illustrating an example embodiment of how different QoS Management Policy Sets for throttling Client IOPS may be automatically and/or dynamically implemented in response changing Load (Client-Write) conditions. As illustrated in the example embodiment of FIG. 21, an X-Y graph portion 2100 is shown which includes a Y-axis representing target performance values corresponding to client write IOPS 2110 and an X-axis representing Load(Client-Write) values for a selected Client (e.g., Client A). As illustrated in the example embodiment of FIG. 21, graph portion 2100 includes reference lines 2103, 2105, 2107 which represent the min write IOPS QoS parameter 2103; max write IOPS QoS parameter 2105; and max burst write IOPS QoS parameter 2107 for the identified Client. Additionally, graph portion 2100 includes reference lines 2111, 2113, 2115 which, in this example embodiment, represent threshold values which may be used to determine and select the current QoS Management Policy Set to be put into effect for the identified Client. For example, as illustrated in FIG. 21:

During times when Load(Client-Write)<Threshold Value A1, QoS Management Policy Set A3 may be set into effect for the identified Client. In the specific example embodiment of FIG. 21, region 2102 provides a graphical representation of the possible values of IOPS that a client can operate at in accordance with the QoS Management Policy Set A3. In this example embodiment, the QoS Management Policy Set A3 may specify that the Client is allowed to accrue IOPS credits, and that the Client's IOPS: can be equal to or less than the Client's max IOPS QoS parameter 2105; may be allowed to operate above the Client's max burst IOPS QoS parameter based upon accrued credits; but is not to exceed the Client's max burst IOPS QoS parameter 2107.

During times when Threshold Value A3≥Load(Client-Write)≥Threshold Value A2, QoS Management Policy Set B3 may be set into effect for the identified Client. In the specific example embodiment of FIG. 21, region 2104 provides a graphical representation of the possible values of IOPS that a client can operate at in accordance with the QoS Management Policy Set B 1. In this example embodiment, the QoS Management Policy Set B3 may specify that the Client's write IOPS are to be throttled to a target performance IOPS value which is within a range between the Client's max write IOPS QoS parameter and min write IOPS QoS parameter. Additionally, the QoS Management Policy Set B1 may also specify that, at any given time (while Threshold Value A1≥Load(Client-Write)≥Threshold Value A2), the Client's write IOPS are to be throttled to a target performance IOPS value which is dynamically determined based on the Client's current (e.g., real-time) Load(Client-Write) value. For example, in the example embodiment of FIG. 21, while the QoS Management Policy Set B3 is in effect, the Client's write IOPS are to be throttled to a target performance IOPS value which does not exceed the corresponding IOPS value defined by boundary curve 2104a (e.g., which defines the upper limit of the Client's allowable write IOPS relative to the Client's current Load(Client-Write) value).

During times when Load(Client-Write)>Threshold Value A2, QoS Management Policy Set C3 may be set into effect for the identified Client. In the specific example embodiment of FIG. 21, region 2106 provides a graphical representation of the possible values of IOPS that a client can operate at in accordance with the QoS Management Policy Set C3. In this example embodiment, the QoS Management Policy Set C3 may specify that the Client's write IOPS are to be throttled to a target performance IOPS value which is within a range between the Client's min write IOPS QoS parameter and zero. Additionally, the QoS Management Policy Set C3 may also specify that, at any given time (Load (Client-Write)>Threshold Value A2), the Client's write IOPS are to be throttled to a target performance IOPS value which is dynamically determined based on the Client's Load(Client-Write) value. For example, in the example embodiment of FIG. 21, while the QoS Management Policy Set C3 is in effect, the Client's write IOPS are to be throttled to a target performance IOPS value which does not exceed the corresponding IOPS value defined by boundary curve 2106a (e.g., which defines the upper limit of the Client's allowable write IOPS relative to the Client's current Load(Client-Write) value).

In at least one embodiment, at least a portion of the various QOS techniques described herein may be based, at least in part, on the ability for the storage system to dynamically implement individually customized QoS Management Policies across multiple different Clients of a given cluster.

In an alternate embodiment, when the storage system determines that a cluster is overloaded, the system may use a sliding scale to proportionally and evenly throttle the IOPS associated with each Client of the cluster. As the system overload increases, each Client's IOPS may be automatically, dynamically and/or proportionally backed down (or throttled) based on each Client's respective, updated target IOPS value. Since, the max IOPS and min IOPS QoS parameters may differ for each Client, the target performance IOPS value for each Client may differ even under similar system load conditions.

For example, at a 5 ms latency, the storage system may designate the LOAD of the system to be above a first threshold value (e.g., LOAD(System)=70%), which, for example, may result in the system implementing a first QoS Management Policy Set which causes each Client's IOPS to be throttled to a value somewhere near their respective min IOPS QoS parameter. When this occurs, there may be only limited ways to achieve higher performance on the cluster, such as, for example, by adding more capacity and/or by lowering the max IOPS QoS parameters of volumes. Alternatively, at smaller cluster latencies (e.g., <~2 ms), the storage system may designate the LOAD of the system to be less than a second threshold value (e.g., LOAD(System)= 30%), and the system may implement a second QoS Management Policy Set which allows clients to continue to burst and go above their max IOPS QoS parameter. In embodiments where the cluster is not considered to be overloaded (e.g., the read latencies are acceptable, and write cache queue(s) are sufficiently low), the cluster load may not affect the final target performance IOPS value. Thus, for example, if Client A's max IOPS QoS parameter is set to 1000 IOPS, and Client A's max burst IOPS QoS parameter is set to 1500 IOPS, then, under non-loaded conditions, the system may set Client A's target performance IOPS value to be within the range of 1000 to 1500 IOPS.

Clients Operating Above their Max QoS Parameter (Bursting)

Figure 7:
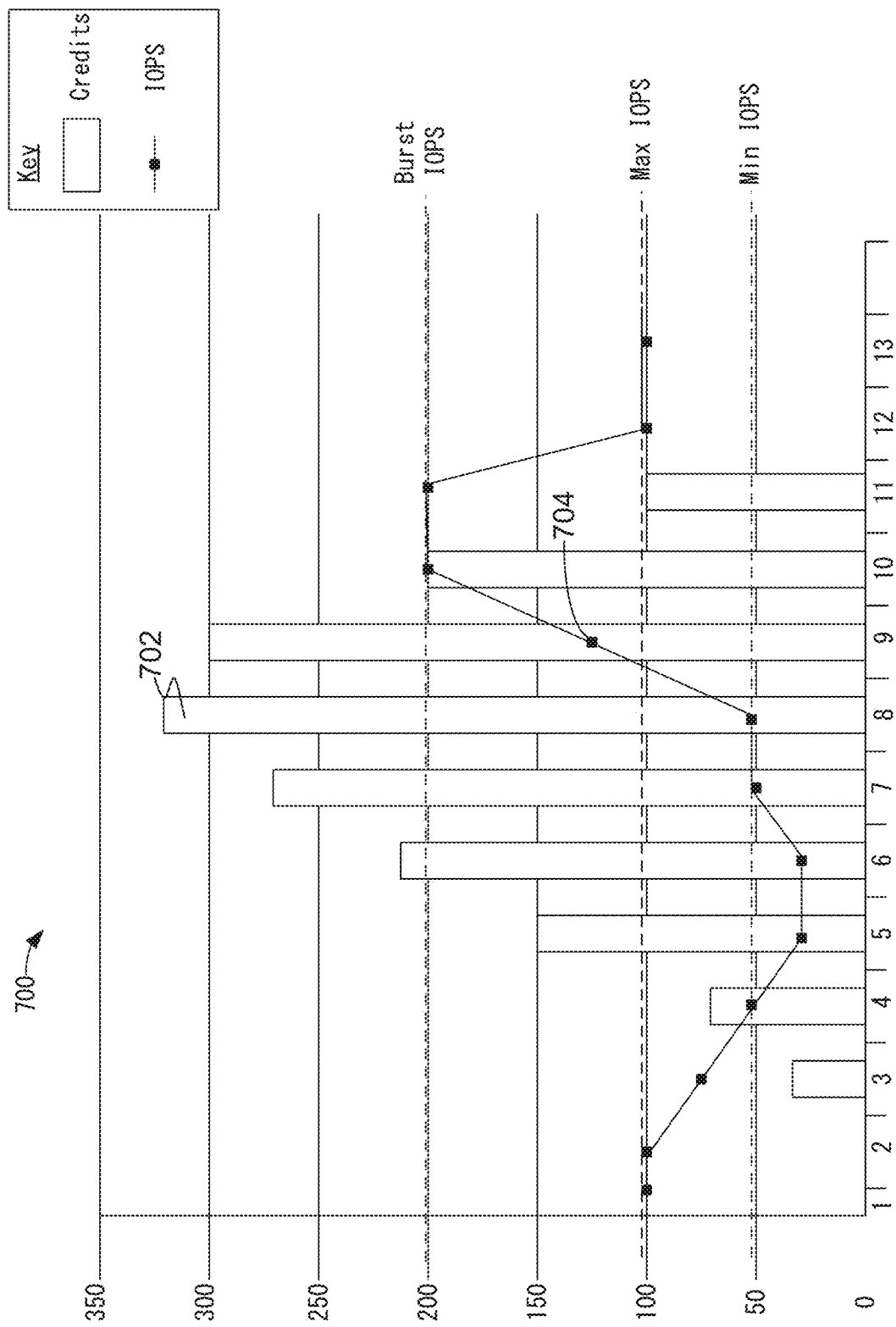
FIG. 7 depicts a graph of a number of IOPS performed by client over a time period in accordance with an illustrative implementation.

FIG. 7 depicts a graph 700 of a number of IOPS performed by client 108 over a time period according to one implementation. A Y-axis shows the number of IOPS performed per second. Periods of a half second are shown on the X-axis. Credits are shown that are accumulated when the number of IOPS is below the max IOPS level (100 IOPS).

As shown, credits increase gradually from time periods 1-8. At time period 8, the client has accrued roughly 320 credits, as indicated by bar 702. As client 108 bursts above the max IOPS value, the number of credits starts to decrease. In graph 700, the client is using roughly 125 IOPS, as shown by square 704, in time period 9. The client is allowed to burst above their max IOPS level, since they have accrued credits, as shown by the bar 702. The client's IOPS level is capped at their burst IOPS value. In the graph 700, the client reaches their burst IOPS value in time periods 10 and 11. When the client is operating above their max IOPS value, their credits are decreased. In one implementation, the amount of credits decreased is equal to amount of IOPS over the client's max IOPS value. From time period 13 on, client 108 is operating at the max IOPS level and the number of credits does not increase.

Credits can be accrued based upon client metrics. For example, in one embodiment, for each IO operation that the Client does not utilize while the Client's IOPS are below a specified threshold (e.g., while the Client's IOPS are below the Client's max IOPS value), the Client may receive an "IOP credit" that may be subsequently used (when allowed by the system) to enable the Client's IOPS to burst above the Client's max IOPS value. For instance, if it is assumed that the Client's max IOPS value is set at 1000 IOPS, and the Client's max burst IOPS value is set at 1500 IOPS, and it is further assumed that the Client is currently only using 900 IOPS and that the system is not overloaded, the Client may accrue 100 IOPS credits (e.g., each second) which may be subsequently used enable the Client's IOPS to burst above 1000 IOPS.

According to different embodiments, one or more limitations or restrictions may be imposed with regards to IOPS burst activities such as, for example, one or more of the following (or combinations thereof):

The total IOPS Credits (e.g., for a given Client and/or for a given cluster) may be capped at a certain amount. For example, in one embodiment, for a given Client, the total IOPS Credits which may be accrued by that Client may be determined according to: Total IOPS Credits=(max burst IOPS value-max IOPS value)*burst time. Thus, in one example embodiment where burst time is set at 10 seconds, the Client may accrue a maximum of (1500–1000)* 10=5000 IOPS credits.

The Client may be limited to using only an allotted portion of its accrued IOPS credits during a given time interval. For example, even though the Client may accrue 5000 credits, the Client may be permitted to use no more than 500 (e.g., 1500–1000=500) of its 5000 credits during one or more specific time intervals. In addition, bursting can be limited based upon the QoS policy sets as described above.

Slice Server Rebalancing

As described above, a volume server 122 can be associated with one or more slice servers 124. Each slice server 124 stores metadata associated with a volume within the system 100. In one implementation, a new slice for a newly created volume can be placed on a volume server 122 based upon the capacity of the volume server 124. For example, a volume server 122 with more free storage capacity can be selected over other volume servers with less free storage capacity. The placement of the new slice, however, may not be ideal with reference to the load of the volume server 122, which can impact the quality of service for a client accessing the new volume. To gain a better distribution of slices, load values, system metrics, client metrics, and QoS parameters described above can be used to determine when and where to place a client's slices. For example, min QoS parameters can be summed on a particular service. This summed value can be used to ensure that the service can support the requested QoS of the clients. Slices can be placed and/or moved based upon this summed value across various services.

In one implementation, the QoS parameters of clients are used to determine a target quality of service index of a particular volume server. For example, all clients that have a slice server on a particular volume server can be determined. The minimum IOPS or maximum IOPS for each client can be summed. If this value is above a predetermined threshold, a decision to move one or more slices is made. When the sum is above the threshold, an alert can be sent to administrators of the system. The administrator can then determine which slice to move to another slice server. In an alternative embodiment, the move can occur automatically in such a way that evens the quality of service index for each of the slice servers, by selecting an unloaded volume server. In addition to identifying which volume server is overloaded, underutilized volume servers can also be identified in a similar manner A sum of the minimum IOPS for each volume server can be calculated and displayed to the administrators. The administrators can then intelligently select a new volume server. In another implementation, a slice can be moved automatically based upon detecting an overloaded volume server.

In addition to using the QoS parameters, performance metrics and load values described above can be used to determine if a volume is overloaded and which volumes are not overloaded. For example, the write-cache capacity of a volume server can be used in conjunction with a client's metrics to determine when and which slice to move. A process can monitor the various system level metrics, such as a volume server's write cache capacity, and determine if any volume server is overloaded. Similar to the target performance manager 402 described above, an overloaded condition can be determined based upon comparing load values with corresponding thresholds. If an overload condition is detected, the client metrics, system metrics, and/or load values can be used to determine if any clients are unproportionally responsible for the overload condition. For example, a volume server can have slices and/or slice servers for a number of clients. Two such clients may account for a large amount of data writes on the volume server which impacts the volume server's write cache capacity. Using the number of IO writes, the amount of written bandwidth of all of the clients, and/or load values associated with number of IO writes and/or bandwidth, the two clients who are impacting the write cache capacity more than other clients can be determined. Based upon this characteristic, a slice associated with either of these two clients can be selected to be moved to another volume server. This feature helps ensure that moving a particular slice off of a volume will have a significant impact in reducing or eliminating the overload condition for the other clients on the system. Without investigating the client metrics, system metrics, and/or load values, a slice could be moved that is not significantly impacting the performance of a volume server. This scenario can result in the original volume server still being overloaded.

In addition, the performance metrics and/or load values associated with the other volume servers can be analyzed to find a volume server for a slice. Continuing the above example, a volume server that can handle a large amount of writes can be determined. For example, volume servers with a large write cache capacity or that have a relatively small number of write IOs across all customers of the volume server can be identified through either performance metrics or load values. The slice can then be moved to one of these identified volume servers, helping to ensure that moving the slice will not cause an overload condition for the new volume server based upon moving the slice server.

In one implementation, slice server rebalancing can be done independently from quality of service monitoring. For example, checking to determine if any slice should be moved can be done on a schedule, e.g., every 500 ms, 1 s, 1 minute, etc. In another implementation, the quality of service monitoring and slice server rebalancing can be integrated. For example, prior to checking the quality of service for clients, the slice server rebalancing process can be queried to determine if any slice should be moved. If any volume server is overloaded, the quality of service monitoring can wait until the slice is moved. As an overloaded volume server can impact performance metrics and load values of the system and clients, the quality of service monitoring may wait until after the slice servers are rebalanced. This feature allows the quality of service monitoring to use performance metrics and/or load values that adequately describe system performance and client performances without being negatively impacted by an overloaded volume server.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method comprising:
   determining whether a set of quality of service (QoS) rules based on one or more performance capacities according to performance class of a storage system is satisfied, wherein each QoS rule includes a boundary condition and a threshold expressing performance guarantees to a respective performance class, wherein determining whether the set of QoS rules is satisfied further includes:
   determining, for each QoS rule, whether a respective boundary condition satisfies a respective threshold based on measured capacity for a performance metric corresponding to the respective boundary condition;

in response to determining that the set of QoS rules is satisfied, setting a first QoS parameter associated with the set of QoS rules; and throttling access to the storage system by a first client associated with a first performance class based on the first QoS parameter to enforce the performance guarantees to the first performance class.

2. The method of claim 1, wherein the measured capacity for the performance metric is measured at the storage system.

3. The method of claim 1, wherein the measured capacity for the performance metric is measured at the first client.

4. The method of claim 1, wherein the set of QoS rules is configurable via a graphical user interface (GUI).

5. The method of claim 1, wherein the set of QoS rules is invalid other than during a time period according to one of a time of day and days of a month.

6. The method of claim 1, further comprising throttling access to the storage system by a second client associated with a second performance class based on a second QoS parameter associated with the set of QoS rules.

7. The method of claim 1, further comprising:
setting a second QoS parameter associated with the set of QoS rules to increase the performance guarantees to a second performance class.

8. The method of claim 1, wherein the performance metric is associated with an application.

9. The method of claim 1, wherein the first QoS parameter corresponds to burst input/output operations (IOPS) for a time period based upon credits for the first performance class.

10. The method of claim 1, wherein in response to determining that the set of QoS rules is satisfied further comprises charging an additional billing for the first performance class.

11. A non-transitory computer-readable media having instructions stored thereon executable by a computing device, the instructions for guaranteeing performance to clients of a storage system configured to:
determine whether a set of quality of service (QoS) rules based on one or more performance capacities according to performance class of a storage system is satisfied, wherein each QoS rule includes a boundary condition and a threshold expressing performance guarantees to a respective performance class, wherein the instruction configured to determine whether the set of QoS rules is satisfied further includes instructions configured to:
determine, for each QoS rule, whether a respective boundary condition satisfies a respective threshold based on measured capacity for a performance metric corresponding to the respective boundary condition;
in response to determining that the set of QoS rules is satisfied, set a first QoS parameter associated with the set of QoS rules; and
throttle access to the storage system by a first client associated with a first performance class based on the first QoS parameter to enforce the performance guarantees to the first performance class.

12. The non-transitory computer-readable media of claim 11, wherein the measured capacity for the performance metric is measured at the storage system.

13. The non-transitory computer-readable media of claim 11, wherein the measured capacity for the performance metric is measured at the first client.

14. The non-transitory computer-readable media of claim 11, wherein the set of QoS rules is configurable via a graphical user interface (GUI).

15. The non-transitory computer-readable media of claim 11, wherein the set of QoS rules is invalid other than during a time period according to one of a time of day and days of a month.

16. The non-transitory computer-readable media of claim 11, wherein the instructions for guaranteeing performance to clients of the storage system are further configured to throttle access to the storage system by a second client associated with a second performance class based on a second QoS parameter associated with the set of QoS rules.

17. The non-transitory computer-readable media of claim 11, wherein the instructions for guaranteeing performance to clients of the storage system are further configured to set a second QoS parameter associated with the set of QoS rules to increase performance guarantees to a second performance class.

18. A storage system comprising:
a processor;
a network interface;
a computer-readable medium having stored thereon instructions for managing performance of the storage system, the instructions configured to:
determine whether a set of quality of service (QoS) rules based on one or more performance capacities according to performance class of a storage system is satisfied, wherein each QoS rule includes a boundary condition and a threshold expressing performance guarantees to a respective performance class, wherein the instruction configured to determine whether the set of QoS rules is satisfied further includes instructions configured to:
determine, for each QoS rule, whether a respective boundary condition satisfies a respective threshold based on measured capacity for a performance metric corresponding to the respective boundary condition;
in response to determining that the set of QoS rules is satisfied, set a first QoS parameter associated with the set of QoS rules; and
throttle access to the storage system by a first client associated with a first performance class based on the first QoS parameter to enforce the performance guarantees to the first performance class.

19. The storage system of claim 18, wherein the instructions for managing performance of the storage system are further configured to throttle access to the storage system by a second client associated with a second performance class based on a second QoS parameter associated with the set of QoS rules.

20. The storage system of claim 18, wherein the instructions for managing performance of the storage system are further configured to set a second QoS parameter associated with the set of QoS rules to increase performance guarantees to a second performance class.

* * * * *